(12) United States Patent
Horiguchi et al.

(10) Patent No.: US 12,265,356 B2
(45) Date of Patent: Apr. 1, 2025

(54) PHOTORESPONSIVE POLYMER, PHOTORESPONSIVE ADHESIVE, TONER, AND IMAGE FORMING METHOD

(71) Applicant: Konica Minolta, Inc., Tokyo (JP)

(72) Inventors: Haruo Horiguchi, Koganei (JP); Kouji Sugama, Musashino (JP); Kazuaki Nakamura, Hino (JP); Yukiko Nakai, Toyohashi (JP); Toyoko Shibata, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 897 days.

(21) Appl. No.: 17/406,047

(22) Filed: Aug. 18, 2021

(65) Prior Publication Data

US 2022/0066345 A1 Mar. 3, 2022

(30) Foreign Application Priority Data

Aug. 28, 2020 (JP) .................................. 2020-145015

(51) Int. Cl.
*G03G 9/097* (2006.01)
*C08F 20/36* (2006.01)
*G03G 15/20* (2006.01)

(52) U.S. Cl.
CPC ......... *G03G 9/09775* (2013.01); *C08F 20/36* (2013.01); *G03G 15/2098* (2021.01)

(58) Field of Classification Search
None
See application file for complete search history.

(56) References Cited

U.S. PATENT DOCUMENTS

2013/0066068 A1   3/2013   Norikane et al.

FOREIGN PATENT DOCUMENTS

| JP | 2011-256155 A | 12/2011 |
|----|---------------|---------|
| JP | 2011-256291 A | 12/2011 |
| JP | 2014-191078 A | 10/2014 |

*Primary Examiner* — Walter L Lindsay, Jr.
*Assistant Examiner* — Geoffrey T Evans
(74) *Attorney, Agent, or Firm* — LUCAS & MERCANTI, LLP

(57) ABSTRACT

A photoresponsive polymer that is fluidized by light irradiation and reversibly non-fluidized and contains a structural unit represented by a general formula (1) shown below:

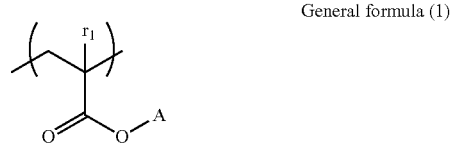

General formula (1)

wherein each substituent is defined as described in the specification.

23 Claims, 3 Drawing Sheets

PHOTORESPONSIVE POLYMER, PHOTORESPONSIVE ADHESIVE, TONER, AND IMAGE FORMING METHOD

BACKGROUND

Technical Field

The present invention relates to a photoresponsive polymer that is fluidized by light irradiation and reversibly non-fluidized, a photoresponsive adhesive and a toner containing the photoresponsive polymer, and an image forming method using the toner.

Description of the Related Art

An azobenzene derivative is widely known as a compound that is reversibly fluidized and non-fluidized due to a photoisomerization reaction. For example, JP 2011-256155 A (US 2013/0066088 A), JP 2011-256291 A and JP2014-191078 A disclose that an azobenzene liquid crystal compound exhibits a phase change of crystal phase-isotropic phase by irradiation with ultraviolet light or visible light. The azobenzene liquid crystal compound causes a cis-trans isomerization reaction of an azobenzene moiety in response to light. It is considered that such change in molecular structure induces a phase transition from a non-fluid (crystal phase) state to a fluid (isotropic phase) state. In addition, when the azobenzene liquid crystal compound is irradiated again with light at a different wavelength, heated, or left in a dark place at room temperature, a reverse reaction occurs and the compound is solidified (non-fluidized) again.

SUMMARY

Unfortunately, the compounds having an azobenzene moiety (hereinafter, the compounds are also simply referred to as azobenzene compounds) described in JP 2011-256155 A (US 2013/0066088 A), JP 2011-256291 A and JP2014-191078 A are colored in orange, and thus have a problem in that the compounds are incapable of reproducing a desired color when being applied to industrial products.

In addition, the azobenzene compounds described in JP 2011-256155 A (US 2013/0066088 A), JP 2011-256291 A and JP2014-191078 A have an orange color, and toners containing the azobenzene compounds have a problem of poor color reproducibility. Currently reported light-melting toners are fixed by an external stimulus other than heat, and have a problem of low productivity because the toners are insufficient in the softening rate required for fixing.

Meanwhile, according to the studies made by the present inventors, it was found that an azomethine compound having a structure in which benzene rings are connected by an azomethine group has a problem that even when the azomethine compound is changed from a trans isomer to a cis isomer by light irradiation, a toner containing the azomethine compound is insufficient in maintaining a softened state necessary for fixing due to too fast a reverse reaction.

Therefore, objects of the present invention are to provide a colorless polymer that is fluidized by light irradiation and reversibly non-fluidized and has high toughness.

The present inventors have intensively studied in view of the above-mentioned problems. As a result, the present inventors have found that the above-mentioned problems can be solved by the following photoresponsive polymer, and have completed the present invention.

To achieve at least one of the abovementioned objects, according to an aspect of the present invention, a photoresponsive polymer reflecting one aspect of the present invention is fluidized by light irradiation and reversibly non-fluidized and contains a structural unit represented by a general formula (1) shown below:

[Chemical Formula 1]

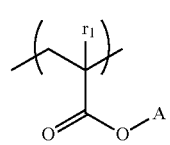

General formula (1)

wherein $r_1$ is a hydrogen atom or a methyl group, and
A is a propenimine structure-containing group represented by a general formula (2-a), (2-b), or (2-c) shown below:

[Chemical Formula 2]

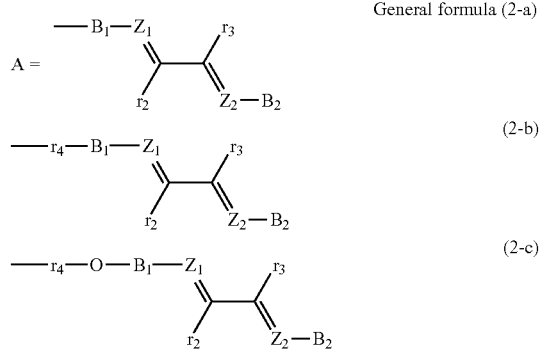

wherein $Z_1$ and $Z_2$ are each independently N or CX, and $Z_1 \neq Z_2$, $B_1$ is each independently a substituted or unsubstituted divalent aromatic hydrocarbon group or a substituted or unsubstituted divalent aromatic heterocyclic group, $B_2$ is each independently a substituted or unsubstituted monovalent aromatic hydrocarbon group or a substituted or unsubstituted monovalent aromatic heterocyclic group, X, $r_2$, and $r_3$ are each independently a hydrogen atom or an alkyl group having 1 to 2 carbon atoms, and $r_4$ is each independently an alkylene group having 1 to 18 carbon atoms.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

In FIG. 1, the image forming apparatus includes a photoreceptor 1, a charger 2, an exposure device 3, a developing unit 4, a transfer unit 5, a sheet conveying system 7, a cleaning unit 8, a pressure-bonding unit 9, an image forming unit 10, sheet feeders 11, conveying rollers 12, a conveyor belt 13, a sheet ejector 14, a manual sheet feeder 15, trays 16, a thermo-hygrometer 17, an image processing unit 20, a sheet reversing unit 24, an irradiation unit 40, an image reading device 71, an automatic document feeder 72, a blade 85, a control unit 90, and pressurizing members 91, 92. FIG. 1 also illustrates a document d and recording sheets S.

In FIG. 2, the image forming apparatus includes the photoreceptor 1, the charger 2, the exposure device 3, the developing unit 4, the transfer unit 5, the cleaning unit 8, the pressure-bonding unit 9, the image forming unit 10, the conveyor belt 13, the irradiation unit 40, the blade 85, and the pressurizing members 91, 92.

DETAILED DESCRIPTION OF EMBODIMENTS

Figure 1:
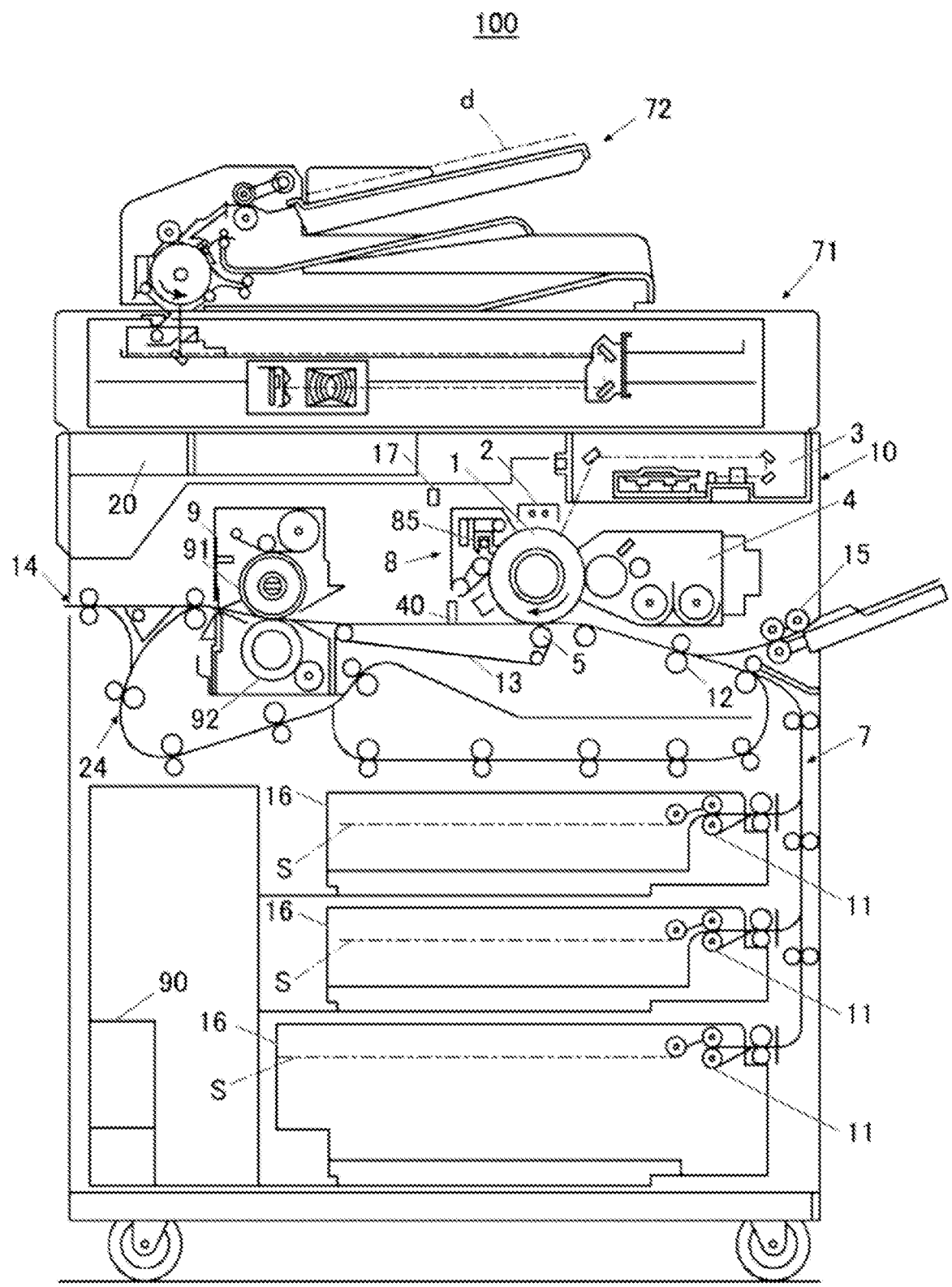
FIG. 1 is a schematic cross-sectional view illustrating a configuration of an image forming apparatus used in an image forming method according to an embodiment of the present invention.

Hereinafter, one or more embodiments of the present invention will be described with reference to the drawings. However, the scope of the invention is not limited to the disclosed embodiments. In the present specification, the "from X to Y" indicating the range means "X or more and Y or less"

In the present specification, unless otherwise specified, operations and measurements of physical properties and the like are performed under conditions of room temperature (20° C. or more and 25° C. or less)/a relative humidity of 40% RH or more and 50% RH or less.

A photoresponsive polymer according to an embodiment of the present invention is fluidized by light irradiation and reversibly non-fluidized and contains a structural unit represented by a general formula (1) shown below.

[Chemical Formula 3]

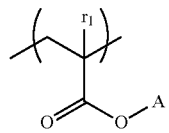

General formula (1)

In the general formula (1),
$r_1$ is a hydrogen atom or a methyl group, and
A is a propenimine structure-containing group represented by a general formula (2-a), (2-b), or (2-c) shown below.

[Chemical Formula 4]

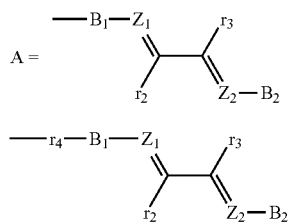

General formula (2-a)

(2-b)

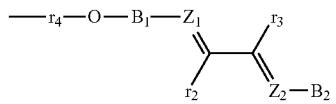

(2-c)

In the general formulae (2-a), (2-b), and (2-c),
$Z_1$ and $Z_2$ are each independently N or CX, and $Z_1 \neq Z_2$,
$B_1$ is each independently a substituted or unsubstituted divalent aromatic hydrocarbon group or a substituted or unsubstituted divalent aromatic heterocyclic group,
$B_2$ is each independently a substituted or unsubstituted monovalent aromatic hydrocarbon group or a substituted or unsubstituted monovalent aromatic heterocyclic group,
X, $r_2$, and $r_3$ are each independently a hydrogen atom or an alkyl group having 1 to 2 carbon atoms, and
$r_4$ is each independently an alkylene group having 1 to 18 carbon atoms.

With use of the polymer containing the structural unit represented by the general formula (1), it is possible to realize a photoresponsive polymer that is fluidized by light irradiation and reversibly non-fluidized, has high toughness, and is less colored to such an extent that the polymer does not affect desired color reproduction when being applied to a color material of a toner or the like.

The reason why the polymer of the present invention produces the above-mentioned effect is not clear in detail, but the effect is possibly produced by the following mechanism. Note that the following mechanism is based on speculation, and the present invention is not limited to the following mechanism at all. In the following description, the structural unit represented by the general formula (1) is also referred to as a "propenimine structure-containing structural unit".

It is known that an azobenzene compound having a long alkyl chain at a terminal is a material that absorbs light and softens (undergoes optical phase transition) from a solid state, that is, a material that is fluidized by light irradiation, and it is considered that the optical phase transition is caused by disorder of a crystal structure due to cis-trans isomerization. The azobenzene compounds described in JP 2011-256155 A (US 2013/0066088 A), JP 2011-256291 A and JP2014-191078 A cause a phase change due to an isomerization reaction caused by light irradiation. Since these azobenzene compounds have a relatively low molecular weight, the compounds have a problem that they have low toughness as a material. In addition, since the azobenzene compounds have strong absorption due to n–π* transition in a visible light region, and have an orange color, the compounds have a problem in that the compounds are incapable of reproducing a desired color when being applied to industrial products.

The present invention has realized the provision of a polymer that is fluidized by light irradiation and reversibly non-fluidized, has high toughness, and is not significantly colored by using a polymer containing a propenimine (—C=C—C=N—) structure-containing structural unit. Introduction of the propenimine structure-containing structural unit instead of the azobenzene compound significantly weakens the strong n–π* absorption in the azobenzene compound, so that a polymer that is not significantly colored can be realized.

In general, a polymer containing a structural unit derived from an azomethine derivative can induce reversible fluidization and non-fluidization phenomena when an azomethine moiety (C=N) absorbs light, and thermal energy released in a process of photoexcitation/deactivation is transmitted to a bonded structural unit (photothermal conversion). In particular, when the azomethine moiety contained in the polymer is a trans isomer (E), a phenomenon of isomerization to a cis isomer (Z) having a low glass transition temperature (Tg) occurs in addition to the photothermal conversion. It is considered that as a result of the isomerization, the ordered structure of the polymer is disordered, and the polymer can induce a more efficient fluidization phenomenon. It is also considered that when the cis isomer returns to the trans isomer, an ordered structure is formed again, and the polymer can induce a reversible non-fluidization phenomenon. Therefore, in order to induce the phenomenon that the polymer is fluidized by light irradiation, it is considered necessary that many trans isomers (E) be photoisomerized to cis isomers (Z). Unfortunately, it is known that an azomethine moiety generally has a higher rate of Z→E isomerization (reverse reaction) from a cis isomer to a trans isomer than an azobenzene moiety does. Accordingly, it is expected that an azomethine moiety having unsubstituted benzene rings bonded to both ends of a C=N bond is disadvantageous for inducing a phenomenon that the polymer is fluidized by light irradiation and then reversibly non-fluidized.

In the present invention, it is considered that owing to a structure in which a vinylene group is introduced into a C=N bond of an azomethine moiety, the amount of the cis isomer (Z) during light irradiation increases, and fluidization due to a photoisomerization reaction and a subsequent reversible non-fluidization phenomenon is induced. This is considered to be because introduction of a vinylene group instead of a benzene ring reduced the cis-trans isomerization rate, particularly the rate of Z→E isomerization from the cis isomer to the trans isomer.

Further, increasing the molecular weight of a propenimine derivative can also improve the toughness as a material. Therefore, it is considered that particularly a toner containing the polymer according to an embodiment of the present invention provides excellent image intensity.

Here, the phrase "fluidized by light irradiation and reversibly non-fluidized" refers to a phenomenon that the polymer changes from a non-flowable state to a flowable state by light irradiation and further returns to a non-flowable state.

Further, it is considered that as a result of increase of the molecular weight of the propenimine derivative, the propenimine derivative absorbs light, and thermal energy released in a process of photoexcitation/deactivation is transmitted to a bonded structural unit (photothermal conversion), so that the polymer can be effectively melted or softened. In addition, toughness as a material can also be improved. Therefore, it is considered that a toner containing the photoresponsive polymer according to an embodiment of the present invention provides excellent fixability (image intensity).

In addition, introduction of the propenimine structure-containing structural unit significantly weakens the strong n–π* absorption of the azobenzene moiety, so that a polymer that is not significantly colored can be realized.

For the above-mentioned reasons, it is considered that the photoresponsive polymer according to an embodiment of the present invention can induce fluidization and reversible non-fluidization phenomena due to photoisomerization. In addition, the photoresponsive polymer according to an embodiment of the present invention has excellent toughness and is not significantly colored, and thus can be suitably used in a toner and a photoresponsive adhesive.

In the present invention, the term "flow" refers to a state in which deformation occurs without external force or with small external force.

Hereinafter, preferred embodiments of the present invention will be described. Unless otherwise specified, operations and measurements of physical properties and the like are performed under conditions of room temperature (20° C. or more and 25° C. or less)/a relative humidity of 40% RH or more and 50% RH or less.

<Polymer Containing Propenimine Structure-Containing Structural Unit>

A photoresponsive polymer according to an embodiment of the present invention is fluidized by light irradiation and reversibly non-fluidized and contains a structural unit represented by a general formula (1) shown below.

[Chemical Formula 5]

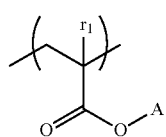

General formula (1)

In the general formula (1),
$r_1$ is a hydrogen atom or a methyl group, and
A is a propenimine structure-containing group represented by a general formula (2-a), (2-b), or (2-c) shown below.

[Chemical Formula 6]

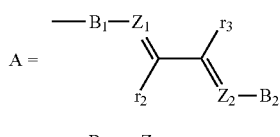

General formula (2-a)

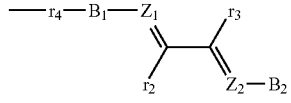

(2-b)

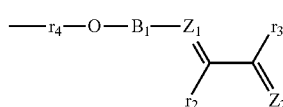

(2-c)

In the general formulae (2-a), (2-b), and (2-c) (hereinafter also simply referred to as a general formula (2)),
$Z_1$ and $Z_2$ are each independently N or CX, and $Z_1 \neq Z_2$,
$B_1$ is each independently a substituted or unsubstituted divalent aromatic hydrocarbon group or a substituted or unsubstituted divalent aromatic heterocyclic group,
$B_2$ is each independently a substituted or unsubstituted monovalent aromatic hydrocarbon group or a substituted or unsubstituted monovalent aromatic heterocyclic group,
X, $r_2$, and $r_3$ are each independently a hydrogen atom or an alkyl group having 1 to 2 carbon atoms, and
$r_4$ is each independently an alkylene group having 1 to 18 carbon atoms.

The monovalent aromatic hydrocarbon group as $B_2$ is not particularly limited, but is preferably an aryl group having 6 to 30 carbon atoms, and examples thereof include a phenyl group, a naphthyl group, an anthracenyl group, a phenanthrenyl group, and a pyrenyl group. $B_1$ is preferably a divalent group derived from any of the above-mentioned groups. Among them, $B_2$ is preferably a phenyl group, and $B_1$ is preferably a phenylene group because the polymer is effectively fluidized and non-fluidized.

The monovalent aromatic heterocyclic group as $B_2$ is not particularly limited, but is preferably a group having 2 to 30 carbon atoms. In addition, those having a high electron-donating property are preferred, and examples thereof include a thiophenyl group, a pyrrolyl group, a pyrazolyl group, an imidazolyl group, a pyridyl group, a pyrimidinyl group, a pyrazinyl group, a triazinyl group, a benzothiophenyl group, a benzimidazolyl group, an indolyl group, an isoindolyl group, a quinolinyl group, an isoquinolinyl group, a quinazolinyl group, a quinoxalinyl group, a naphthyridinyl group, an acridinyl group, a carbazolyl group, and a dibenzothiophenyl group, but are not limited thereto. Among them, a thiophenyl group, a pyrrolyl group, a pyrazolyl group, an imidazolyl group, an indolyl group, and a carbazolyl group are preferred because the polymer is effectively fluidized and non-fluidized. $B_1$ is preferably a divalent group derived from any of the above-mentioned groups.

Each of the aromatic hydrocarbon group and the aromatic heterocyclic group may have a substituent. The substituent is not particularly limited, and examples thereof include a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, and an alkoxycarbonyl group having 2 to 19 carbon atoms. The substituent is preferably a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

As described above, similarly to the case of the azobenzene moiety, the optical phase transition of the propenimine moiety is considered to be caused by disorder of the crystal structure due to cis-trans isomerization. In general, the optical phase transition of the propenimine moiety occurs only at the outermost surface of the crystal structure, since the propenimine moiety has a strong π-π interaction between molecules. In this context, when the aromatic hydrocarbon group or the aromatic heterocyclic group represented by $B_1$ and $B_2$ in the general formula (1) has a substituent, the polymer according to an embodiment of the present invention forms a specific crystal structure in which, in a periodic structure dominated by the π-π interaction, a structure isotropically disturbed by thermal motion of the substituent coexists. Therefore, when the cis-trans isomerization reaction locally proceeds and the π-π interaction of the propenimine moiety is reduced, isotropic melting occurs in a chain manner in the entire system. Therefore, it is considered that cis-trans isomerization is more likely to proceed, and fluidization is more likely to occur.

In this case, at least one of the substituents is preferably a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 18 carbon atoms, or an alkoxycarbonyl group having 2 to 18 carbon atoms. It is considered that due to such a structure, cis-trans isomerization is more likely to proceed, and fluidization is more likely to occur. Among the above-mentioned groups, an alkyl group having 1 to 18 carbon atoms, an alkoxy group having 1 to 18 carbon atoms, or a dialkylamino group having 2 to 10 carbon atoms is more preferred because of high thermal mobility.

The alkyl group is more preferably an alkyl group having 1 to 12 carbon atoms, and still more preferably an alkyl group having 4 to 12 carbon atoms. The alkoxy group is more preferably an alkoxy group having 1 to 12 carbon atoms, and still more preferably an alkoxy group having 4 to 12 carbon atoms. The dialkylamino group is more preferably a dialkylamino group having 2 to 8 carbon atoms, and still more preferably a dialkylamino group having 4 to 6 carbon atoms. The acyl group is more preferably an acyl group having 2 to 13 carbon atoms, and still more preferably an acyl group having 5 to 13 carbon atoms. The alkoxycarbonyl group is more preferably an alkoxycarbonyl group having 2 to 13 carbon atoms, and still more preferably an alkoxycarbonyl group having 5 to 13 carbon atoms. As described above, introduction of a long-chain substituent makes the crystals easier to be disordered, improves the light melting property, and improves the fixability.

Examples of the alkyl group having 1 to 18 carbon atoms include, but are not particularly limited to, linear alkyl groups such as a methyl group, an ethyl group, an n-propyl group, an n-butyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, and an n-hexadecyl group; and branched alkyl groups such as an isopropyl group, a sec-butyl group, an isobutyl group, a t-butyl group, a 1-methylpentyl group, a 4-methyl-2-pentyl group, a 3,3-dimethylbutyl group, a 2-ethylbutyl group, a 1-methylhexyl group, a t-octyl group, a 1-methylheptyl group, a 2-ethylhexyl group, a 2-propylpentyl group, a 2,2-dimethylheptyl group, a 2,6-dimethyl-4-heptyl group, a 3,5,5-trimethylhexyl group, a 1-methyldecyl group, and a 1-hexylheptyl group.

Examples of the alkoxy group having 1 to 18 carbon atoms include linear alkoxy groups such as a methoxy group, an ethoxy group, an n-propoxy group, an n-butoxy group, an n-hexyloxy group, an n-heptyloxy group, an n-octyloxy group, an n-nonyloxy group, an n-decyloxy group, an n-undecyloxy group, an n-dodecyloxy group, an n-tridecyloxy group, an n-tetradecyloxy group, an n-pentadecyloxy group, and an n-hexadecyloxy group; and branched alkoxy groups such as a 1-methylpentyloxy group, a 4-methyl-2-pentyloxy group, a 3,3-dimethylbutyloxy group, a 2-ethylbutyloxy group, a 1-methylhexyloxy group, a t-octyloxy group, a 1-methylheptyloxy group, a 2-ethylhexyloxy group, a 2-propylpentyloxy group, a 2,2-dimethylheptyloxy group, a 2,6-dimethyl-4-heptyloxy group, a 3,5,5-trimethylhexyloxy group, a 1-methyldecyloxy group, and a 1-hexylheptyloxy group.

Examples of the alkylamino group having 1 to 10 carbon atoms include a methylamino group, an ethylamino group, an n-propylamino group, an n-butylamino group, an isobutylamino group, an n-hexylamino group, an n-heptylamino group, an n-octylamino group, an n-nonylamino group, and an n-decylamino group.

Examples of the dialkylamino group having 2 to 10 carbon atoms include a dimethylamino group, a diethylamino group, a di-n-propylamino group, a di-n-butylamino group, a di-isobutylamino group, and a methylethylamino group.

Examples of the acyl group having 2 to 19 carbon atoms include saturated or unsaturated linear or branched acyl groups. Specific examples thereof include an acetyl group, a propanoyl group (propionyl group), a butanoyl group (butyryl group), an isobutanoyl group (isobutyryl group), a pentanoyl group (valeryl group), an isopentanoyl group (isovaleryl group), a sec-pentanoyl group (2-methylbutyl group), a t-pentanoyl group (pivaloyl group), a hexanoyl group, a heptanoyl group, an octanoyl group, a t-octanoyl group (2,2-dimethylhexanoyl group), a 2-ethylhexanoyl group, a nonanoyl group, an isononanoyl group, a decanoyl group, an isodecanoyl group, an undecanoyl group, a lauroyl group, a myristoyl group, a palmitoyl group, a stearoyl group, a behenoyl group, an undecylenoyl group, and an oleoyl group.

Examples of the alkoxycarbonyl group having 2 to 19 carbon atoms include linear or branched alkoxycarbonyl groups. Specific examples thereof include linear alkoxycarbonyl groups such as a methoxycarbonyl group, an ethoxycarbonyl group, an n-butoxycarbonyl group, an n-hexyloxycarbonyl group, an n-heptyloxycarbonyl group, an n-octyloxycarbonyl group, an n-nonyloxycarbonyl group, an n-decyloxycarbonyl group, an n-undecyloxycarbonyl group, an n-dodecyloxycarbonyl group, an n-tridecyloxycarbonyl group, an n-tetradecyloxycarbonyl group, an n-pentadecyloxycarbonyl group, and an n-hexadecyloxycarbonyl group; and branched alkoxycarbonyl groups such as a 1-methylpentyloxycarbonyl group, a 4-methyl-2-pentyloxycarbonyl group, a 3,3-dimethylbutyloxycarbonyl group, a 2-ethylbutyloxycarbonyl group, a 1-methylhexyloxycarbonyl group, a t-octyloxycarbonyl group, a 1-methylheptyloxycarbonyl group, a 2-ethylhexyloxycarbonyl group, a 2-propylpentyloxycarbonyl group, a 2,2-dimethylheptyloxycarbonyl group, a 2,6-dimethyl-4-heptyloxycarbonyl group, a 3,5,5-trimethylhexyloxycarbonyl group, a 1-methyldecyloxycarbonyl group, and a 1-hexylheptyloxycarbonyl group.

The structural unit represented by the general formula (1) includes one polymerizable group for one propenimine moiety. Therefore, it is easy to provide a polymer that is easily melted even when the amount of light irradiation energy is low.

In a monomer for obtaining the polymer according to an embodiment of the present invention, the polymerizable group has a group represented by any of formulae (i) to (iii) shown below. The polymerizable group having any of these groups is preferred because it is suitable for synthesis of the polymer. Above all, it is preferred that the polymerizable group have the group represented by the formula (ii) or (iii), and it is more preferred that the polymerizable group have the group represented by the formula (iii) from the viewpoint of ease of softening and melting. That is, in the general formula (1), A is preferably a group represented by the general formula (2-b) or (2-c), and more preferably a group represented by the general formula (2-c).

[Chemical Formula 7]

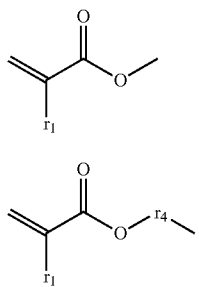

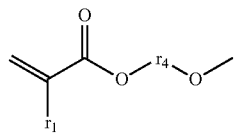

In the formulae (i) to (iii), r corresponds to r in the general formula (1), and is each independently a hydrogen atom or a methyl group. $r_4$ corresponds to $r_4$ in the general formulae (2-b) and (2-c), and each independently represents an alkylene group having 1 to 18 carbon atoms. $r_4$ is preferably an alkylene group having 3 to 12 carbon atoms. The alkylene group may be linear or branched, and is preferably linear. A part of the alkylene group may be substituted with a substituent. Examples of the substituent include a halogen group, a nitro group, a hydroxy group, and a carboxy group.

In the general formula (2), X, $r_2$, and $r_3$ are each independently a hydrogen atom or an alkyl group having 1 to 2 carbon atoms, and are preferably each independently a hydrogen atom. It is speculated that by the mechanism of the present invention, an arrangement of the arranged (crystallized) moieties represented by the general formula (2) is disturbed by photoisomerization so that the state of the polymer is changed from a non-fluidized state to a fluidized state. In order to arrange (crystallize) the moieties, the π-π interaction between the moieties represented by the general formula (2) and ease of stacking (planarity) are required. From such a viewpoint, it is advantageous that X, $r_2$, and $r_3$ each be a hydrogen atom having a small atomic radius.

In the general formula (1), $B_1$ is each independently a substituted or unsubstituted divalent aromatic hydrocarbon group, or a substituted or unsubstituted divalent aromatic heterocyclic group. Further, $B_2$ is each independently a substituted or unsubstituted monovalent aromatic hydrocarbon group, or a substituted or unsubstituted monovalent aromatic heterocyclic group. With such configuration, the polymer is more effectively fluidized and non-fluidized. In particular, when either of $B_1$ and $B_2$ is an aromatic heterocyclic group, the polymer has a smaller molar extinction coefficient in a solution than in the case where both $B_1$ and $B_2$ are aromatic heterocyclic groups, and thus light reaches deeper when applied. Therefore, this case is considered to be advantageous for inducing fluidization because when the polymer is used in a toner, it is possible to melt, by light, not only the upper layer but also the lower layer of the toner.

In a preferred embodiment of the present invention, in the general formula (1), $B_1$ is each independently a divalent aromatic hydrocarbon group in which $Z_1$ is in a para-position relationship with respect to an oxygen atom or $r_4$, and $B_2$ is each independently an unsubstituted monovalent aromatic hydrocarbon group, or a monovalent aromatic hydrocarbon group having, at a para position with respect to $Z_2$, a substituent selected from an alkyl group having 1 to 18 carbon atoms, an alkoxy group having 1 to 18 carbon atoms, and a dialkylamino group having 2 to 10 carbon atoms. Since the aromatic hydrocarbon group is more planar than the aromatic heterocyclic group, the aromatic hydrocarbon group is advantageous for arranging (crystallizing) the moieties represented by the general formula (2). In this case, $B_1$ may have a substituent on a carbon atom other than a carbon atom bonded to $Z_1$, an oxygen atom, or $r_4$. The specific form of each substituent is as described above.

An azomethine moiety having benzene rings introduced at both ends thereof tends to have lower electron density and lower activation energy than an azomethine moiety having an electron-donating aromatic heterocyclic group introduced at one end does. Meanwhile, a propenimine moiety, in which a vinylene group is introduced into a C=N bond of the azomethine moiety and the substituents for $B_1$ and $B_2$ are further introduced, has a higher electron density and higher activation energy, and can effectively induce fluidization and reversible non-fluidization phenomena. In addition, the configuration induces generation of lattice defects, production of free volume, and reduction of the π-π interaction, which act favorably for cis-trans isomerization. Therefore, it is considered that cis-trans isomerization is more likely to proceed, and fluidization is more likely to occur.

That is, in the propenimine moiety in which a vinylene group is introduced into a C=N bond, $B_2$ is preferably an unsubstituted monovalent aromatic hydrocarbon group, or a monovalent aromatic hydrocarbon group having, at a para position with respect to $Z_2$, an electron-donating substituent selected from an alkyl group, an alkoxy group, and a dialkylamino group each having a specific number of carbon atoms. In this case, the propenimine moiety has a higher electron density than in the case where the propenimine moiety has only electron-withdrawing substituent. As a result, the polymer according to the present invention tends to have higher activation energy, and can effectively induce the phenomena of fluidization by light irradiation and reversible non-fluidization.

As described above, when $B_2$ is an unsubstituted monovalent aromatic hydrocarbon group, or a monovalent aromatic hydrocarbon group having, at a para position with respect to $Z_2$, a substituent selected from an alkyl group having 1 to 18 carbon atoms, an alkoxy group having 1 to 18 carbon atoms, and a dialkylamino group having 2 to 10 carbon atoms, crystals are easily disordered, the polymer has improved light melting property, and a toner containing the polymer has excellent fixability. The substituent is more preferably an alkyl group having 4 to 12 carbon atoms, an alkoxy group having 4 to 12 carbon atoms, or a dialkylamino group having 4 to 10 carbon atoms, because the crystals are easily disordered and a greater effect of improving the light melting property is obtained.

In this case, it is preferred that in at least one of $B_1$ and $B_2$, two ortho positions and two meta positions with respect to $Z_1$ or $Z_2$ be unsubstituted or substituted with a group selected from a halogen atom, an alkyl group having 1 to 4 carbon atoms, an alkoxy group having 1 to 4 carbon atoms, and a dialkylamino group having 2 to 10 carbon atoms. A case where either of $B_1$ and $B_2$ is an aromatic hydrocarbon group in which the para position is substituted and the other one is an aromatic hydrocarbon group in which the ortho position or the meta position is substituted is more advantageous than a case where both $B_1$ and $B_2$ are aromatic hydrocarbon groups in which the para position is substituted in that the polymer has a structure having improved melting property. That is, all the four carbon atoms at the two ortho positions and the two meta positions may be unsubstituted, but it is also possible that the four carbon atoms are each substituted with a group selected from a halogen atom, an alkyl group having 1 to 4 carbon atoms, an alkoxy group having 1 to 4 carbon atoms, and a dialkylamino group having 2 to 10 carbon atoms. In addition, it is also possible that part of the four carbon atoms are unsubstituted, and the rest are each substituted with a group selected from a halogen atom, an alkyl group having 1 to 4 carbon atoms, an alkoxy group having 1 to 4 carbon atoms, and a dialkylamino group having 2 to 10 carbon atoms. When the carbon atoms are substituted in this way, the substituents may be the same or different. The alkyl group and the alkoxy group may be linear or branched. With such configuration, steric hindrance in the vicinity of the —$Z_1$=C—C=$Z_2$ structure can be controlled, and the polymer can be effectively fluidized and non-fluidized. In addition, the configuration is preferred because the melting point of the polymer can be controlled within a suitable range.

Therefore, according to a preferred embodiment of the present invention, examples of the structure of —$B_1$—$Z_1$=C—C=$Z_2$—$B_2$ in the group A of the general formula (1) include a structure represented by Structural Example 1.

[Chemical Formula 8]

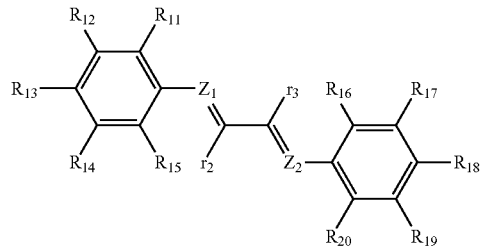

(Structural Example 1)

In the formula, $Z_1$ and $Z_2$ are each independently N or CH, and $Z_1 \neq Z_2$, $r_2$ and $r_3$ are each independently a hydrogen atom or an alkyl group having 1 to 2 carbon atoms, $R_{13}$ is a linking moiety with an oxygen atom or $r_4$ in the general formula (1), $R_{16}$ to $R_{20}$ are all hydrogen atoms, or $R_{18}$ is an alkyl group having 1 to 18 carbon atoms, an alkoxy group having 1 to 18 carbon atoms, or a dialkylamino group having 2 to 10 carbon atoms, preferably an alkyl group having 4 to 12 carbon atoms, an alkoxy group having 4 to 12 carbon atoms, or a dialkylamino group having 4 to 10 carbon atoms, and Rib, Rig, Rig, and $R_{20}$ are each independently a hydrogen atom, a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, or an alkoxycarbonyl group having 2 to 19 carbon atoms, and $R_{11}$, $R_{12}$, $R_{14}$, and $R_{15}$ are each independently a hydrogen atom, a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, or an alkoxycarbonyl group having 2 to 19 carbon atoms.

In Structural Example 1, it is more preferred that at least one of the following forms be satisfied:

$R_{11}$, $R_{12}$, $R_{14}$, and $R_{15}$ are each independently a hydrogen atom, a halogen atom, an alkyl group having 1 to 4 carbon atoms, an alkoxy group having 1 to 4 carbon atoms, or a dialkylamino group having 2 to 10 carbon atoms; and $R_{16}$, $R_{17}$, $R_{19}$, and $R_{20}$ are each independently a hydrogen atom, a halogen atom, an alkyl group having 1 to 4 carbon atoms, an alkoxy group having 1 to 4 carbon atoms, or a dialkylamino group having 2 to 10 carbon atoms.

A form in which $R_{11}$, $R_{12}$, $R_{14}$, and $R_{15}$ are all hydrogen atoms, or a form in which $R_{16}$, $R_{17}$, $R_{19}$, and $R_{20}$ are all hydrogen atoms is more preferred.

According to a preferred embodiment of the present invention, examples of the structure of —$B_1$—$Z_1$=C—C=$Z_2$—$B_2$ in the group A of the general formula (1) include a structure represented by Structural Example 2.

[Chemical Formula 9]

(Structural Example 2)

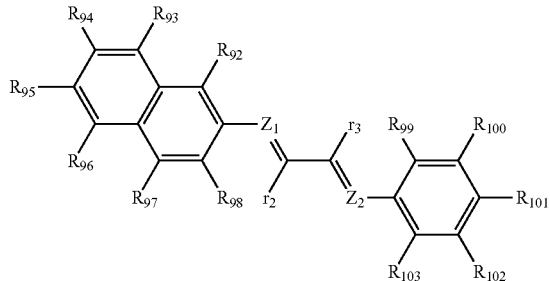

In the formula, $Z_1$, $Z_2$, $r_2$, and $r_3$ are the same as $Z_1$, $Z_2$, $r_2$, and $r_3$ in Structural Example 1, and $R_{99}$ to $R_{103}$ are the same as Rib to $R_{20}$ in Structural Example 1, $R_{95}$ is a linking moiety with an oxygen atom or $r_4$ in the general formula (1), and $R_{92}$ to $R_{94}$ and $R_{96}$ to $R_{98}$ are each independently a hydrogen atom, a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, or an alkoxycarbonyl group having 2 to 19 carbon atoms.

According to a preferred embodiment of the present invention, examples of the structure of —$B_1$—$Z_1$=C—C=$Z_2$—$B_2$ in the group A of the general formula (1) include a structure represented by Structural Example 3.

[Chemical Formula 10]

(Structural Example 3)

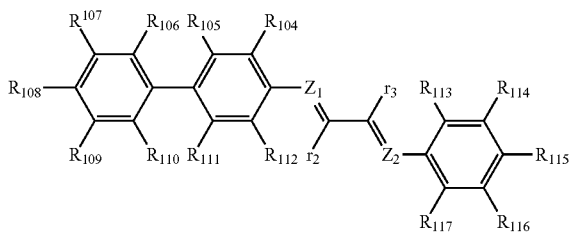

In the formula, $Z_1$, $Z_2$, $r_2$, and $r_3$ are the same as $Z_1$, $Z_2$, $r_2$, and $r_3$ in Structural Example 1, and $R_{113}$ to $R_{117}$ are the same as $R_{16}$ to $R_{20}$ in Structural Example 1, $R_{108}$ is a linking moiety with an oxygen atom or $r_4$ in the general formula (1), and $R_{104}$ to $R_{107}$ and $R_{109}$ to $R_{112}$ are each independently a hydrogen atom, a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, or an alkoxycarbonyl group having 2 to 19 carbon atoms.

According to another preferred embodiment of the present invention, in the general formula (1), $B_1$ is each independently a divalent aromatic hydrocarbon group in which $Z_1$ is in a para-position relationship with respect to an oxygen atom or $r_4$, and $B_2$ is each independently an unsubstituted monovalent aromatic heterocyclic group, or a monovalent aromatic heterocyclic group substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms. Unlike the aromatic hydrocarbon group, the aromatic heterocyclic group contains an atom other than carbon (such as O, N, and S) as an atom forming the ring. These atoms have an atomic radius larger than that of a carbon atom. Therefore, in this structure that is a moiety represented by the general formula (2) in which $B_1$ is an aromatic hydrocarbon group and $B_2$ is an aromatic heterocyclic group, planarity is disturbed more than in a moiety represented by the general formula (2) in which both $B_1$ and $B_2$ are aromatic hydrocarbon groups. Therefore, this structure is inferior in crystallinity to the moiety represented by the general formula (2) in which both $B_1$ and $B_2$ are aromatic hydrocarbon groups, but is advantageous in that it is excellent in melting property.

With such configuration, it is possible to increase the electron density of the propenimine moiety to increase the activation energy, and to effectively induce the phenomena of fluidization by light irradiation and reversible non-fluidization. In addition, the configuration induces generation of lattice defects, production of free volume, and reduction of the π-π interaction, which act favorably for cis-trans isomerization. Therefore, it is considered that cis-trans isomerization is more likely to proceed, and fluidization is more likely to occur. Here, the specific forms of the aromatic heterocyclic group and the substituents are similar to those described above.

When $B_1$ is a divalent aromatic hydrocarbon group in which $Z_1$ is in a para-position relationship with respect to an oxygen atom or $r_4$, the divalent aromatic hydrocarbon group has a long-chain substituent at the para position with respect to $Z_1$, so that crystals are easily disordered, the polymer has improved light melting property, and a toner containing the polymer has improved fixability.

Further, it is preferred that the monovalent aromatic heterocyclic group as $B_2$ be unsubstituted, or substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms. With such configuration, it is possible to increase the activation energy, and to effectively induce the phenomena of fluidization by light irradiation and reversible non-fluidization. In addition, the configuration induces generation of lattice defects, production of free volume, and reduction of the π-π interaction, which act favorably for cis-trans isomerization. Therefore, it is considered that cis-trans isomerization is more likely to proceed, and fluidization is more likely to occur.

In the embodiment in which $B_1$ is a divalent aromatic hydrocarbon group and $B_2$ is a monovalent aromatic heterocyclic group, $Z_1$ is preferably N and $Z_2$ is preferably CH. In this embodiment, the divalent aromatic hydrocarbon group as $B_1$ is preferably a substituted or unsubstituted phenylene group. The monovalent aromatic heterocyclic group as $B_2$ is preferably a substituted or unsubstituted thiophenyl group, a substituted or unsubstituted pyrrolyl group, a substituted or unsubstituted pyrazolyl group, or a substituted or unsubstituted imidazolyl group, and more preferably a substituted or unsubstituted thiophenyl group or a substituted or unsubstituted pyrrolyl group.

It is considered that in such a structural unit, the activation energy for isomerization from the cis isomer to the trans isomer is high and the rate of reversible non-fluidization is controlled, so that an adequate cis isomer is obtained.

According to a preferred embodiment of the present invention, examples of the structure of $-B_1-Z_1=C-C=Z_2-B_2$ in the group A of the general formula (1) include a structure represented by Structural Example 4.

[Chemical Formula 11]

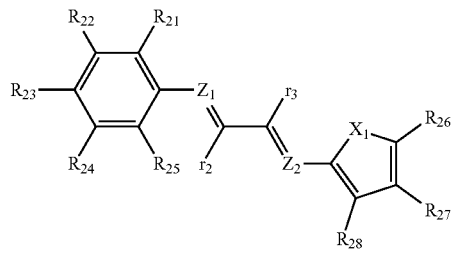

(Structural Example 4)

In the formula, $Z_1$ and $Z_2$ are each independently N or CH, and $Z_1 \ne Z_2$,
- $r_2$ and $r_3$ are each independently a hydrogen atom or an alkyl group having 1 to 2 carbon atoms,
- $R_{23}$ is a linking moiety with an oxygen atom or $r_4$ in the general formula (1),
- $X_1$ is S, O, or $NR'_{21}$ (preferably S or $NR'_{21}$), wherein $R'_{21}$ is a hydrogen atom, an alkyl group having 1 to 18 carbon atoms, or an alkoxycarbonyl group having 2 to 19 carbon atoms,
- $R_{26}$ to $R_{28}$ are each independently a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms, and
- $R_{21}$, $R_{22}$, $R_{24}$, and $R_{25}$ are each independently a hydrogen atom, a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, or an alkoxycarbonyl group having 2 to 19 carbon atoms.

According to a preferred embodiment of the present invention, other examples of the structure of $-B_1-Z_1=C-C=Z_2-B_2$ in the group A of the general formula (1) include a structure represented by Structural Example 5.

[Chemical Formula 12]

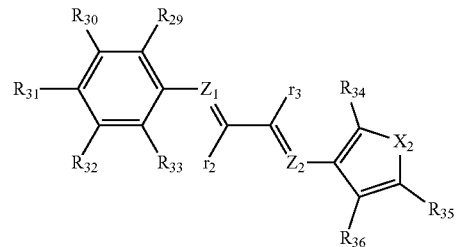

(Structural Example 5)

In the formula, $Z_1$, $Z_2$, $r_2$, and $r_3$ are the same as $Z_1$, $Z_2$, $r_2$, and $r_3$ in Structural Example 4, $X_2$ is the same as $X_1$ in Structural Example 4, and $R_{29}$ to $R_{33}$ are the same as $R_{21}$ to $R_{25}$ in Structural Example 4, and
- $R_{34}$ to $R_{36}$ are each independently a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms. In a more preferred embodiment, $R_{34}$ to $R_{36}$ are all hydrogen atoms.

According to a preferred embodiment of the present invention, other examples of the structure of $-B_1-Z_1=C-C=Z_2-B_2$ in the group A of the general formula (1) include a structure represented by Structural Example 6.

[Chemical Formula 13]

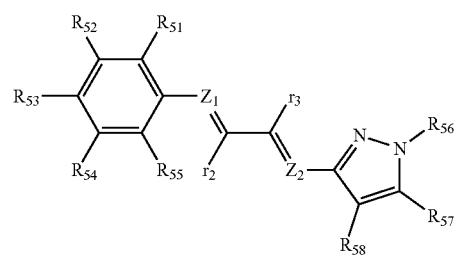

(Structural Example 6)

In the formula, $Z_1$, $Z_2$, $r_2$, and $r_3$ are the same as $Z_1$, $Z_2$, $r_2$, and $r_3$ in Structural Example 4, and $R_{51}$ to $R_{55}$ are the same as $R_{21}$ to $R_{25}$ in Structural Example 4, and
- $R_{56}$ to $R_{58}$ are each independently a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms. In a more preferred embodiment, $R_{56}$ to $R_{58}$ are all hydrogen atoms.

According to a preferred embodiment of the present invention, other examples of the structure of $-B_1-Z_1=C-C=Z_2-B_2$ in the group A of the general formula (1) include a structure represented by Structural Example 7.

[Chemical Formula 14]

(Structural Example 7)

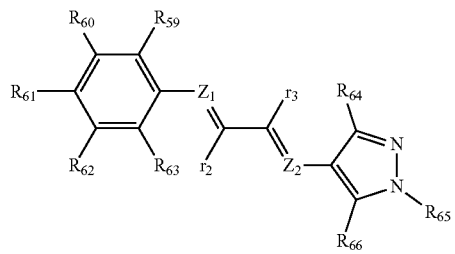

In the formula, $Z_1$, $Z_2$, $r_2$, and $r_3$ are the same as $Z_1$, $Z_2$, $r_2$, and $r_3$ in Structural Example 4, and $R_{59}$ to $R_{63}$ are the same as $R_{21}$ to $R_{25}$ in Structural Example 4, and $R_{64}$ to $R_{66}$ are each independently a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms. In a preferred embodiment, $R_{64}$ to $R_{66}$ are all hydrogen atoms.

According to a preferred embodiment of the present invention, other examples of the structure of —$B_1$—$Z_1$=C—C=$Z_2$—$B_2$ in the group A of the general formula (1) include a structure represented by Structural Example 8.

[Chemical Formula 15]

(Structural Example 8)

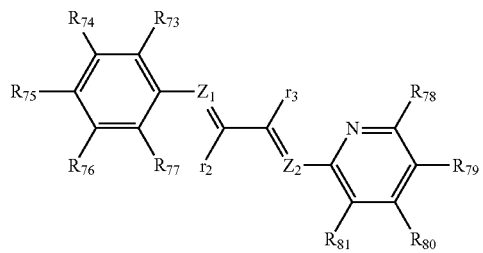

In the formula, $Z_1$, $Z_2$, $r_2$, and $r_3$ are the same as $Z_1$, $Z_2$, $r_2$, and $r_3$ in Structural Example 4, and $R_{73}$ to $R_{77}$ are the same as $R_{21}$ to $R_{25}$ in Structural Example 4, and $R_{78}$ to $R_{81}$ are each independently a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms. In a more preferred embodiment, $R_{78}$ to $R_{81}$ are all hydrogen atoms.

According to a preferred embodiment of the present invention, other examples of the structure of —$B_1$—$Z_1$=C—C=$Z_2$—$B_2$ in the group A of the general formula (1) include a structure represented by Structural Example 9.

[Chemical Formula 16]

(Structural Example 9)

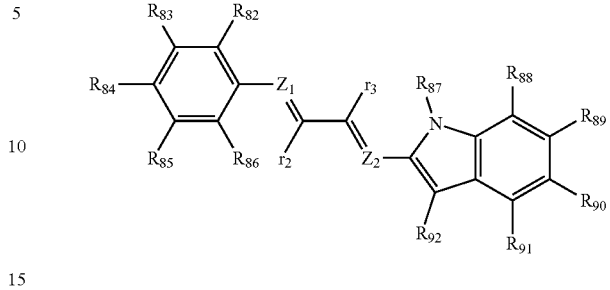

In the formula, $Z_1$, $Z_2$, $r_2$, and $r_3$ are the same as $Z_1$, $Z_2$, $r_2$, and $r_3$ in Structural Example 4, and $R_{82}$ to $R_{86}$ are the same as $R_{21}$ to $R_{25}$ in Structural Example 4, and $R_{87}$ to $R_{92}$ are each independently a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms. In a more preferred embodiment, $R_{87}$ to $R_{92}$ are all hydrogen atoms.

In still another preferred embodiment of the present invention, in the general formula (1), $B_1$ is a substituted or unsubstituted divalent aromatic heterocyclic group, and is bonded to an oxygen atom or $r_4$ at a position not adjacent to a bonding position with $Z_1$, and $B_2$ is each independently an unsubstituted monovalent aromatic hydrocarbon group, or a monovalent aromatic hydrocarbon group substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms. The reason why $B_1$ is preferably an aromatic heterocyclic group is similar to the reason described in Structural Example 3. From the viewpoint of further improving the light melting property, $B_1$ is more preferably a divalent aromatic heterocyclic group substituted with an alkyl group having 4 to 12 carbon atoms, an alkoxy group having 4 to 12 carbon atoms, or a dialkylamino group having 4 to 10 carbon atoms. Here, the specific forms of the aromatic heterocyclic group and the substituents are similar to those described above.

In this case, $B_2$ is preferably a monovalent aromatic hydrocarbon group substituted with a halogen atom, a cyano group, a nitro group, an alkyl group having 1 to 18 carbon atoms, an alkoxy group having 1 to 18 carbon atoms, or a dialkylamino group having 2 to 10 carbon atoms. The configuration induces generation of lattice defects, production of free volume, and reduction of the π-π interaction, which act favorably for cis-trans isomerization. Therefore, it is considered that cis-trans isomerization is more likely to proceed, and fluidization is more likely to occur.

In the embodiment in which $B_1$ is an aromatic heterocyclic group and $B_2$ is an aromatic hydrocarbon group, $Z_1$ is preferably CH and $Z_2$ is preferably N. In this embodiment, the divalent aromatic heterocyclic group as $B_1$ is preferably a group having a substituted or unsubstituted thiophene ring, pyrrole ring, pyrazole ring, or imidazole ring, and more preferably a group having a substituted or unsubstituted thiophene ring or pyrrole ring. The monovalent aromatic hydrocarbon group as $B_2$ is preferably a substituted or unsubstituted phenyl group.

In such a structural unit, the activation energy for isomerization from the cis isomer to the trans isomer is set high and the rate of reversible non-fluidization is controlled, so that an adequate cis isomer is obtained. Moreover, the polymer has a smaller molar extinction coefficient in a solution than in the case where both $B_1$ and $B_2$ have a six-membered ring structure, and thus light reaches deeper when applied. Therefore, this case is considered to be advantageous for inducing fluidization because when the polymer is used in a toner, it is possible to melt, by light, not only the upper layer but also the lower layer of the toner.

According to a preferred embodiment of the present invention, other examples of the structure of —$B_1$—$Z_1$=C—C=$Z_2$—$B_2$— in the group A of the general formula (1) include a structure represented by Structural Example 10.

[Chemical Formula 17]

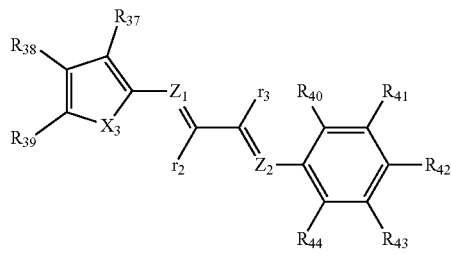

(Structural Example 10)

In the formula, $Z_1$, $Z_2$, $r_2$, and $r_3$ are the same as $Z_1$, $Z_2$, $r_2$, and $r_3$ in Structural Example 1, $X_3$ is the same as $X_1$ in Structural Example 4, and $R_{40}$ to $R_{44}$ are the same as $R_{16}$ to $R_{20}$ in Structural Example 1, $R_{38}$ and $R_{39}$ are each independently a linking moiety with an oxygen atom or $r_4$ in the general formula (1), or a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms, and either of $R_{38}$ and $R_{39}$ is a linking moiety with an oxygen atom or $r_4$ in the general formula (1), and $R_{37}$ is a hydrogen atom, a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

In still another preferred embodiment of the present invention, in the general formula (1), $B_1$ is each independently a substituted or unsubstituted divalent aromatic heterocyclic group, and is bonded to an oxygen atom or $r_4$ at a position not adjacent to a bonding position with $Z_1$, and $B_2$ is each independently an unsubstituted monovalent aromatic heterocyclic group, or a monovalent aromatic heterocyclic group substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms. The reason why an aromatic heterocyclic group is preferred is similar to the reason described in Structural Example 3. Here, the aromatic heterocyclic groups as constituents of $B_1$ and $B_2$ may have the same ring structure or different ring structures.

$B_1$ is preferably a divalent aromatic heterocyclic group having at least one substituent selected from the group consisting of an alkyl group having 1 to 18 carbon atoms, an alkoxy group having 1 to 18 carbon atoms, and a dialkylamino group having 2 to 10 carbon atoms. With such configuration, the polymer is effectively fluidized and non-fluidized. In addition, the melting point of the polymer can be controlled within a suitable range.

From the viewpoint of further improving the light melting property, it is more preferred that at least one of $B_1$ and $B_2$ be substituted with an alkyl group having 4 to 12 carbon atoms, an alkoxy group having 4 to 12 carbon atoms, or a dialkylamino group having 4 to 10 carbon atoms.

The specific forms of the aromatic heterocyclic groups as constituents of $B_1$ and $B_2$ and the substituents are similar to those described above.

In this embodiment, it is particularly preferred that the aromatic heterocyclic groups as $B_1$ and $B_2$ be each independently a group having a substituted or unsubstituted thiophene ring, a substituted or unsubstituted pyrrole ring, a substituted or unsubstituted pyrazole ring, or a substituted or unsubstituted imidazole ring.

According to a preferred embodiment of the present invention, examples of the structure of —$B_1$—$Z_1$=C—C=$Z_2$—$B_2$ in the group A of the general formula (1) include a structure represented by Structural Example 11.

[Chemical Formula 18]

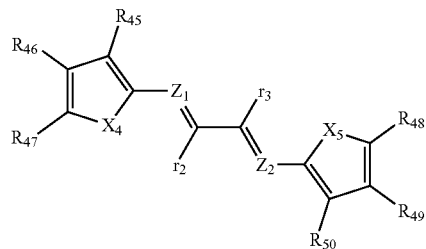

(Structural Example 11)

In the formula, $Z_1$, $Z_2$, $r_2$, and $r_3$ are the same as $Z_1$, $Z_2$, $r_2$, and $r_3$ in Structural Example 4, $X_4$ and $X_5$ are each independently the same as $X_1$ in Structural Example 4, $R_{48}$ to $R_{50}$ are the same as $R_{26}$ to $R_{28}$ in Structural Example 4, and $R_{45}$ to $R_{47}$ are the same as $R_{37}$ to $R_{39}$ in Structural Example 10.

According to a preferred embodiment of the present invention, examples of the structure of —$B_1$—$Z_1$=C—C=$Z_2$—$B_2$ in the group A of the general formula (1) include a structure represented by Structural Example 12.

[Chemical Formula 19]

(Structural Example 12)

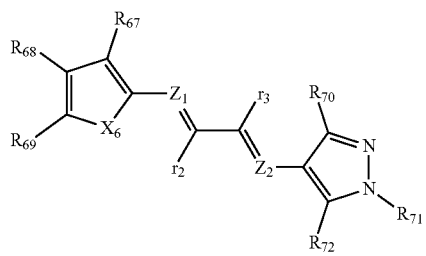

In the formula, $Z_1$, $Z_2$, $r_2$, and $r_3$ are the same as $Z_1$, $Z_2$, $r_2$, and $r_3$ in Structural Example 4, $X_6$ is the same as $X_1$ in Structural Example 4, $R_{70}$ to $R_{72}$ are the same as $R_{26}$ to $R_{28}$ in Structural Example 4, and $R_{67}$ to $R_{69}$ are the same as $R_{37}$ to $R_{39}$ in Structural Example 10.

In the polymer of the present invention, the structural unit represented by the general formula (1) may be used alone or in combination of two or more.

Specific examples of the structural unit represented by the general formula (1) include structural units shown in Tables 1-1 to 1-12 shown below.

TABLE 1-1

(Structural unit contained in polymer)

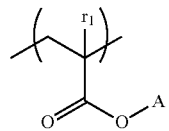

(Structure of propenimine structure-containing group A) General formula (2-a) General formula (2-b) General formula (2-c)

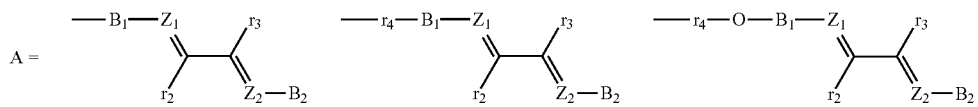

(Structure of $B_1$—$Z_1$=C—C=$Z_2$—$B_2$) (Structural Example 1)

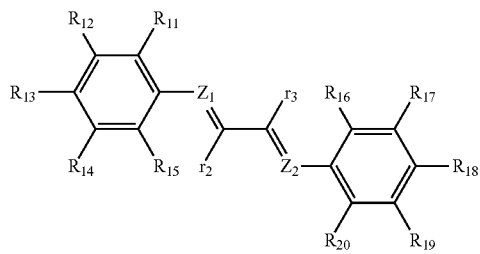

| Structural unit No. | $r_1$ | A | $r_2$ | $r_3$ | Number of carbon atoms of $r_4$ | Substitution position of $B_1$ | $Z_1$ | $Z_2$ | $R_{11}$ | $R_{12}$ | $R_{13}$ | $R_{14}$ | $R_{15}$ | $R_{16}$ | $R_{17}$ | $R_{18}$ | $R_{19}$ | $R_{20}$ |
|---|---|---|---|---|---|---|---|---|---|---|---|---|---|---|---|---|---|---|
| 1 | H | 2-c | H | H | 10 | $R_{13}$ | N | CH | H | H | — | H | H | H | H | $C_6H_{13}$ | H | H |
| 2 | H | 2-c | H | H | 10 | $R_{13}$ | N | CH | H | H | — | H | H | H | H | $C_{10}H_{21}$ | H | H |
| 3 | H | 2-c | H | H | 10 | $R_{13}$ | N | CH | H | H | — | H | H | H | H | $OC_6H_{13}$ | H | H |
| 4 | H | 2-c | H | H | 10 | $R_{13}$ | N | CH | H | H | — | H | H | H | H | $N(C_2H_5)_2$ | H | H |
| 5 | H | 2-c | H | H | 10 | $R_{13}$ | N | CH | H | H | — | H | H | H | $CH_3$ | $C_6H_{13}$ | H | H |
| 6 | H | 2-c | H | H | 6 | $R_{13}$ | N | CH | H | H | — | H | H | H | H | $C_6H_{13}$ | H | H |
| 7 | H | 2-c | H | H | 10 | $R_{13}$ | CH | N | H | H | — | H | H | H | H | $C_6H_{13}$ | H | H |
| 8 | H | 2-b | H | H | 10 | $R_{13}$ | N | CH | H | H | — | H | H | H | H | $C_6H_{13}$ | H | H |
| 9 | H | 2-c | $CH_3$ | H | 10 | $R_{13}$ | N | CH | H | H | — | H | H | H | H | $C_6H_{13}$ | H | H |
| 10 | $CH_3$ | 2-c | H | H | 10 | $R_{13}$ | N | CH | H | H | — | H | H | H | H | $C_6H_{13}$ | H | H |
| 11 | H | 2-c | H | H | 10 | $R_{12}$ | N | CH | H | — | H | H | H | H | H | $C_6H_{13}$ | H | H |
| 12 | H | 2-a | H | H | — | $R_{13}$ | N | CH | H | — | H | H | H | H | H | $C_6H_{13}$ | H | H |

TABLE 1-2

(Structure of $B_1-Z_1=C-C=Z_2-B_2$) (Structural Example 4)

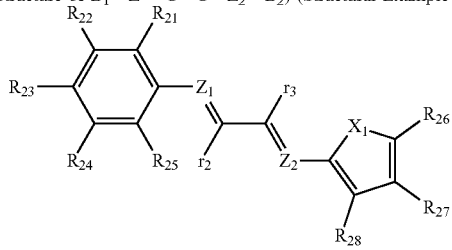

| Structural unit No. | $r_1$ | A | $r_2$ | $r_3$ | Number of carbon atoms of $r_4$ | Substitution position of $B_1$ | $Z_1$ | $Z_2$ | $X_1$ | $B_1$ $R_{21}$ | $R_{22}$ | $R_{23}$ | $R_{24}$ | $R_{25}$ | $B_2$ $R_{26}$ | $R_{27}$ | $R_{28}$ |
|---|---|---|---|---|---|---|---|---|---|---|---|---|---|---|---|---|---|
| 13 | H | 2-c | H | H | 10 | $R_{23}$ | N | CH | S | H | H | — | H | H | $CH_3$ | H | H |
| 14 | H | 2-c | H | H | 10 | $R_{23}$ | N | CH | S | H | H | — | H | H | $C_6H_{13}$ | H | H |
| 15 | H | 2-c | H | H | 10 | $R_{23}$ | N | CH | S | H | H | — | H | H | $OCH_3$ | H | H |
| 16 | H | 2-c | H | H | 10 | $R_{23}$ | N | CH | S | H | H | — | H | H | H | $CH_3$ | H |
| 17 | H | 2-c | H | H | 10 | $R_{23}$ | N | CH | NH | H | H | — | H | H | $CH_3$ | H | H |
| 18 | H | 2-c | H | H | 10 | $R_{23}$ | N | CH | $NCH_3$ | H | H | — | H | H | H | H | H |
| 19 | H | 2-c | H | H | 10 | $R_{23}$ | N | CH | O | H | H | — | H | H | $CH_3$ | H | H |

TABLE 1-3

(Structure of $B_1-Z_1=C-C=Z_2-B_2$) (Structural Example 5)

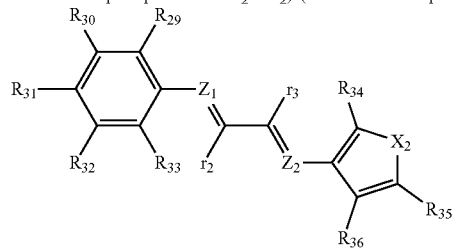

| Structural unit No. | $r_1$ | A | $r_2$ | $r_3$ | Number of carbon atoms of $r_4$ | Substitution position of $B_1$ | $Z_1$ | $Z_2$ | $X_2$ | $B_1$ $R_{29}$ | $R_{30}$ | $R_{31}$ | $R_{32}$ | $R_{33}$ | $B_2$ $R_{34}$ | $R_{35}$ | $R_{36}$ |
|---|---|---|---|---|---|---|---|---|---|---|---|---|---|---|---|---|---|
| 20 | H | 2-c | H | H | 10 | $R_{31}$ | N | CH | S | H | H | — | H | H | H | $CH_3$ | H |

TABLE 1-4

(Structure of $B_1-Z_1=C-C=Z_2-B_2$) (Structural Example 10)

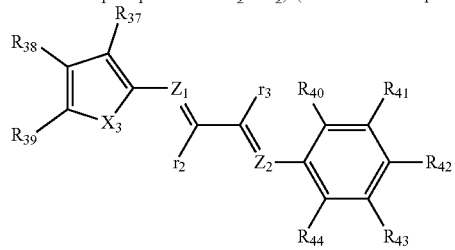

| Structural unit No. | $r_1$ | A | $r_2$ | $r_3$ | Number of carbon atoms of $r_4$ | Substitution position of $B_1$ | $Z_1$ | $Z_2$ | $X_3$ | $B_1$ $R_{37}$ | $R_{38}$ | $R_{39}$ | $B_2$ $R_{40}$ | $R_{41}$ | $R_{42}$ | $R_{43}$ | $R_{44}$ |
|---|---|---|---|---|---|---|---|---|---|---|---|---|---|---|---|---|---|
| 21 | H | 2-b | H | H | 10 | $R_{38}$ | CH | N | S | H | H | — | H | H | $C_6H_{13}$ | H | H |

TABLE 1-5

(Structure of $B_1$—$Z_1$=C—C=$Z_2$—$B_2$) (Structural Example 11)

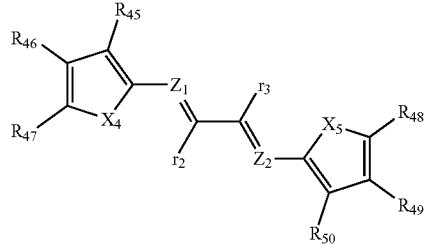

| Structural unit No. | $r_1$ | A | $r_2$ | $r_3$ | Number of carbon atoms of $r_4$ | Substitution position of $B_1$ | $Z_1$ | $Z_2$ | $X_4$ | $X_5$ | $B_1$ $R_{45}$ | $R_{46}$ | $R_{47}$ | $B_2$ $R_{48}$ | $R_{49}$ | $R_{50}$ |
|---|---|---|---|---|---|---|---|---|---|---|---|---|---|---|---|---|
| 22 | H | 2-b | H | H | 10 | $R_{47}$ | N | CH | S | S | H | H | — | $CH_3$ | H | H |
| 23 | H | 2-b | H | H | 10 | $R_{47}$ | N | CH | NH | S | H | H | — | $CH_3$ | H | H |

TABLE 1-6

(Structure of $B_1$—$Z_1$=C—C=$Z_2$—$B_2$) (Structural Example 6)

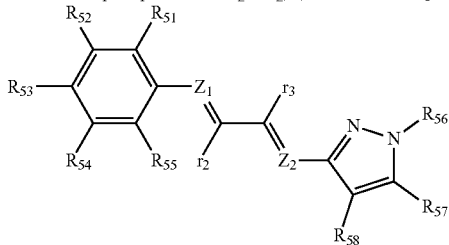

| Structural unit No. | $r_1$ | A | $r_2$ | $r_3$ | Number of carbon atoms of $r_4$ | Substitution position of $B_1$ | $Z_1$ | $Z_2$ | $B_1$ $R_{51}$ | $R_{52}$ | $R_{53}$ | $R_{54}$ | $R_{55}$ | $B_2$ $R_{56}$ | $R_{57}$ | $R_{58}$ |
|---|---|---|---|---|---|---|---|---|---|---|---|---|---|---|---|---|
| 24 | H | 2-c | H | H | 10 | $R_{53}$ | N | CH | H | H | — | H | H | $CH_3$ | H | H |

TABLE 1-7

(Structure of $B_1$—$Z_1$=C—C=$Z_2$—$B_2$) (Structural Example 7)

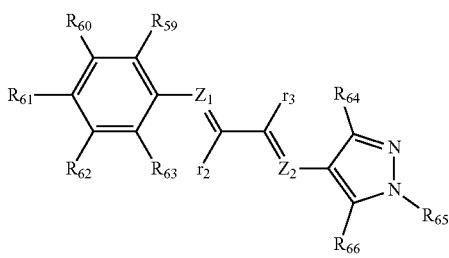

| Structural unit No. | $r_1$ | A | $r_2$ | $r_3$ | Number of carbon atoms of $r_4$ | Substitution position of $B_1$ | $Z_1$ | $Z_2$ | $B_1$ $R_{59}$ | $R_{60}$ | $R_{61}$ | $R_{62}$ | $R_{63}$ | $B_2$ $R_{64}$ | $R_{65}$ | $R_{66}$ |
|---|---|---|---|---|---|---|---|---|---|---|---|---|---|---|---|---|
| 25 | H | 2-c | H | H | 10 | $R_{61}$ | N | CH | H | H | — | H | H | H | $CH_3$ | H |

TABLE 1-8

(Structure of $B_1$—$Z_1$=C—C=$Z_2$—$B_2$) (Structural Example 12)

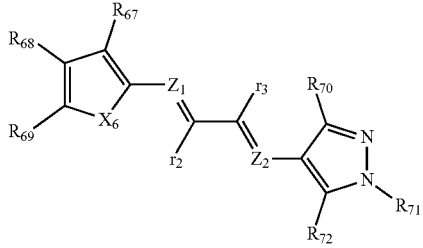

| Structural unit No. | $r_1$ | A | $r_2$ | $r_3$ | Number of carbon atoms of $r_4$ | Substitution position of $B_1$ | $Z_1$ | $Z_2$ | $X_6$ | $B_1$ $R_{67}$ | $R_{68}$ | $R_{69}$ | $B_2$ $R_{70}$ | $R_{71}$ | $R_{72}$ |
|---|---|---|---|---|---|---|---|---|---|---|---|---|---|---|---|
| 26 | H | 2-c | H | H | 10 | $R_{68}$ | CH | N | S | H | H | — | H | $CH_3$ | H |

TABLE 1-9

(Structure of $B_1$—$Z_1$=C—C=$Z_2$—$B_2$) (Structural Example 8)

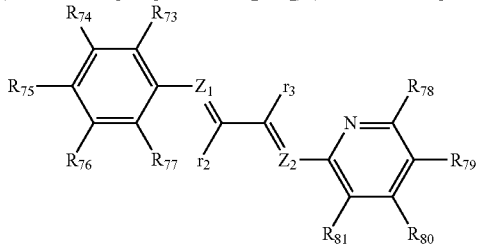

| Structural unit No. | $r_1$ | A | $r_2$ | $r_3$ | Number of carbon atoms of $r_4$ | Substitution position of $B_1$ | $Z_1$ | $Z_2$ | $R_{73}$ | $R_{74}$ | $B_1$ $R_{75}$ | $R_{76}$ | $R_{77}$ | $R_{78}$ | $R_{79}$ | $B_2$ $R_{80}$ | $R_{81}$ |
|---|---|---|---|---|---|---|---|---|---|---|---|---|---|---|---|---|---|
| 27 | H | 2-c | H | H | 10 | $R_{75}$ | N | CH | H | H | — | H | H | H | $C_6H_{13}$ | H | H |

TABLE 1-10

(Structure of $B_1$—$Z_1$=C—C=$Z_2$—$B_2$) (Structural Example 9)

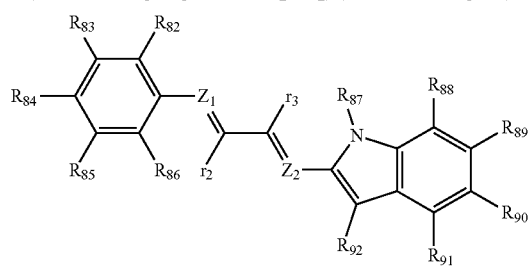

| Structural unit No. | $r_1$ | A | $r_2$ | $r_3$ | Number of carbon atoms of $r_4$ | Substitution position of $B_1$ | $Z_1$ | $Z_2$ | $R_{82}$ | $R_{83}$ | $B_1$ $R_{84}$ | $R_{85}$ | $R_{86}$ | $R_{87}$ | $R_{88}$ | $R_{89}$ | $B_2$ $R_{90}$ | $R_{91}$ | $R_{92}$ |
|---|---|---|---|---|---|---|---|---|---|---|---|---|---|---|---|---|---|---|---|
| 28 | H | 2-c | H | H | 10 | $R_{84}$ | N | CH | H | H | — | H | H | $CH_3$ | H | H | H | H | H |

TABLE 1-11

(Structure of $B_1$—$Z_1$=C—C=$Z_2$—$B_2$) (Structural Example 2)

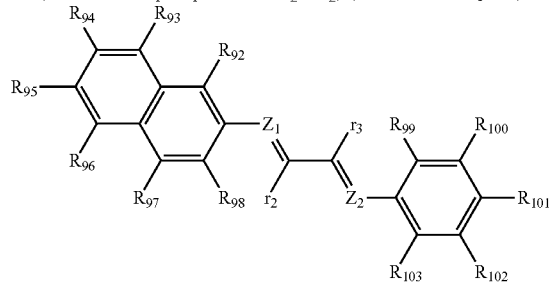

| Structural unit No. | $r_1$ | A | $r_2$ | $r_3$ | Number of carbon atoms of $r_4$ | Substitution position of $B_1$ | $Z_1$ | $Z_2$ | $B_1$ | | | | | | | $B_2$ | | | | |
|---|---|---|---|---|---|---|---|---|---|---|---|---|---|---|---|---|---|---|---|---|
| | | | | | | | | | $R_{92}$ | $R_{93}$ | $R_{94}$ | $R_{95}$ | $R_{96}$ | $R_{97}$ | $R_{98}$ | $R_{99}$ | $R_{100}$ | $R_{101}$ | $R_{102}$ | $R_{103}$ |
| 29 | H | 2-c | H | H | 10 | $R_{95}$ | N | CH | H | H | H | — | H | H | H | H | $C_6H_{13}$ | H | H |

TABLE 1-12

(Structure of $B_1$—$Z_1$=C—C=$Z_2$—$B_2$) (Structural Example 3)

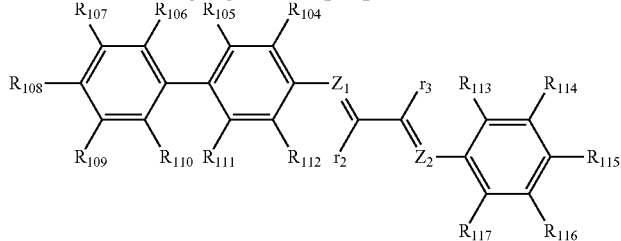

| Structural unit No. | $r_1$ | A | $r_2$ | $r_3$ | Number of carbon atoms of $r_4$ | Substitution position of $B_1$ | $Z_1$ | $Z_2$ | $B_1$ | | | | | | | | | | $B_2$ | | | | | |
|---|---|---|---|---|---|---|---|---|---|---|---|---|---|---|---|---|---|---|---|---|---|---|---|---|
| | | | | | | | | | $R_{104}$ | $R_{105}$ | $R_{106}$ | $R_{107}$ | $R_{108}$ | $R_{109}$ | $R_{110}$ | $R_{111}$ | $R_{112}$ | $R_{113}$ | $R_{114}$ | $R_{115}$ | $R_{116}$ | $R_{117}$ |
| 30 | H | 2-c | H | H | 10 | $R_{108}$ | N | CH | H | H | H | H | — | H | H | H | H | H | H | $C_6H_{13}$ | H | H |

<Method for Preparing Polymerizable Group-Containing Propenimine Derivative>

A method for preparing a polymerizable group-containing propenimine derivative is not particularly limited. For example, the polymerizable group-containing propenimine derivative can be prepared by providing a desired propenimine derivative, and introducing a polymerizable group into the obtained propenimine derivative.

For example, in the case of preparing a propenimine derivative containing a benzene ring, as a first stage, an aniline derivative is reacted with a phenylpropanal derivative as a compound having a benzene ring. In this case, when either of the aniline derivative and the phenylpropanal derivative as raw materials has an OH group as a substituent, a polymerizable group can be easily introduced at the position of the OH group.

For example, in the case of a propenimine derivative in which, in the general formula (1), $Z_1$ is N, $Z_2$ is CH, $B_1$ is a phenylene group in which a polymerizable group is introduced at a para position with respect to $Z_1$, and $B_2$ is a hexylphenyl group and has a phenylene group bonded to $Z_2$ at a para position with respect to a hexyl group, an intermediate A can be obtained by a reaction formula shown below.

Specifically, 4-aminophenol and 3-(4-hexylphenyl)-2-propenal are reacted by heating and refluxing in methanol (MeOH), the resulting reaction liquid is filtered, and the resulting powder is washed with cooled ethanol. Then, the resulting product is recrystallized with a methanol/ethanol mixed solvent to give the target intermediate A.

[Chemical Formula 20]

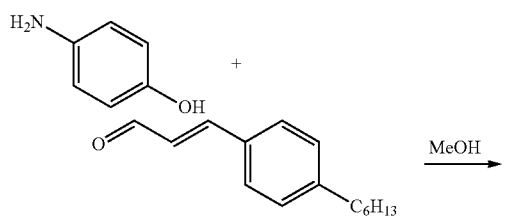

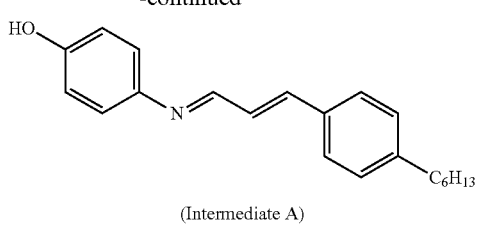

(Intermediate A)

Then, as a second stage, a polymerizable group is introduced into the intermediate A. The method for introducing a polymerizable group is also not particularly limited. For example, in the case of introducing a linker moiety —$C_{10}H_{20}$— into the intermediate A, Cl—$C_{10}H_{20}$—OH (10-chloro-1-decanol), for example, as a halogenated alcohol compound is acted on the intermediate A to give an intermediate B shown below.

The reaction conditions are not particularly limited, but for example, the components are reacted in the presence of potassium carbonate and potassium iodide in a solvent such as N,N-dimethylformamide (DMF) at a temperature preferably in the range of 50° C. or more and 170° C. or less, more preferably in the range of 70° C. or more and 150° C. or less, and still more preferably in the range of 90° C. or more and 130° C. or less.

[Chemical Formula 21]

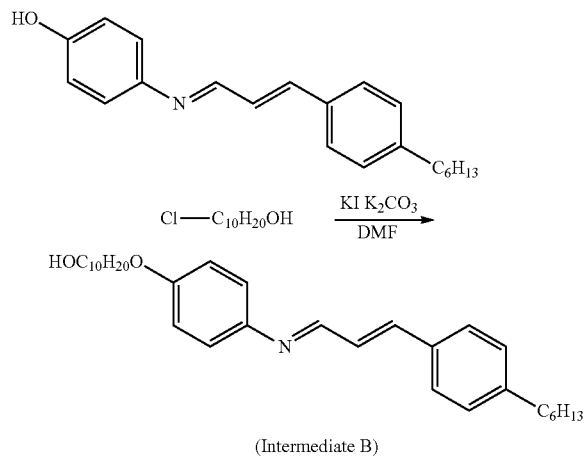

(Intermediate B)

Then, as a third stage, a compound for forming a polymerizable group, for example, an acrylic acid chloride or a methacrylic acid chloride is reacted with the intermediate B. The reaction is not particularly limited, and the components are reacted, for example, in a known organic solvent in the presence of a tertiary amine such as triethylamine or triethanolamine. Preferably, the compound for forming a polymerizable group, such as an acrylic acid chloride or a methacrylic acid chloride, is added dropwise to a mixed liquid containing the intermediate B, the tertiary amine, and a solvent with the mixed liquid being maintained at 0 to 10° C., and the resulting mixture is mixed. Then, the mixed liquid is reacted, for example, at room temperature for about 5 to 10 hours, whereby a polymerizable group-containing propenimine derivative is obtained.

[Chemical Formula 22]

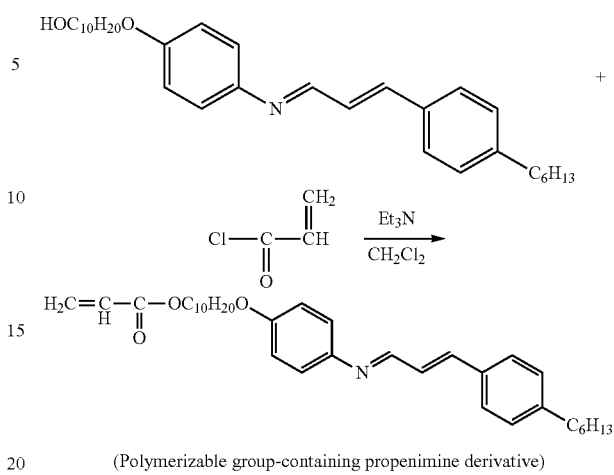

(Polymerizable group-containing propenimine derivative)

The raw materials used in the first stage may be changed to other compounds to give a propenimine derivative having a desired substituent. For example, an aniline derivative may be reacted with a thienylpropanal derivative to give a propenimine derivative in which, in the general formula (1), $Z_1$ is N, $Z_2$ is CH, $B_1$ is a phenylene group, and $B_2$ is a thienyl group. In place of the compound having a thiophene ring, other aromatic hydrocarbon compounds or aromatic heterocyclic compounds may be used as a raw material to give a propenimine derivative having a different structure of $B_2$. Similarly, the aniline derivative as a raw material may be changed to other aromatic hydrocarbon compounds or aromatic heterocyclic compounds having an amino group to give a propenimine derivative having a different structure of $B_1$.

In addition, a phenylpropanal derivative may be reacted with an aminothiophene derivative to give a propenimine derivative in which, in the general formula (1), $Z_1$ is CH, $Z_2$ is N, $B_1$ is a thionylene group, and $B_2$ is a phenyl group. In addition, in place of the compound having a thiophene ring, other aromatic hydrocarbon compounds or aromatic heterocyclic compounds may be used as a raw material to give a propenimine derivative having a different structure of $B_1$. Similarly, the aminothiophene derivative as a raw material may be changed to other aromatic hydrocarbon compounds or aromatic heterocyclic compounds having an amino group to give a propenimine derivative having a different structure of $B_2$.

In addition, the compounds added in the second and third stages may be changed to introduce a polymerizable group-containing group having a different structure. A person skilled in the art can synthesize a propenimine derivative having a desired polymerizable group by appropriately making the above-mentioned changes and selecting appropriate reaction conditions.

In the case of a propenimine derivative having the structure of the general formula (2-a) or (2-b), a polymerizable group can be introduced into the intermediate A without the second stage by appropriately selecting the raw materials used in the first stage.

<Structural Unit Other than Structural Unit Containing Propenimine Structure-Containing Group>

The polymer of the present invention may contain a different structural unit other than the structural unit represented by the general formula (1). In the case where the polymer is a copolymer containing the different structural unit, the form of arrangement of repeating units in the copolymer is also not particularly limited, and the copolymer may be any of a random copolymer, a block copolymer, and an alternating copolymer.

The different structural unit is preferably a structural unit that does not contain the propenimine structure, and more preferably a structural unit that forms a thermoplastic resin softened by heating.

The different structural unit preferably has a vinyl-based polymerizable group for the ease of synthesis of the copolymer. Specifically, for example, a structural unit derived from a styrene derivative, a (meth)acrylic acid derivative, an olefin derivative, a vinyl ester derivative, a vinyl ether derivative, a vinyl ketone derivative, or the like is used. A structural unit derived from a styrene derivative, a (meth) acrylic acid derivative, or an olefin derivative is preferred.

Examples of the styrene derivative include styrene, o-methylstyrene, m-methylstyrene, p-methylstyrene, α-methylstyrene, p-phenylstyrene, p-ethylstyrene, 2,4-dimethylstyrene, p-t-butylstyrene, p-n-hexylstyrene, p-n-octylstyrene, p-n-nonylstyrene, p-n-decylstyrene, and p-n-dodecylstyrene.

Examples of the (meth)acrylic acid derivative include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-hexyl (meth)acrylate, n-octyl (meth)acrylate, 2-ethylhexyl (meth)acrylate, stearyl (meth)acrylate, dodecyl (meth)acrylate, phenyl (meth)acrylate, diethylaminoethyl (meth)acrylate, and dimethylaminoethyl (meth) acrylate.

Examples of the olefin derivative include ethylene, propylene, n-butylene, isobutylene, n-pentene, and 3-methyl-1-pentene. The olefin derivative may be linear or branched, and the number of carbon atoms is not particularly limited.

Examples of the vinyl ester derivative include vinyl propionate, vinyl acetate, and vinyl benzoate. Examples of the vinyl ether derivative include vinyl methyl ether and vinyl ethyl ether. Examples of the vinyl ketone derivative include vinyl methyl ketone, vinyl ethyl ketone, and vinyl hexyl ketone.

The content of the different structural unit in the polymer is not particularly limited, and may be appropriately selected, but is preferably 70 mass % or less, and more preferably 40 mass % or less based on 100 mass % in total of all the structural units forming the polymer.

The number average molecular weight Mn of the polymer of the present invention is not particularly limited, but is preferably 3,500 or more, more preferably 3,500 or more and 100,000 or less, still more preferably 3,500 or more and 70,000 or less, still more preferably 3,500 or more and 50,000 or less, and particularly preferably 5,000 or more and 50,000 or less. A number average molecular weight of the polymer of 3,500 or more is preferred because the polymer has excellent toughness, and a toner containing the polymer provides a toner image having excellent fixability more easily. In addition, a number average molecular weight of 100,000 or less is preferred because the polymer is efficiently isomerized as well as softened and melted.

The number average molecular weight of the polymer of the present invention can be measured by gel permeation chromatography (GPC). Specifically, the number average molecular weight can be measured by the method described in the section of Examples described later.

<Method for Preparing Polymer>

The method for synthesizing the polymer of the present invention is not particularly limited, and it is possible to employ a method of polymerizing the above-mentioned polymerizable group-containing propenimine derivative as a monomer using a known polymerization initiator, such as anionic polymerization, cationic polymerization, or living radical polymerization. A known chain transfer agent may be used as necessary.

Examples of the polymerization initiator include azo or diazo polymerization initiators and peroxide polymerization initiators described below.

Examples of the azo or diazo polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile (AIBN).

Examples of the peroxide polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, and tris-(t-butylperoxy)triazine.

Examples of the chain transfer agent include benzyl dithiobenzoate, 1-phenylethyl dithiobenzoate, 2-phenylprop-2-yl dithiobenzoate, 1-acetoxylethyl dithiobenzoate, hexakis(thiobenzoylthiomethyl)benzene, 1,4-bis(thiobenzoylthiomethyl)benzene, 1,2,4,5-tetrakis(thiobenzoylthiomethyl)benzene, 1,4-bis-(2-(thiobenzoylthio)prop-2-yl)benzene, 1-(4-methoxyphenyl)ethyl dithiobenzoate, and benzyl dithioacetate; and ethoxycarbonylmethyl dithioacetate, 2-(ethoxycarbonyl)prop-2-yl dithiobenzoate, 2-cyanoprop-2-yl dithiobenzoate, t-butyl dithiobenzoate, 2,4,4-trimethylpent-2-yl dithiobenzoate, 2-(4-chlorophenyl)prop-2-yl dithiobenzoate, 3- and 4-vinylbenzyl dithiobenzoate, S-benzyldiethoxyphosphinyl dithioformate, t-butyltrithioperbenzoate, 2-phenylprop-2-yl 4-chlorodithiobenzoate, 2-phenylprop-2-yl 1-dithionaphthalate, 4-cyanopentanoic acid dithiobenzoate, dibenzyl tetrathioterephthalate, dibenzyl trithiocarbonate, and carboxymethyl dithiobenzoate.

The polymerization temperature varies depending on the type of the monomers and polymerization initiator used, but is preferably 50° C. or more and 100° C. or less, and more preferably 55° C. or more and 90° C. or less. The polymerization time varies depending on the type of the monomers and polymerization initiator used, but is preferably 2 hours or more and 60 hours or less, for example.

The method for preparing the copolymer containing the different structural unit other than the structural unit represented by the general formula (1) is also not particularly limited.

For example, in the case of preparing a random copolymer, a desired copolymer can be obtained by mixing, as raw material monomers, a monomer for forming the structural unit represented by the general formula (1) and a monomer for forming the different structural unit with a chain transfer agent, a polymerization initiator, and the like, and polymerizing the resulting mixture. The specific form of the monomer for forming the different structural unit is as described above.

The polymer according to a preferred embodiment of the present invention is a polymer represented by a general formula (3) shown below.

[Chemical Formula 23]

General formula (3)

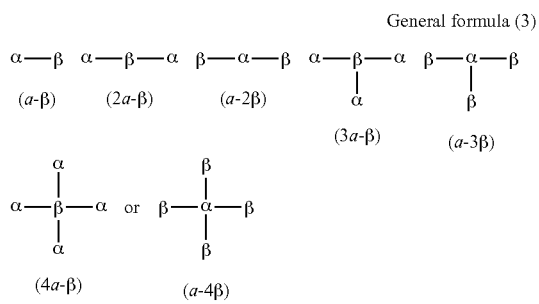

In the general formula (3), α is a polymer block containing the structural unit represented by the general formula (1), and β is a polymer block not containing a propenimine structure ($B_1$—$Z_1$=C—C=$Z_2$—$B_2$).

In the polymer of the present invention, as a result of increase of the molecular weight of the propenimine derivative, the portion of the propenimine structure absorbs light, and thermal energy released in a process of photoexcitation/deactivation is transmitted to a bonded repeating unit (structural unit) (photothermal conversion), so that melting or softening proceeds. In addition, it is considered that formation of a block copolymer facilitates formation of a domain from the portion of the propenimine structure in the polymer, and efficiently induces softening and melting. Therefore, the effects of the present invention are more remarkably obtained.

From the viewpoint of ease of softening and melting and image intensity provided by a toner containing the block copolymer, among the above-mentioned block copolymer structures, a block copolymer structure of α-β-α (also represented as 2α-β) or β-α-β (also represented as 2β-α) is preferred, and a block copolymer structure of α-β-α is more preferred.

The specific form of the structural unit represented by the general formula (1) forming the polymer block a is as described above.

The structural unit forming the polymer block β does not contain a propenimine structure ($B_1$—$Z_1$=C—C=$Z_2$—$B_2$). Specifically, the above-mentioned different structural unit can be preferably used. In particular, from the viewpoint of application to synthesis of a block copolymer by a living radical polymerization method such as an ATRP method, an ARGET-ATRP method, or a RAFT method, the structural unit preferably has a vinyl-based polymerizable group. Specifically, as for the monomers, for example, a styrene derivative, a (meth)acrylic acid derivative, an olefin derivative, a vinyl ester derivative, a vinyl ether derivative, a vinyl ketone derivative, or the like is used, and a styrene derivative, a (meth)acrylic acid derivative, or an olefin derivative is preferred. Specifically, the polymer block β is preferably a polymer block containing at least one structural unit selected from the group consisting of a structural unit derived from a styrene derivative, a structural unit derived from a (meth)acrylic acid derivative, and a structural unit derived from an olefin derivative.

The number average molecular weight (total average molecular weight) of the polymer block a contained in the polymer represented by the general formula (3) is not particularly limited, but is preferably 500 or more, more preferably 1,000 or more, still more preferably 1,000 or more and 100,000 or less, still more preferably 1,000 or more and 70,000 or less, particularly preferably 1,000 or more and 50,000 or less, and more particularly preferably 3,000 or more and 50,000 or less. A total number average molecular weight of the polymer block a of 500 or more is preferred because a toner containing the polymer block a provides a toner image having excellent fixability more easily. In addition, a total number average molecular weight of the polymer block a of 100,000 or less is preferred because the polymer is efficiently softened and melted. Here, the total number average molecular weight of the polymer block a means, when the polymer represented by the general formula (3) contains a single polymer block a, the number average molecular weight of the polymer block a, and when the polymer represented by the general formula (3) contains a plurality of polymer blocks a, the sum of the number average molecular weights of the polymer blocks α.

The number average molecular weight (total number average molecular weight) of the polymer block β contained in the polymer represented by the general formula (3) is not particularly limited, but is preferably 1,000 or more, more preferably 1,000 or more and 100,000 or less, still more preferably 1,000 or more and 70,000 or less, still more preferably 1,000 or more and 50,000 or less, and particularly preferably 3,000 or more and 50,000 or less. A total number average molecular weight of the polymer block β of 1,000 or more is preferred because a toner containing the polymer block β provides a toner image having excellent fixability more easily. In addition, a total number average molecular weight of the polymer block β of 100,000 or less is preferred because the polymer is efficiently softened and melted. Here, the total number average molecular weight of the polymer block β means, when the polymer represented by the general formula (3) contains a single polymer block β, the number average molecular weight of the polymer block β, and when the polymer represented by the general formula (3) contains a plurality of polymer blocks β, the sum of the number average molecular weights of the polymer blocks β.

The overall number average molecular weight Mn of the polymer represented by the general formula (3) is preferably 3,500 or more, more preferably 3,500 or more and 100,000 or less, still more preferably 3,500 or more and 70,000 or less, still more preferably 3,500 or more and 50,000 or less, and particularly preferably 5,000 or more and 50,000 or less. An overall number average molecular weight of the polymer represented by the general formula (3) of 3,500 or more is preferred because a toner containing the polymer provides a toner image having excellent fixability more easily. In addition, an overall number average molecular weight of 100,000 or less is preferred because the polymer is efficiently softened and melted.

Therefore, according to a preferred embodiment of the present invention, the polymer block a contained in the polymer represented by the general formula (3) has a total number average molecular weight of 1,000 or more, the polymer block β contained in the polymer represented by the general formula (3) has a total number average molecular weight of 1,000 or more, and the polymer represented by the general formula (3) has an overall number average molecular weight Mn of 3,500 or more.

In the polymer represented by the general formula (3), the ratio of the total number average molecular weight of the polymer block a to the total number average molecular weight of the polymer block β is not particularly limited. However, from the viewpoint of ease of softening and melting and image intensity, the ratio of the total number average molecular weight of the polymer block a to the total number average molecular weight of the polymer block β is preferably 1:20 to 20:1, and more preferably 1:15 to 15:1.

The overall number average molecular weight of the polymer represented by the general formula (3) and the total number average molecular weights of the polymer blocks α and β can be measured by gel permeation chromatography (GPC). Specifically, the number average molecular weight can be measured by the method described in the section of Examples described later.

The method for synthesizing the block copolymer represented by the general formula (3) is not particularly limited, and known methods such as anionic polymerization, cationic polymerization, and living radical polymerization can be used. Among them, a living radical polymerization method such as an atom transfer radical polymerization method (ATRP method), an ARGET-ATRP method, or a RAFT method, which is a simple synthesis method, can be suitably used.

Taking the ATRP method as an example, the polymer represented by the general formula (3) can be synthesized by a method in which monomers for forming the structural unit of the polymer block α or β are polymerized in the presence of a catalyst using a compound containing a monofunctional, bifunctional, trifunctional, or tetrafunctional halogen element as an initiator.

In the stage of polymerizing the monomers, for example, monomers for forming the structural unit of either the polymer block α or β (block serving as a core portion of the block copolymer) are polymerized in the presence of an initiator, a catalyst, and a ligand to produce a macroinitiator.

Examples of the initiator include butyl 2-bromoisobutyrate, ethyl 2-bromoisobutyrate, ethylene bis(2-bromoisobutyrate), 1,1,1-tris(2-bromoisobutyryloxymethyl)ethane, pentaerythritol tetrakis(2-bromoisobutyrate), α,α'-dibromo-p-xylene, ethyl bromoacetate, 2-bromoisobutyryl bromide, and mixtures thereof, but the initiator is not limited thereto.

Examples of the catalyst include a copper(I) catalyst and an iron(II) catalyst, and examples thereof include Cu(I)Cl, Cu(I)Br, Fe(II)Cl, Fe(II)Br, and mixtures thereof.

The ligand used may be a known ligand, but at least one selected from the group consisting of 2,2'-bipyridyl, 4,4'-dimethyl-2,2'-bipyridyl, 4,4' di-t-butyl-2,2'-bipyridyl, 1,1,4,7,10,10-hexamethyltriethylenetetramine, N,N,N',N'',N'''-pentamethyldiethylenetriamine, cyclam(1,4,8,11-tetraazacyclotetradecane), 1,4,8,11-tetramethylcyclam(1,4,8,11-tetramethyl-1,4,8,11-tetraazacyclotetradecane), and tris[2-(dimethylamino)ethyl]amine is preferred.

The amounts of the catalyst and the ligand used are not particularly limited, and can be appropriately determined with reference to conventional knowledge.

Then, the macroinitiator obtained by the polymerization is isolated, and of the monomers for forming the structural unit of the polymer block α or β, the monomers that are not used in the synthesis of the macroinitiator are polymerized using the macroinitiator as an initiator in the presence of a catalyst and a ligand again. Alternatively, it is also possible to add, after almost all the monomers are consumed in the synthesis of the macroinitiator, the monomers not used in the synthesis of the macroinitiator without isolating the macroinitiator, and continue the polymerization. The target block copolymer can be obtained by any of the above-mentioned operations.

Each of the above-mentioned reactions is preferably performed in an inert atmosphere such as an atmosphere of nitrogen or a rare gas such as argon. Each of the above-mentioned reactions can be performed, for example, at a temperature of 25 to 160° C., preferably 35 to 130° C. Each of the above-mentioned reactions may be performed without using a solvent, or may be performed in a solvent such as an organic solvent.

In the reaction of polymerizing the monomers for forming the structural unit of either of the polymer blocks α and β to give a macroinitiator and the reaction of reacting the macroinitiator with the monomers for forming the structural unit of the other polymer block to give a block copolymer, conditions such as the type and amount of the catalyst and the ligand used, and the temperature during the reaction may be the same or different.

<Fluidization by Light Irradiation and Reversible Non-Fluidization>

The irradiation light at the time of fluidizing the polymer of the present invention by light irradiation preferably has a wavelength in the range of 280 nm or more and 480 nm or less, more preferably in the range of 300 nm or more and 420 nm or less, and still more preferably in the range of 330 nm or more and 420 nm or less. A wavelength within the above-mentioned range makes the crystals easier to be disordered, improves the light melting property, and improves the fixability. At the time of fluidizing the polymer, heat or pressure may be applied to the polymer in addition to light irradiation to promote fluidization. When the polymer is irradiated with the irradiation light having the above-mentioned wavelength, it is possible to fluidize the polymer with less heat or pressure even when heat or pressure is applied. Therefore, introduction of the polymer of the present invention into a toner provides a toner that can be fixed at the above-mentioned wavelength, has excellent fixability, and has high color reproducibility.

The above-mentioned wavelength range includes a part of visible light. Therefore, it is desirable that the polymer of the present invention be not fluidized only by receiving sunlight (natural light) or light from illumination such as a fluorescent lamp, and further fluidized under low cost conditions in which the irradiation amount and the irradiation time are reduced as much as possible. From the above-mentioned viewpoint, the irradiation amount (accumulated light amount) of the irradiation light at the time of fluidizing the polymer is preferably in the range of 0.1 J/cm$^2$ or more and 200 J/cm$^2$ or less, more preferably in the range of 0.1 J/cm$^2$ or more and 100 J/cm$^2$ or less, and still more preferably in the range of 0.1 J/cm$^2$ or more and 50 J/cm$^2$ or less.

Meanwhile, as for the conditions for non-fluidizing (resolidifying) the polymer of the present invention, it is preferred to leave (in a natural environment) the polymer at room temperature (in the range of 25±15° C.). In this case, it is preferred to place the polymer in a dark place, but the polymer may receive natural light or visible light from a fluorescent lamp or the like. It is more preferred to apply heat in the process of non-fluidizing the polymer. In addition, the polymer may be irradiated with light.

When the polymer is non-fluidized by heating, the heating temperature is preferably in the range of 0° C. or more and 200° C. or less, and more preferably in the range of 20° C. or more and 150° C. or less.

[Configuration of Toner]

An embodiment of the present invention is a toner containing the polymer of the present invention. Introduction of the polymer of the present invention into a toner provides a toner that can be fixed by light irradiation, has excellent fixability, and has high color reproducibility. The term "toner(s)" refers to an aggregate of toner base particles or toner particles. The toner particles are preferably obtained by adding an external additive to the toner base particles, but the toner base particles can be used as toner particles as they are. In the present invention, when it is not necessary to particularly distinguish among the toner base particles, the toner particles, and the toner, they are also simply referred to as "toner(s)".

The content of the polymer in the toner depends on the propenimine structure represented by the general formula (1) and the type of the different structural unit. However, from the viewpoint of efficient fluidization and image intensity, the content of the polymer is, for example, in the range of 5 mass % or more and 95 mass % or less based on the total amount of the binder resin, the colorant, the release agent, and the polymer of the present invention that constitute the toner.

<Binder Resin>

The toner of the present invention may further contain a binder resin. As for the binder resin, a resin that does not have a propenimine structure and is generally used as a binder resin that constitutes a toner can be used without limitation. Specific examples of the binder resin include a styrene resin, an acrylic resin, a styrene acrylic resin, a polyester resin, a silicone resin, an olefin resin, an amide resin, and an epoxy resin. These binder resins may be used alone or in combination of two or more.

Among them, the binder resin preferably includes at least one selected from the group consisting of a styrene resin, an acrylic resin, a styrene acrylic resin, and a polyester resin, and more preferably includes at least one selected from the group consisting of a styrene acrylic resin and a polyester resin, from the viewpoint that the resin has a low viscosity when melted and has a high sharp melting property.

(Styrene Acrylic Resin)

The styrene acrylic resin referred to herein is a polymer containing at least a structural unit derived from a styrene monomer and a structural unit derived from a (meth)acrylic acid ester monomer. Here, examples of the styrene monomer include, in addition to styrene represented by the structural formula $CH_2=CH-C_6H_5$, a styrene monomer having a structure including, in a styrene structure, a known side chain or functional group.

Examples of the styrene monomer include those similar to the above-mentioned styrene monomers capable of forming the polymer.

The (meth)acrylic acid ester monomer has, in a side chain, a functional group having an ester bond. Specific examples of the (meth)acrylic acid ester monomer include, in addition to an acrylic acid ester monomer represented by $CH_2=CHCOOR$ (wherein R is an alkyl group), vinyl ester compounds such as a methacrylic acid ester monomer represented by $CH_2=C(CH_3)COOR$ (wherein R is an alkyl group). The "(meth)acrylic acid" in the (meth)acrylic acid ester monomer means acrylic acid and methacrylic acid.

Examples of the (meth)acrylic acid ester monomer include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-octyl (meth)acrylate, 2-ethylhexyl (meth)acrylate, stearyl (meth)acrylate, dodecyl (meth)acrylate, phenyl (meth)acrylate, diethylaminoethyl (meth)acrylate, and dimethylaminoethyl (meth)acrylate.

Both the styrene monomer and the (meth)acrylic acid ester monomer may be used alone or in combination of two or more.

The contents of the structural unit derived from a styrene monomer and the structural unit derived from a (meth) acrylic acid ester monomer in the styrene acrylic resin are not particularly limited, and may be appropriately adjusted from the viewpoint of controlling the softening point and the glass transition temperature of the binder resin. Specifically, the content of the structural unit derived from a styrene monomer is preferably 40 mass % or more and 95 mass % or less, and more preferably 50 mass % or more and 90 mass % or less based on all the structural units forming the styrene acrylic resin. In addition, the content of the structural unit derived from a (meth)acrylic acid ester monomer is preferably 5 mass % or more and 60 mass % or less, and more preferably 10 mass % or more and 50 mass % or less based on all the structural units forming the styrene acrylic resin.

The styrene acrylic resin may further contain a structural unit derived from an additional monomer other than the styrene monomer and the (meth)acrylic acid ester monomer as necessary. Examples of the additional monomer include a vinyl monomer. Hereinafter, examples of the vinyl monomer that can be used in combination in forming the styrene acrylic copolymer referred to herein will be given, but the vinyl monomer that can be used in combination is not limited to those given below.

(1) Olefins

Ethylene, propylene, isobutylene, and the like (2) Vinyl Esters

Vinyl propionate, vinyl acetate, vinyl benzoate, and the like (3) Vinyl Ethers

Vinyl methyl ether, vinyl ethyl ether, and the like (4) Vinyl Ketones

Vinyl methyl ketone, vinyl ethyl ketone, vinyl hexyl ketone, and the like (5) N-Vinyl Compounds N-vinylcarbazole, N-vinylindole, N-vinylpyrrolidone, and the like (6) Others Vinyl compounds such as vinylnaphthalene and vinylpyridine, acrylic acid or methacrylic acid derivatives such as acrylonitrile, methacrylonitrile, and acrylamide, and the like In addition, it is also possible to produce a resin having a crosslinked structure using a polyfunctional vinyl monomer. Further, it is also possible to use a vinyl monomer having an ionic dissociation group in a side chain. Specific examples of the ionic dissociation group include a carboxyl group, a sulfonic acid group, and a phosphoric acid group. Specific examples of the vinyl monomer having the ionic dissociation group will be given below.

Specific examples of the vinyl monomer having a carboxyl group include acrylic acid, methacrylic acid, maleic acid, itaconic acid, cinnamic acid, fumaric acid, maleic acid monoalkyl ester, and itaconic acid monoalkyl ester.

In the formation of the styrene acrylic resin used in the present invention, the contents of the styrene monomer and the (meth)acrylic acid ester monomer are not particularly limited, and can be appropriately adjusted from the viewpoint of controlling the softening point temperature and the glass transition temperature of the binder resin. Specifically, the content of the styrene monomer is preferably 40 mass % or more and 95 mass % or less, and more preferably 50 mass % or more and 90 mass % or less based on the entire monomers that form the styrene acrylic resin. In addition, the content of the (meth)acrylic acid ester monomer is preferably 5 mass % or more and 60 mass % or less, and more preferably 10 mass % or more and 50 mass % or less based on the entire monomers that form the styrene acrylic resin.

A method for forming the styrene acrylic resin is not particularly limited, and examples thereof include a method of polymerizing the monomers using a known oil-soluble or water-soluble polymerization initiator. If necessary, for example, a known chain transfer agent such as n-octyl mercaptan may be used. Examples of the oil-soluble polymerization initiator include azo or diazo polymerization initiators and peroxide polymerization initiators described below.

Examples of the azo or diazo polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile.

Examples of the peroxide polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, and tris-(t-butylperoxy)triazine.

When forming styrene acrylic resin particles by an emulsion polymerization method, a water-soluble radical polymerization initiator can be used. Examples of the water-soluble radical polymerization initiator include persulfates such as potassium persulfate and ammonium persulfate, azobisaminodipropane acetate, azobiscyanovaleric acid and salts thereof, and hydrogen peroxide.

The polymerization temperature varies depending on the type of the monomers and polymerization initiator used, but is preferably 50° C. or more and 100° C. or less, and more preferably 55° C. or more and 90° C. or less. The polymerization time varies depending on the type of the monomers and polymerization initiator used, but is preferably 2 hours or more and 12 hours or less, for example.

The styrene acrylic resin particles formed by the emulsion polymerization method may have a structure including two or more layers containing resins having different compositions. As for a production method in this case, it is possible to adopt a multi-stage polymerization method in which a polymerization initiator and polymerizable monomers are added to a dispersion liquid of resin particles prepared by an emulsion polymerization treatment (first stage polymerization) according to a routine method, and the resulting system is subjected to polymerization treatments (second and third stage polymerization).

(Polyester Resin)

The polyester resin is obtained by a polycondensation reaction of a divalent or higher carboxylic acid (polyvalent carboxylic acid component) and a dihydric or higher alcohol (polyhydric alcohol component). The polyester resin may be amorphous or crystalline.

The valence of each of the polyvalent carboxylic acid component and the polyhydric alcohol component is preferably 2 or more and 3 or less, and more preferably 2. That is, the polyvalent carboxylic acid component preferably contains a dicarboxylic acid component, and the polyhydric alcohol component preferably contains a dialcohol component.

Examples of the dicarboxylic acid component include saturated aliphatic dicarboxylic acids such as oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid (dodecanedioic acid), 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, and 1,18-octadecanedicarboxylic acid; unsaturated aliphatic dicarboxylic acids such as methylene succinic acid, fumaric acid, maleic acid, 3-hexenedioic acid, 3-octenedioic acid, and dodecenylsuccinic acid; and unsaturated aromatic dicarboxylic acids such as phthalic acid, terephthalic acid, isophthalic acid, t-butylisophthalic acid, tetrachlorophthalic acid, chlorophthalic acid, nitrophthalic acid, p-phenylenediacetic acid, 2,6-naphthalenedicarboxylic acid, 4,4'-biphenyldicarboxylic acid, and anthracenedicarboxylic acid. Lower alkyl esters and acid anhydrides of the above-mentioned compounds can also be used. The dicarboxylic acid component may be used alone or in combination of two or more.

In addition, trivalent or higher polyvalent carboxylic acids such as trimellitic acid and pyromellitic acid, anhydrides of the polyvalent carboxylic acids, and alkyl esters of the polyvalent carboxylic acids having 1 to 3 carbon atoms can also be used.

Examples of the diol component include saturated aliphatic diols such as ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,20-eicosanediol, and neopentyl glycol; unsaturated aliphatic diols such as 2-butene-1,4-diol, 3-butene-1,4-diol, 2-butyne-1,4-diol, 3-butyne-1,4-diol, and 9-octadecene-7,12-diol; and aromatic diols including bisphenols such as bisphenol A and bisphenol F, and alkylene oxide adducts of bisphenols such as ethylene oxide adducts and propylene oxide adducts of the bisphenols. Derivatives of the above-mentioned compounds can also be used. The diol component may be used alone or in combination of two or more.

A method for producing the polyester resin is not particularly limited, and the polyester resin can be produced by polycondensation (esterification) of the polyvalent carboxylic acid component and the polyhydric alcohol component using a known esterification catalyst.

Examples of the catalyst usable in the production of the polyester resin include compounds of alkali metals such as sodium and lithium; compounds containing Group 2 elements such as magnesium and calcium; compounds of metals such as aluminum, zinc, manganese, antimony, titanium, tin, zirconium, and germanium; phosphorus acid compounds; phosphoric acid compounds; and amine compounds. Specific examples of the tin compound include dibutyltin oxide, tin octylate, tin dioctylate, and salts of these compounds. Examples of the titanium compound include titanium alkoxides such as tetra-n-butyl titanate (Ti(O-n-Bu)$_4$), tetraisopropyl titanate, tetramethyl titanate, and tetrastearyl titanate; titanium acylates such as polyhydroxytitanium stearate; and titanium chelates such as titanium tetraacetylacetonate, titanium lactate, and titanium triethanolaminate. Examples of the germanium compound include germanium dioxide. Further, examples of the aluminum compound include polyaluminum hydroxide, aluminum alkoxide, and tributyl aluminate. These catalysts may be used alone or in combination of two or more.

The polymerization temperature is not particularly limited, but is preferably 70° C. or more and 250° C. or less. The polymerization time is also not particularly limited, but is preferably 0.5 hours or more and 10 hours or less. During the polymerization, the pressure in the reaction system may be reduced as necessary.

When the toner of the present invention contains the binder resin in addition to the polymer of the present invention, the content ratio between the polymer and the binder resin is not particularly limited, but is preferably 60:40 to 80:20, and more preferably 65:35 to 75:25 in terms of mass ratio.

The glass transition temperature (Tg) of the toner is preferably 25° C. or more and 100° C. or less, and more preferably 30° C. or more and 80° C. or less from the viewpoint of fixability, heat-resistant storage stability, and the like. The glass transition temperature (Tg) of the toner can be adjusted according to the molecular weight or the like of the polymer according to the present invention. When the polymer according to the present invention contains the different structural unit other than the structural unit containing a propenimine structure-containing group, the glass transition temperature of the toner can be adjusted according to the type and content of the different structural unit. When the toner contains the binder resin, the glass transition temperature of the toner can be further adjusted according to the content ratio between the polymer and the binder resin, the type of the binder resin, the molecular weight, and the like.

The toner of the present invention may be particles having a single layer structure or particles having a core-shell structure. The type of the binder resin used in the core particles and the shell portion of the core-shell structure is not particularly limited.

<Colorant>

The toner of the present invention may further contain a colorant. Since the polymer of the present invention is not significantly colored, a toner having high color reproducibility of the colorant can be obtained. As for the colorant, generally known dyes and pigments can be used.

Examples of the colorant for obtaining a black toner include carbon black, magnetic materials, and iron-titanium composite oxide black, and examples of the carbon black include channel black, furnace black, acetylene black, thermal black, and lamp black. Examples of the magnetic material include ferrite and magnetite.

Examples of the colorant for obtaining a yellow toner include dyes such as C.I. Solvent Yellow 19, 44, 77, 79, 81, 82, 93, 98, 103, 104, 112, and 162; and pigments such as C.I. Pigment Yellow 14, 17, 74, 93, 94, 138, 155, 180, and 185.

Examples of the colorant for obtaining a magenta toner include dyes such as C.I. Solvent Red 1, 49, 52, 58, 63, 111, and 122; and pigments such as C.I. Pigment Red 5, 48:1, 53:1, 57:1, 122, 139, 144, 149, 166, 177, 178, and 222.

Examples of the colorant for obtaining a cyan toner include dyes such as C.I. Solvent Blue 25, 36, 60, 70, 93, and 95; and pigments such as C.I. Pigment Blue 1, 7, 15, 15:3, 60, 62, 66, and 76.

The colorant for obtaining the toner of each color may be used alone or in combination of two or more for each color.

The content of the colorant in the toner base particles before the addition of the external additive is preferably 0.5 mass % or more and 20 mass % or less, and more preferably 2 mass % or more and 10 mass % or less.

<Release Agent>

The toner of the present invention may further contain a release agent. Introduction of the release agent into a toner provides a toner that exhibits more excellent fixability and high color reproducibility when being subjected to heat fixing together with light irradiation.

The release agent used is not particularly limited, and various known waxes can be used. Examples of the wax include polyolefin waxes such as low molecular weight polypropylene, low molecular weight polyethylene, oxidized low molecular weight polypropylene, and oxidized low molecular weight polyethylene; paraffin wax; and synthetic ester waxes. Among them, paraffin wax is preferably used from the viewpoint of improving the storage stability of the toner.

The content of the release agent in the toner base particles is preferably 1 mass % or more and 30 mass % or less, and more preferably 3 mass % or more and 15 mass % or less.

<Charge Control Agent>

The toner according to the present invention may contain a charge control agent. The charge control agent used is not particularly limited as long as it is a substance capable of imparting positive or negative charge by frictional charging and is colorless, and various known positive charge control agents and negative charge control agents can be used.

The content of the charge control agent in the toner base particles is preferably 0.01 mass % or more and 30 mass % or less, and more preferably 0.1 mass % or more and 10 mass % or less.

<External Additive>

In order to improve the flowability, chargeability, cleaning property, and the like of the toner, the toner according to the present invention may be formed by adding, to the toner base particles, external additives such as a fluidizing agent and a cleaning aid that are so-called post-treatment agents.

Examples of the external additive include inorganic particles including inorganic oxide particles such as silica particles, alumina particles, and titanium oxide particles, inorganic stearic acid compound particles such as aluminum stearate particles and zinc stearate particles, and inorganic titanic acid compound particles such as strontium titanate particles and zinc titanate particles. These inorganic particles may be hydrophobized as necessary. These inorganic particles may be used alone or in combination of two or more.

Above all, for example, the external additive is preferably sol-gel silica particles, or silica particles or titanium oxide particles whose surface is hydrophobized (hydrophobic silica particles or hydrophobic titanium oxide particles, respectively), and it is more preferred to use two or more of these external additives.

The number average primary particle size of the external additives is preferably in the range of 1 nm or more and 200 nm or less, and more preferably in the range of 10 nm or more and 180 nm or less. In this case, it is particularly preferred that at least one of the external additives have a number average primary particle size of 30 nm or more and 180 nm or less.

The amount of addition of the external additives in the toner is preferably 0.05 mass % or more and 5 mass % or less, and more preferably 0.1 mass % or more and 3 mass % or less.

<Average Particle Size of Toner>

The average particle size of the toner (and the average particle size of the toner base particles) in terms of volume-based median diameter (D50) is preferably in the range of 4 µm or more and 20 µm or less, and more preferably in the range of 5 µm or more and 15 µm or less. When the volume-based median diameter (D50) is within the above-mentioned range, the toner has high transfer efficiency, the halftone image quality is improved, and the image quality of thin lines, dots, and the like is improved.

The volume-based median diameter (D50) can be measured and calculated using a measuring apparatus including "Coulter Counter 3" (manufactured by Beckman Coulter, Inc.) and a computer system (manufactured by Beckman Coulter, Inc.) equipped with data processing software "Software V 3.51" connected thereto.

[Method for Producing Toner]

A method for producing the toner of the present invention is not particularly limited. For example, in the case of using only the polymer of the present invention as a toner, it is possible to employ a production method including pulverizing the polymer using an apparatus such as a hammer mill, a feather mill, or a counter jet mill, and then classifying the resulting particles to have a desired particle size using a dry classifier such as Spin Air Sieve, Classiel, or Micron Classifier. In the case of producing a toner further containing a colorant, it is possible to dissolve the polymer of the present invention and the colorant using a solvent capable of dissolving both the polymer and the colorant to form a solution, then remove the solvent from the solution, and then pulverize and classify the resulting product in the same manner as in the above-mentioned method.

In particular, the toner containing the polymer of the present invention and optionally containing the binder resin and the colorant is preferably produced by a production method based on an emulsion aggregation method by which the particle size and shape can be easily controlled.

Such a production method preferably includes:

(1A) a binder resin particle dispersion liquid preparation step of preparing a dispersion liquid of binder resin particles as necessary;

(1B) a polymer particle dispersion liquid preparation step of preparing a dispersion liquid of polymer particles of the present invention;

(1C) a colorant particle dispersion liquid preparation step of preparing a dispersion liquid of colorant particles as necessary;

(2) an association step of adding a flocculant to an aqueous medium in which the polymer particles, and optionally the binder resin particles and the colorant particles are present, and causing salting-out to proceed and aggregating and fusing the particles at the same time to form associated particles;

(3) an aging step of controlling the shape of the associated particles to form toner base particles;

(4) a filtration and washing step of filtering out the toner base particles from the aqueous medium and removing a surfactant or the like from the toner base particles;

(5) a drying step of drying the washed toner base particles; and (6) an external additive adding step of adding an external additive to the dried toner base particles.

Hereinafter, steps (1A) to (1C) will be described.

(1A) Binder Resin Particle Dispersion Liquid Preparation Step

In this step, resin particles are formed by conventionally known emulsion polymerization or the like, and the resin particles are aggregated and fused to form binder resin particles. In an example, polymerizable monomers forming the binder resin are charged and dispersed in an aqueous medium, and the polymerizable monomers are polymerized by a polymerization initiator to prepare a dispersion liquid of binder resin particles.

Examples of the method for obtaining the binder resin particle dispersion liquid include, in addition to the above-mentioned method in which the polymerizable monomers are polymerized by a polymerization initiator in the aqueous medium, a method in which a dispersion treatment is performed in an aqueous medium without use of a solvent, and a method in which a crystalline resin is dissolved in a solvent such as ethyl acetate to form a solution, the solution is emulsified and dispersed in an aqueous medium using a disperser, and then the solvent is removed.

In this case, the binder resin may contain a release agent in advance as necessary. In addition, it is also preferred for dispersing the binder resin particles to perform polymerization appropriately in the presence of a known surfactant (for example, an anionic surfactant such as sodium polyoxyethylene (2) dodecyl ether sulfate, sodium dodecyl sulfate, or dodecylbenzenesulfonic acid).

The binder resin particles in the dispersion liquid preferably have a volume-based median diameter in the range of 50 nm or more and 300 nm or less. The volume-based median diameter of the binder resin particles in the dispersion liquid can be measured by a dynamic light scattering method using "Microtrac UPA-150" (manufactured by NIKKISO CO., LTD.).

(1B) Polymer Particle Dispersion Liquid Preparation Step

The polymer particle dispersion liquid preparation step is a step of dispersing the polymer of the present invention in a form of fine particles in an aqueous medium to prepare a dispersion liquid of the polymer particles.

In preparing a dispersion liquid of the polymer particles, first, an emulsion of the polymer is prepared. The emulsion of the polymer is obtained, for example, by a method in which the polymer is dissolved in an organic solvent, and then the obtained solution is emulsified in an aqueous medium.

The method for dissolving the polymer in the organic solvent is not particularly limited, and examples thereof include a method in which the polymer is added to the organic solvent, and the resulting mixture is stirred and mixed so that the polymer may be dissolved. The amount of addition of the polymer is preferably 5 parts by mass or more and 100 parts by mass or less, and more preferably 10 parts by mass or more and 50 parts by mass or less with respect to 100 parts by mass of the organic solvent.

Then, the obtained polymer solution and an aqueous medium are mixed and stirred using a known disperser such as a homogenizer. As a result, the polymer is emulsified as droplets in the aqueous medium, so that an emulsion of the polymer is prepared.

The amount of addition of the polymer solution is preferably 10 parts by mass or more and 110 parts by mass or less with respect to 100 parts by mass of the aqueous medium.

The temperature of each of the polymer solution and the aqueous medium at the time of mixing the polymer solution and the aqueous medium is in a temperature range below the boiling point of the organic solvent, and is preferably 20° C. or more and 80° C. or less, and more preferably 30° C. or more and 75° C. or less. The temperature of the polymer solution and the temperature of the aqueous medium at the time of mixing the polymer solution and the aqueous medium may be the same as or different from each other, but are preferably the same as each other.

As for the stirring conditions of the disperser, when a stirring vessel of the disperser has a capacity of, for example, 1 L to 3 L, the rotation speed of the disperser is preferably 7,000 rpm or more and 20,000 rpm or less, and the stirring time is preferably 10 minutes or more and 30 minutes or less.

The dispersion liquid of the polymer particles is prepared by removing the organic solvent from the emulsion of the polymer. Examples of the method for removing the organic solvent from the emulsion of the polymer include known methods such as air blowing, heating, pressure reduction, or a combination thereof.

In an example, the emulsion of the polymer is heated, for example, in an atmosphere of an inert gas such as nitrogen at preferably 25° C. or more and 90° C. or less, more preferably 30° C. or more and 80° C. or less until about 80 mass % or more and 95 mass % or less of the initial amount of the organic solvent is removed. As a result, a dispersion liquid of the polymer particles, which contains the polymer particles dispersed in an aqueous medium, is prepared.

The mass average particle size of the polymer particles in the polymer particle dispersion liquid is preferably 90 nm or more and 1200 nm or less. The mass average particle size can be set within the above-mentioned range by appropriately adjusting the viscosity when the polymer is blended in the organic solvent, the blend ratio between the polymer solution and the aqueous medium, the stirring speed of the disperser during the preparation of the polymer emulsion, and the like. The mass average particle size of the polymer particles in the polymer particle dispersion liquid can be measured using an electrophoretic light scattering photometer "ELS-800" (manufactured by Otsuka Electronics Co., Ltd.).

<Organic Solvent>

The organic solvent used in this step is not particularly limited as long as the solvent can dissolve the polymer. Specific examples of the organic solvent include esters such as ethyl acetate and butyl acetate, ethers such as diethyl ether, diisopropyl ether, and tetrahydrofuran, ketones such as acetone and methyl ethyl ketone, saturated hydrocarbons such as hexane and heptane, and halogenated hydrocarbons such as dichloromethane, dichloroethane, and carbon tetrachloride.

These organic solvents may be used alone or in combination of two or more. Among these organic solvents, ketones and halogenated hydrocarbons are preferred, and methyl ethyl ketone and dichloromethane are more preferred.

<Aqueous Medium>

Examples of the aqueous medium used in this step include water, and aqueous media containing water as a main component and containing optional components such as water-soluble solvents including alcohols and glycols, surfactants, and dispersants. The aqueous medium used is preferably a mixture of water and a surfactant.

Examples of the surfactant include cationic surfactants, anionic surfactants, and nonionic surfactants. Examples of the cationic surfactant include dodecylammonium chloride, dodecylammonium bromide, dodecyltrimethylammonium bromide, dodecylpyridinium chloride, dodecylpyridinium bromide, and hexadecyltrimethylammonium bromide. Examples of the anionic surfactant include fatty acid soaps such as sodium stearate and sodium dodecanoate, sodium dodecylbenzenesulfonate, and sodium dodecyl sulfate. Examples of the nonionic surfactant include polyoxyethylene dodecyl ether, polyoxyethylene hexadecyl ether, polyoxyethylene nonylphenyl ether, polyoxyethylene dodecyl ether, polyoxyethylene sorbitan monooleate ether, and monodecanoyl sucrose.

These surfactants may be used alone or in combination of two or more. Among the surfactants, anionic surfactants are preferably used, and sodium dodecylbenzenesulfonate is more preferably used.

The amount of addition of the surfactant is preferably 0.01 parts by mass or more and 10 parts by mass or less, and more preferably 0.04 parts by mass or more and 1 part by mass or less based on 100 parts by mass of the aqueous medium.

(1C) Colorant Particle Dispersion Liquid Preparation Step

The colorant particle dispersion liquid preparation step is a step of dispersing a colorant in a form of fine particles in an aqueous medium to prepare a colorant particle dispersion liquid.

The colorant can be dispersed using mechanical energy. The number-based median diameter of the colorant particles in the dispersion liquid is preferably in the range of 10 nm or more and 300 nm or less, and more preferably in the range of 50 nm or more and 200 nm or less. The number-based median diameter of the colorant particles can be measured using an electrophoretic light scattering photometer "ELS-800" (manufactured by Otsuka Electronics Co., Ltd.).

The steps from the association step (2) to the external additive adding step (6) can be performed according to various conventionally known methods.

The flocculant used in the association step (2) is not particularly limited, but a flocculant selected from metal salts is suitably used. Examples of the metal salt include monovalent metal salts such as salts of alkali metals including sodium, potassium, and lithium; divalent metal salts such as salts of calcium, magnesium, manganese, and copper; and trivalent metal salts such as salts of iron and aluminum. Specific examples of the metal salt include sodium chloride, potassium chloride, lithium chloride, calcium chloride, magnesium chloride, zinc chloride, copper sulfate, magnesium sulfate, and manganese sulfate. Among these, it is particularly preferred to use a divalent metal salt because the aggregation can proceed with a smaller amount of the salt. These flocculants may be used alone or in combination of two or more.

[Developer]

It is conceivable that the toner according to the present invention will be used, for example, as a one-component magnetic toner containing a magnetic material, a two-component developer containing a mixture of the toner and a so-called carrier, or a nonmagnetic toner by itself, and any of them can be suitably used.

As for the magnetic material, for example, magnetite, γ-hematite, various ferrites, or the like can be used.

As for the carrier contained in the two-component developer, it is possible to use magnetic particles made of a conventionally known material such as metals including iron, steel, nickel, cobalt, ferrite, and magnetite, and alloys of these metals with a metal such as aluminum or lead.

The carrier may be a coated carrier obtained by coating the surface of magnetic particles with a coating agent such as a resin, or a resin dispersion type carrier obtained by dispersing a magnetic material powder in a binder resin. The coating resin is not particularly limited, and for example, an olefin resin, an acrylic resin, a styrene resin, a styrene acrylic resin, a silicone resin, a polyester resin, a fluororesin, or the like is used. In addition, the resin for forming the resin dispersion type carrier particles is not particularly limited, and a known resin can be used. For example, an acrylic resin, a styrene acrylic resin, a polyester resin, a fluororesin, a phenol resin, and the like can be used.

The volume-based median diameter of the carrier is preferably in the range of 20 μm or more and 100 μm or less, and more preferably in the range of 25 μm or more and 80 μm or less. The volume-based median diameter of the carrier can be typically measured by a laser diffraction type particle size distribution analyzer "HELOS" (manufactured by Sympatec GmbH) equipped with a wet disperser.

The mixed amount of the toner with respect to the carrier is preferably 2 mass % or more and 10 mass % or less based on 100 mass % in total of the toner and the carrier.

[Image Forming Method]

The toner of the present invention can be used in various known electrophotographic image forming methods, such as a monochrome image forming method and a full-color image forming method. The full-color image forming method can be applied to any image forming method such as a four-cycle image forming method in which four types of color developing devices for yellow, magenta, cyan, and black, and one photoreceptor are used, and a tandem image forming method in which an image forming unit is provided for each color, the image forming unit including a color developing device and a photoreceptor for each color.

That is, an image forming method according to an embodiment of the present invention includes the steps of: 1) forming a toner image containing the toner of the present invention on a recording medium; and 2) irradiating the toner image with light to soften the toner image.

In step 1), a toner image containing the toner of the present invention is formed on a recording medium.

The recording medium is a member for holding a toner image. Examples of the recording medium include plain paper, high quality paper, coated printing paper such as art paper and coated paper, commercially available Japanese paper and postcard paper, resin films for OHP use or for packaging materials, and cloth.

The recording medium may have a sheet shape having a predetermined size, or an elongated shape that is wound in a roll shape after the toner image is fixed to the recording medium.

As described later, the toner image can be formed, for example, by transfer of the toner image on a photoreceptor onto the recording medium.

In step 2), the formed toner image is irradiated with light so that the toner image may be softened. As a result, the toner image can be made to adhere onto the recording medium.

The wavelength of the light applied is not particularly limited as long as the light can sufficiently soften the toner image by the photothermal conversion caused by the polymer in the toner, and is preferably 280 nm or more and 480 nm or less. When the wavelength is within the above-mentioned range, the toner image can be softened more efficiently. From a similar viewpoint, the light irradiation amount (accumulated light amount) is preferably 0.1 $J/cm^2$ or more and 200 $J/cm^2$ or less, more preferably 0.1 $J/cm^2$ or more and 100 $J/cm^2$ or less, and still more preferably 0.1 $J/cm^2$ or more and 50 $J/cm^2$ or less.

As described later, the light irradiation can be performed using a light source such as a light emitting diode (LED) or a laser light source.

After step 2), a step of pressurizing the softened toner image (step 3)) may be further performed as necessary.

In step 3), the softened toner image is pressurized.

The pressure at the time of pressurizing the toner image on the recording medium is not particularly limited, but is preferably 0.01 MPa or more and 5.0 MPa or less, and more preferably 0.05 MPa or more and 1.0 MPa or less. When the pressure is 0.01 MPa or more, the toner image can be largely deformed, so that the contact area between the toner image and the recording sheet S is increased, and the image fixability can be further improved easily. In addition, when the pressure is 5.0 MPa or less, shock noise at the time of pressurization can be reduced.

The pressurizing step may be performed before or simultaneously with the step of softening the toner image described above as step 2), but it is preferred to perform the pressurizing step after step 2) because it is possible to pressurize the toner image softened in advance, and as a result, image fixability is further improved.

In the pressurizing step, the softened toner image may be further heated. That is, the pressurizing step may be performed with heating the toner image.

The temperature for heating the toner image (surface temperature of the toner image during heating) is preferably in the range of (Tg+20°) C. or more and (Tg+100°) C. or less, and more preferably (Tg+25°) C. or more and (Tg+80°) C. or less, where Tg is the glass transition temperature of the toner. When the surface temperature of the toner image is (Tg+20°) C. or more, the toner image is easily deformed by pressurization, and when the surface temperature is (Tg+100°) C. or less, hot offset is easily reduced. Note that the hot offset refers to a phenomenon in which, in a fixing step, part of the toner is transferred to a pressurizing member such as a roller and the toner layer is separated.

Further, before step 2), a step of heating the toner image in advance (step 4)) may be further performed as necessary. When step 4) of heating the toner image in advance is performed before step 2) in this way, sensitivity of the polymer of the present invention to light can be further enhanced. As a result, sensitivity to light is less likely to be impaired even though the polymer has a high molecular weight, so that melting or softening of the toner image by light irradiation is likely to be promoted.

The image forming method of the present invention can be performed by using, for example, the following image forming apparatus.

FIG. 1 is a schematic configuration diagram illustrating an image forming apparatus 100 used in an image forming method according to an embodiment of the present invention. The image forming apparatus used in the present invention is not limited to the following embodiment and the illustrated example. FIG. 1 illustrates an example of a monochrome image forming apparatus 100, but the present invention can also be applied to a color image forming apparatus.

The image forming apparatus 100 is an apparatus that forms an image on a recording sheet S as a recording medium. The image forming apparatus 100 includes an image reading device 71 and an automatic document feeder 72, and forms an image on the recording sheet S conveyed by a sheet conveying system 7 through the use of an image forming unit 10, an irradiation unit 40, and a pressure-bonding unit 9.

The recording medium used in the image forming apparatus 100 is the recording sheet S, but the medium to be subjected to image formation may be other than a paper sheet.

A document d placed on a document table of the automatic document feeder 72 is scanned and exposed by an optical system of a scanning exposure device in the image reading device 71, and read by an image sensor CCD. An analog signal obtained by photoelectric conversion at the image sensor CCD is subjected to analog processing, A/D conversion, shading correction, image compression processing, and the like in an image processing unit 20, and then input to an exposure device 3 in the image forming unit 10.

The sheet conveying system 7 includes a plurality of trays 16, a plurality of sheet feeders 11, conveying rollers 12, a conveyor belt 13, and the like. Each of the trays 16 stores recording sheets S of a predetermined size, and the sheet feeder 11 of the tray 16 determined in accordance with an instruction from a control unit 90 is operated to supply a recording sheet S. The conveying rollers 12 convey the recording sheet S fed from the tray 16 by the sheet feeder 11 or the recording sheet S fed from a manual sheet feeder 15 to the image forming unit 10.

The image forming unit 10 has a configuration in which around a photoreceptor 1 and in a rotation direction of the photoreceptor 1, a charger 2, an exposure device 3, a developing unit 4, a transfer unit 5, and a cleaning unit 8 are arranged in this order.

The photoreceptor 1 as an image carrier is an image carrier having a photoconductive layer formed on a surface thereof, and is configured to be rotatable in a direction of an arrow in FIG. 1 by a driving device (not illustrated). A thermo-hygrometer 17 that detects the temperature and humidity in the image forming apparatus 100 is provided in the vicinity of the photoreceptor 1.

The charger 2 uniformly impart charges to the surface of the photoreceptor 1 to uniformly charge the surface of the photoreceptor 1. The exposure device 3 includes a beam emission source such as a laser diode, and irradiates the charged surface of the photoreceptor 1 with beam light to dissipate the charges of the irradiated portion, and forms an electrostatic latent image corresponding to image data on the photoreceptor 1. The developing unit 4 supplies a toner contained therein to the photoreceptor 1 to form a toner image based on the electrostatic latent image on the surface of the photoreceptor 1.

The transfer unit 5 faces the photoreceptor 1 with the recording sheet S interposed therebetween, and transfers the toner image to the recording sheet S. The cleaning unit 8 includes a blade 85. The blade 85 cleans the surface of the photoreceptor 1 to remove the developer remaining on the surface of the photoreceptor 1.

The recording sheet S to which the toner image has been transferred is conveyed to the pressure-bonding unit 9 by the conveyor belt 13. The pressure-bonding unit 9 is optionally installed, and applies only pressure or heat and pressure to the recording sheet S to which the toner image has been transferred by pressurizing members 91 and 92 to perform fixing processing, thereby fixing the image on the recording sheet S. The recording sheet S on which the image is fixed is conveyed to a sheet ejector 14 by the conveying rollers, and is ejected from the sheet ejector 14 to the outside of the apparatus.

In addition, the image forming apparatus 100 includes a sheet reversing unit 24, and it is possible to convey the recording sheet S having been subjected to the heat fixing processing to the sheet reversing unit 24 before the sheet ejector 14 and eject the recording sheet S with the front and back reversed, or to convey the recording sheet S with the front and back reversed to the image forming unit 10 again and form an image on both sides of the recording sheet S.

<Irradiation Unit>

Figure 2:
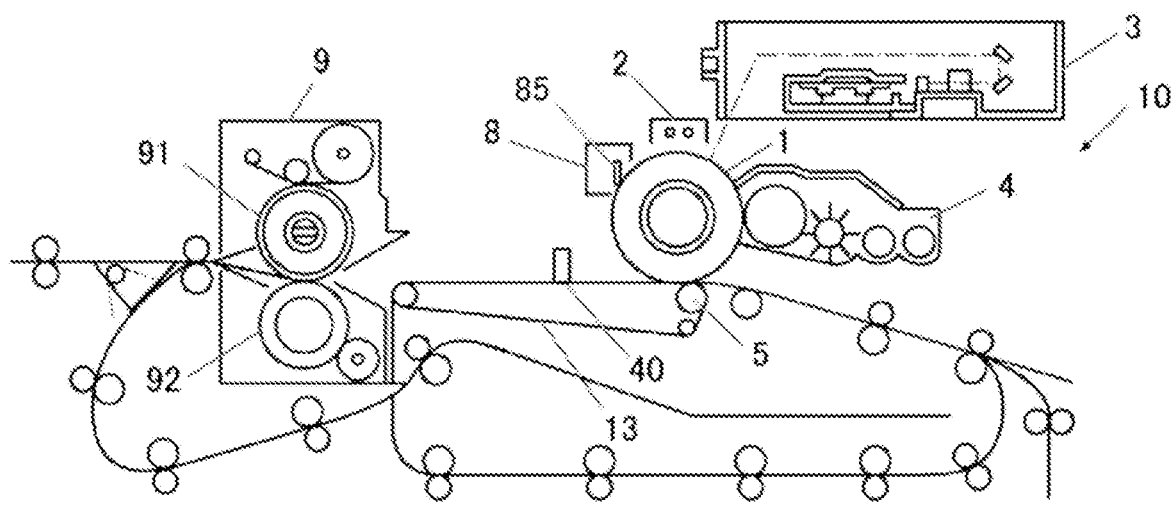
FIG. 2 is a schematic cross-sectional view of the irradiation unit in the image forming apparatus.

FIG. 2 is a schematic configuration diagram of the irradiation unit 40 in the image forming apparatus 100.

The image forming apparatus 100 according to an embodiment of the present invention includes the irradiation unit 40. The irradiation unit 40 irradiates the toner image formed on the recording sheet S with light. Examples of a device that constitutes the irradiation unit 40 include a light emitting diode (LED) and a laser light source. As for the irradiation unit 40, it is possible to use, for example, a scanning type irradiation unit 40 capable of irradiating the entire toner image in a short time by scanning and exposing (irradiating with light) the toner image on the recording sheet at (ultra) high speed. Alternatively, the irradiation unit 40 may also be a fixed irradiation unit 40 in which a large number of light sources are arranged in a horizontal line (in a direction perpendicular to the conveyance direction) or arranged vertically and horizontally without a gap so that the entire toner image on the recording sheet can be irradiated with light at a time. The light irradiation technique is not particularly limited, and a conventionally known technique can be applied.

The irradiation unit 40 applies light to a first surface of the recording sheet S, which is on the photoreceptor side and holds the toner image, and is disposed on the photoreceptor side with respect to the surface of the recording sheet S nipped between the photoreceptor 1 and a transfer unit (transfer roller) 5.

The irradiation unit 40 is disposed on the downstream side in the sheet conveyance direction with respect to the nip position between the photoreceptor 1 and the transfer unit 5 and on the upstream side in the sheet conveyance direction with respect to the pressure-bonding unit 9.

According to the image forming method of the embodiment of the present invention, after the photoreceptor 1 is charged by application of a uniform potential from the charger 2, the photoreceptor 1 is scanned with a light flux emitted by the exposure device 3 based on original image data, whereby an electrostatic latent image is formed. Then, a developer that contains the toner of the present invention is supplied by the developing unit 4 onto the photoreceptor 1.

When a recording sheet S is conveyed from any of the trays 16 to the image forming unit 10 in accordance with the timing at which the toner image carried on the surface of the photoreceptor 1 reaches the position of the transfer unit 5 by the rotation of the photoreceptor 1, the toner image on the photoreceptor 1 is transferred to the recording sheet S nipped between the transfer unit 5 and the photoreceptor 1 by the transfer bias applied to the transfer unit 5.

The transfer unit 5 also serves as a pressurizing member, and can reliably bring the polymer contained in the toner image into close contact with the recording sheet S while transferring the toner image from the photoreceptor 1 to the recording sheet S.

After the toner image is transferred to the recording sheet S, the blade 85 of the cleaning unit 8 removes the developer remaining on the surface of the photoreceptor 1.

In a process in which the recording sheet S to which the toner image has been transferred is conveyed to the pressure-bonding unit 9 by the conveyor belt 13, the irradiation unit 40 irradiates the toner image transferred to the recording sheet S with light. Since the toner image on the first surface of the recording sheet S is irradiated with the light by the irradiation unit 40, the toner image can be more reliably melted, and the fixability of the toner image to the recording sheet S can be improved.

When the recording sheet S holding the toner image is conveyed by the conveyor belt 13 and reaches the pressure-bonding unit 9, the pressurizing members 91 and 92 pressure-bond the toner image to the first surface of the recording sheet S. Since the toner image has been softened by the light applied from the irradiation unit 40 before being fixed by the pressure-bonding unit 9, energy for pressure-bonding the image to the recording sheet S can be saved.

The pressure for pressurizing the toner image is as described above. The pressurizing step may be performed before, simultaneously with, or after the step of softening the toner image by light irradiation, but it is preferred to perform the pressurizing step after light irradiation because it is possible to pressurize the toner image softened in advance, and image intensity is easily improved.

Further, the pressurizing member 91 can heat the toner image on the recording sheet S when the recording sheet S passes between the pressurizing members 91 and 92. The toner image softened by the light irradiation is further softened by the heating, and as a result, the fixability of the toner image to the recording sheet S is further improved.

The temperature for heating the toner image is as described above. The temperature for heating the toner image (surface temperature of the toner image) can be measured by a non-contact temperature sensor. Specifically, for example, the surface temperature of the toner image on the recording medium may be measured by installing a non-contact temperature sensor at a position where the recording medium is released from the pressurizing members.

The toner image pressure-bonded by the pressurizing members 91 and 92 is solidified and fixed on the recording sheet S.

(Photoresponsive Adhesive)

Since the polymer of the present invention is fluidized and reversibly non-fluidized by light irradiation, a photoresponsive adhesive (photosensitive adhesive) that can be repeatedly used can be produced using the polymer of the present invention. For example, the polymer can be applied to various adhesion techniques as a photoresponsive adhesive that is capable of repeated desorption and adhesion by light in response to a change in viscosity (friction coefficient). That is, an embodiment of the present invention is a photoresponsive adhesive containing the polymer of the present invention.

The photoresponsive adhesive of the present invention can be used in temporary fixing for which the adhesive can be repeatedly used, and is also suitable for recycling, but the use is not limited thereto.

(Optical Switching Material)

In addition, an optical switching material can be produced using the polymer of the present invention. The optical switching material can be produced, for example, by utilizing a change in color or polarity, mass transfer, a change in orientation, a change in viscosity, a change in surface tension, or the like due to photoisomerization. For example, in a liquid crystal material or the like, the polymer can be applied to pattern drawing in which patterns can be repeatedly redrawn in response to a change in molecular orientation due to photoisomerization. In addition, for example, the surface of a polymer film can be finely processed by using a change in surface tension due to light irradiation or mass transfer caused by such change. That is, an embodiment of the present invention is an optical switching material containing the polymer of the present invention. For example, the polymer of the embodiment can be used as an optical switching material as it is or with the addition of an appropriate amount of an arbitrary known additive.

The optical switching material of the present invention can be used in a liquid crystal display material or surface processing of a polymer film, but the use is not limited thereto.

EXAMPLES

Hereinafter, the present invention will be specifically described with reference to examples, but the present invention is not limited thereto.

Example 1

Synthesis of Propenimine Derivative Monomer 1

[Chemical Formula 24]

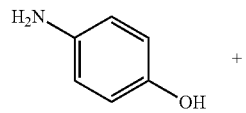

+

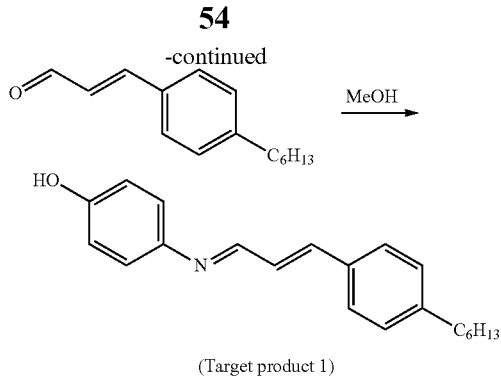

(Target product 1)

Into a 100-mL four-necked flask, 4-aminophenol (5 g, 0.046 mol), 3-(4-hexylphenyl)-2-propenal (9.9 g, 0.046 mol), and 100 mL of methanol (MeOH) were charged, and the resulting mixture was heated and stirred. The reaction liquid was filtered by suction, and the obtained powder was washed with cooled ethanol. Further, the resulting product was recrystallized from methanol/ethanol to give a target product 1.

[Chemical Formula 25]

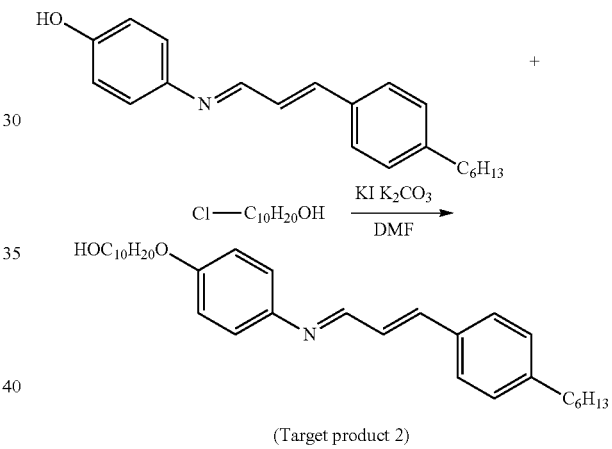

(Target product 2)

In a 200-mL four-necked flask, the target product 1 (5 g, 0.016 mol) obtained as described above was dissolved in 25 mL of dimethylformamide (DMF). Potassium carbonate (4.88 g, 0.035 mol) was added thereto, and the resulting mixture was stirred while being maintained at 30° C. Potassium iodide (10.2 mg, 0.06 mmol) and 10-chloro-1-decanol (5.79 g, 0.030 mol) were added thereto, and the resulting mixture was reacted at 110° C. The mixture was cooled to room temperature and added to 650 g of ice, and then the resulting mixture was filtered. The resulting crystals were dispersed in 400 mL of water, washed by stirring overnight, filtered, and dried. Further, the resulting product was recrystallized from ethanol to give a target product 2.

[Chemical Formula 26]

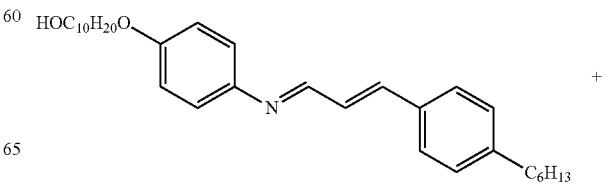

+

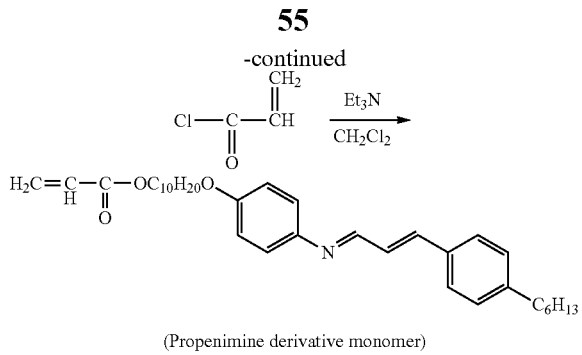

(Propenimine derivative monomer)

Into a 100-mL four-necked flask, the target product 2 (3 g, 6.2 mmol) obtained as described above, triethylamine (1.34 mL, 0.001 mol), and 30 mL of dichloromethane were charged. At that time, the raw materials were in a dispersed state. A solution obtained by dissolving acrylic acid chloride (1.04 g, 0.011 mol) in 10 mL of dichloromethane while maintaining the internal temperature at 0° C. was added dropwise while maintaining the internal temperature in the range of 0° C. or more and 5° C. or less. As the solution was dropped, the raw materials were dissolved.

After completion of the dropwise addition, the reaction liquid was returned to room temperature and stirred. After completion of the reaction, dichloromethane was removed by concentration, the resulting product was dissolved in ethyl acetate and washed with dilute hydrochloric acid, an aqueous sodium hydrogen carbonate solution, and saturated saline, and the organic layer was dried over magnesium sulfate and then concentrated. The obtained orange crystals were purified with a silica gel column (ethyl acetate/heptane=1/5 (volume ratio)) to give Propenimine derivative monomer 1 having a structural unit 1 in Table 2-1 shown below.

<Synthesis of Polymer 1>

In a 100-mL four-necked flask, 1.5 g (3.2 mmol) of Propenimine derivative monomer 1 obtained as described above, 5 mg (0.023 mmol) of 4-cyanopentanoic acid dithiobenzoate, and 1 mg (0.006 mmol) of azobisisobutyronitrile (AIBN) were dissolved in 4 mL of anisole. Then, an argon gas atmosphere was created by freeze degassing, and then the resulting solution was heated to 75° C. and polymerized by stirring. To the resulting polymer solution, 40 mL of methanol was gradually added dropwise, and then tetrahydrofuran (THF) was added thereto to remove the unreacted Propenimine derivative monomer 1. The separated polymer solution was dried in a vacuum drying oven at 40° C. for 24 hours to give Polymer 1. The number average molecular weight Mn of the obtained Polymer 1 was measured by a gel permeation chromatography (GPC) method. As a result, the Mn was 24,000.

<Preparation of Polymer Particle Dispersion Liquid 1>

While being heated at 50° C., 80 parts by mass of dichloromethane and 20 parts by mass of Polymer 1 obtained as described above were mixed and stirred to give a solution containing Polymer 1. To 100 parts by mass of the obtained solution, a mixed liquid of 99.5 parts by mass of distilled water warmed to 50° C. and 0.5 parts by mass of a 20 mass % aqueous sodium dodecylbenzenesulfonate solution was added. Then, the resulting mixture was stirred and emulsified at 16,000 rpm for 20 minutes using a homogenizer (manufactured by Heidolph) equipped with a shaft generator 18F to give an emulsion of Polymer 1.

The resulting emulsion was charged into a separable flask, and heated and stirred at 40° C. for 90 minutes with nitrogen being fed into the gas phase to remove the organic solvent, thereby obtaining Polymer particle dispersion liquid 1. The particle size of the polymer particles in Polymer particle dispersion liquid 1 was measured using an electrophoretic light scattering photometer "ELS-800" (manufactured by Otsuka Electronics Co., Ltd.). As a result, the mass average particle size was 152 nm.

<Preparation of Cyan Colorant Particle Dispersion Liquid (Cy-1)>

To 1600 parts by mass of ion-exchanged water, 90 parts by mass of sodium n-dodecyl sulfate was added. While the solution was stirred, 420 parts by mass of copper phthalocyanine (C.I. Pigment Blue 15:3) was gradually added to the solution, and then the resulting mixture was dispersed using a stirrer "CLEARMIX (registered trademark)" (manufactured by M Technique Co., Ltd.) to prepare a cyan colorant particle dispersion liquid (Cy-1).

The colorant particles in the cyan colorant particle dispersion liquid (Cy-1) had a volume-based median diameter of 110 nm.

<Production of Toner 1>

Into a reactor equipped with a stirrer, a temperature sensor, and a condenser, 602 parts by mass in terms of solid content of Polymer particle dispersion liquid 1 prepared as described above, 52 parts by mass in terms of solid content of the cyan colorant particle dispersion liquid (Cy-1), and 900 parts by mass of ion-exchanged water were charged. The temperature in the vessel was maintained at 30° C., and a 5 mol/L aqueous sodium hydroxide solution was added to adjust the pH to 10.

Then, an aqueous solution obtained by dissolving 2 parts by mass of magnesium chloride hexahydrate in 1000 parts by mass of ion-exchanged water was added dropwise under stirring over 10 minutes, and then the temperature was started to be raised. The temperature of the system was raised to 70° C. over 60 minutes, and a particle growth reaction was continued with the temperature being maintained at 70° C. In this state, the particle size of associated

[Chemical Formula 27]

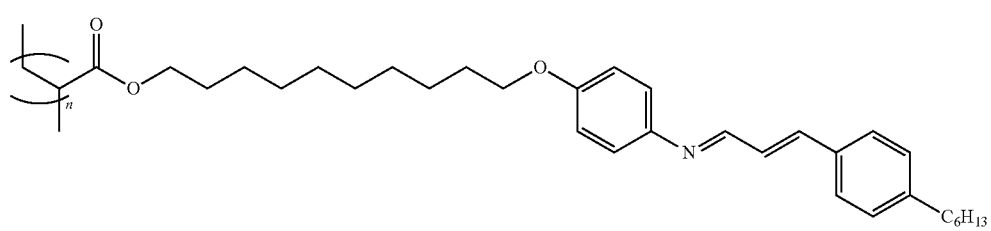

(Polymer 1)

particles was measured with "Multisizer 3" (manufactured by Beckman Coulter, Inc.), and when the volume-based median diameter (D50) reached 6.5 nm, an aqueous solution obtained by dissolving 190 parts by mass of sodium chloride in 760 parts by mass of ion-exchanged water was added to stop the particle growth. The resulting mixture was stirred at 70° C. for 1 hour, then the temperature was further raised, and the mixture was heated and stirred at 75° C. to advance fusion of the particles. Then, the mixture was cooled to 30° C. to give a dispersion liquid of toner base particles.

The dispersion liquid of toner base particles obtained as described above was subjected to solid-liquid separation with a centrifuge to form a wet cake of the toner base particles. The wet cake was washed with ion-exchanged water at 35° C. in the centrifuge until the filtrate had an electric conductivity of 5 μS/cm, then transferred to "Flash Jet Dryer (manufactured by SEISHIN ENTERPRISE Co., Ltd.)", and dried until the water content reached 0.5 mass %, thereby producing toner base particles.

To 100 parts by mass of the obtained toner base particles, 1 part by mass of hydrophobic silica (number average primary particle size: 12 nm) and 0.3 parts by mass of hydrophobic titania (number average primary particle size: 20 nm) were added and mixed using a Henschel mixer (registered trademark) to give Toner 1.

Example 2

Propenimine derivative monomer 2, Polymer 2 shown in Table 2-1 shown below, and Toner 2 were produced in the same manner as in Example 1 except that in the synthesis of Propenimine derivative monomer 1 of Example 1, 3-(4-hexylphenyl)-2-propenal was changed to 3-(4-decanophenyl)-2-propenal.

Example 3

Propenimine derivative monomer 3, Polymer 3 shown in Table 2-1 shown below, and Toner 3 were produced in the same manner as in Example 1 except that in the synthesis of Propenimine derivative monomer 1 of Example 1, 3-(4-hexylphenyl)-2-propenal was changed to 3-(4-hexyloxyphenyl)-2-propenal.

Example 4

Propenimine derivative monomer 4, Polymer 4 shown in Table 2-1 shown below, and Toner 4 were produced in the same manner as in Example 1 except that in the synthesis of Propenimine derivative monomer 1 of Example 1, 3-(4-hexylphenyl)-2-propenal was changed to 3-(4-diethylaminophenyl)-2-propenal.

Example 5

Propenimine derivative monomer 5, Polymer 5 shown in Table 2-1 shown below, and Toner 5 were produced in the same manner as in Example 1 except that in the synthesis of Propenimine derivative monomer 1 of Example 1, 3-(4-hexylphenyl)-2-propenal was changed to 3-(3-methyl-4-hexylphenyl)-2-propenal.

Example 6

Propenimine derivative monomer 6, Polymer 6 shown in Table 2-1 shown below, and Toner 6 were produced in the same manner as in Example 1 except that in the synthesis of Propenimine derivative monomer 1 of Example 1, 10-chloro-1-decanol was changed to 6-chloro-1-hexanol.

Example 7

Propenimine derivative monomer 7, Polymer 7 shown in Table 2-1 shown below, and Toner 7 were produced in the same manner as in Example 1 except that in the synthesis of Propenimine derivative monomer 1 of Example 1, 4-aminophenol was changed to 4-hexylphenol, and that 3-(4-hexylphenyl)-2-propenal was changed to 3-(4-hydroxyphenyl)-2-propenal.

Example 8

Propenimine derivative monomer 8, Polymer 8 shown in Table 2-1 shown below, and Toner 8 were produced in the same manner as in Example 1 except that in the synthesis of Propenimine derivative monomer 1 of Example 1, 4-aminophenol was changed to 4-(hydroxyhexyl)aniline, and that the step of synthesizing the target product 2 was not performed.

Example 9

Propenimine derivative monomer 9, Polymer 9 shown in Table 2-1 shown below, and Toner 9 were produced in the same manner as in Example 1 except that in the synthesis of Propenimine derivative monomer 1 of Example 1, 3-(4-hexylphenyl)-2-propenal was changed to 3-(4-hexylphenyl)-3-buten-2-one.

Example 10

Propenimine derivative monomer 10, Polymer 10 shown in Table 2-1 shown below, and Toner 10 were produced in the same manner as in Example 1 except that in the synthesis of Propenimine derivative monomer 1 of Example 1, acrylic acid chloride was changed to methacrylic acid chloride.

Example 11

Propenimine derivative monomer 11, Polymer 11 shown in Table 2-1 shown below, and Toner 11 were produced in the same manner as in Example 1 except that in the synthesis of Propenimine derivative monomer 1 of Example 1, 4-aminophenol was changed to 3-aminophenol.

Example 12

Propenimine derivative monomer 12, Polymer 12 shown in Table 2-1 shown below, and Toner 12 were produced in the same manner as in Example 1 except that in the synthesis of Propenimine derivative monomer 1 of Example 1, the target product 1 was used for the reaction with acrylic acid chloride.

Example 13

Propenimine derivative monomer 13, Polymer 13 shown in Table 2-2 shown below, and Toner 13 were produced in the same manner as in Example 1 except that in the synthesis of Propenimine derivative monomer 1 of Example 1, 3-(4-hexylphenyl)-2-propenal was changed to 3-(5-methyl-2-thienyl)-2-propenal.

Example 14

Propenimine derivative monomer 14, Polymer 14 shown in Table 2-2 shown below, and Toner 14 were produced in

Example 15

Propenimine derivative monomer 15, Polymer 15 shown in Table 2-2 shown below, and Toner 15 were produced in the same manner as in Example 1 except that in the synthesis of Propenimine derivative monomer 1 of Example 1, 3-(4-hexylphenyl)-2-propenal was changed to 3-(5-methoxy-2-thienyl)-2-propenal.

Example 16

Propenimine derivative monomer 16, Polymer 16 shown in Table 2-2 shown below, and Toner 16 were produced in the same manner as in Example 1 except that in the synthesis of Propenimine derivative monomer 1 of Example 1, 3-(4-hexylphenyl)-2-propenal was changed to 3-(4-methyl-2-thienyl)-2-propenal.

Example 17

Propenimine derivative monomer 17, Polymer 17 shown in Table 2-2 shown below, and Toner 17 were produced in the same manner as in Example 1 except that in the synthesis of Propenimine derivative monomer 1 of Example 1, 3-(4-hexylphenyl)-2-propenal was changed to 3-(5-methyl-1H-pyrrol-2-yl)-2-propenal.

Example 18

Propenimine derivative monomer 18, Polymer 18 shown in Table 2-2 shown below, and Toner 18 were produced in the same manner as in Example 1 except that in the synthesis of Propenimine derivative monomer 1 of Example 1, 3-(4-hexylphenyl)-2-propenal was changed to 3-(1-methyl-1H-pyrrol-2-yl)-2-propenal.

Example 19

Propenimine derivative monomer 19, Polymer 19 shown in Table 2-2 shown below, and Toner 19 were produced in the same manner as in Example 1 except that in the synthesis of Propenimine derivative monomer 1 of Example 1, 3-(4-hexylphenyl)-2-propenal was changed to 3-(5-methyl-2-furanyl)-2-propenal.

Example 20

Propenimine derivative monomer 20, Polymer 20 shown in Table 2-3 shown below, and Toner 20 were produced in the same manner as in Example 1 except that in the synthesis of Propenimine derivative monomer 1 of Example 1, 3-(4-hexylphenyl)-2-propenal was changed to 3-(5-methyl-3-thionyl)-2-propenal.

Example 21

Propenimine derivative monomer 21, Polymer 21 shown in Table 2-4 shown below, and Toner 21 were produced in the same manner as in Example 1 except that in the synthesis of Propenimine derivative monomer 1 of Example 1, 4-aminophenol was changed to 5-amino-thiophen-2-ol.

Example 22

Propenimine derivative monomer 22 was obtained in the same manner as in Example 21 except that in the synthesis of Propenimine derivative monomer 20 of Example 21, 3-(4-hexylphenyl)-2-propenal was changed to 3-(5-methyl-2-thienyl)-2-propenal. Then, Polymer 22 shown in Table 2-5 shown below and Toner 22 were produced in the same manner as in Example 1 except that Propenimine derivative monomer 22 was used.

Example 23

Propenimine derivative monomer 23 was obtained in the same manner as in Example 22 except that in the synthesis of Propenimine derivative monomer 22 of Example 22, 5-amino-thiophen-2-ol was changed to 5-amino-1H-pyrrol-2-ol. Then, Polymer 23 shown in Table 2-5 shown below and Toner 23 were produced in the same manner as in Example 1 except that Propenimine derivative monomer 23 was used.

Example 24

Propenimine derivative monomer 24, Polymer 24 shown in Table 2-6 shown below, and Toner 24 were produced in the same manner as in Example 1 except that in the synthesis of Propenimine derivative monomer 1 of Example 1, 3-(4-hexylphenyl)-2-propenal was changed to 3-(1-methyl-1H-pyrazol-3-yl)-2-propenal.

Example 25

Propenimine derivative monomer 25, Polymer 25 shown in Table 2-7 shown below, and Toner 25 were produced in the same manner as in Example 1 except that in the synthesis of Propenimine derivative monomer 1 of Example 1, 3-(4-hexylphenyl)-2-propenal was changed to 3-(1-methyl-1H-pyrazol-4-yl)-2-propenal.

Example 26

Propenimine derivative monomer 26, Polymer 26 shown in Table 2-8 shown below, and Toner 26 were produced in the same manner as in Example 25 except that in the synthesis of Propenimine derivative monomer 25 of Example 25, 4-aminophenol was changed to 5-amino-thiophen-2-ol.

Example 27

Propenimine derivative monomer 27, Polymer 27 shown in Table 2-9 shown below, and Toner 27 were produced in the same manner as in Example 1 except that in the synthesis of Propenimine derivative monomer 1 of Example 1, 3-(4-hexylphenyl)-2-propenal was changed to 3-(5-hexyl-2-pyridinyl)-2-propenal.

Example 28

Propenimine derivative monomer 28, Polymer 28 shown in Table 2-10 shown below, and Toner 28 were produced in the same manner as in Example 1 except that in the synthesis of Propenimine derivative monomer 1 of Example 1, 3-(4-hexylphenyl)-2-propenal was changed to 3-(1-methyl-1H-indol-2-yl)-2-propenal.

Example 29

Propenimine derivative monomer 29, Polymer 29 shown in Table 2-11 shown below, and Toner 29 were produced in the same manner as in Example 1 except that in the synthesis of Propenimine derivative monomer 1 of Example 1, 3-(4-hexylphenyl)-2-propenal was changed to 3-(5-hexyl-2-thienyl)-2-propenal.

the same manner as in Example 1 except that in the synthesis of Propenimine derivative monomer 1 of Example 1, 4-aminophenol was changed to 6-amino-2-naphthol.

Example 30

Propenimine derivative monomer 30, Polymer 30 shown in Table 2-12 shown below, and Toner 30 were produced in the same manner as in Example 1 except that in the synthesis of Propenimine derivative monomer 1 of Example 1, 4-aminophenol was changed to 4'-amino[1,1'-biphenyl]-4-ol.

Example 31

Polymer 31 shown in Table 3-1 shown below was obtained by appropriately adjusting the polymerization time in the synthesis of Polymer 1 of Example 1. Polymer 31 had the same structural unit as that of Polymer 1 and had a number average molecular weight different from that of Polymer 1. Then, Toner 31 was produced in the same manner as in Example 1 except that Polymer 31 was used instead of Polymer 1.

Example 32

Polymer 32 shown in Table 3-2 shown below and Toner 32 were produced in the same manner as in Example 1 except that in the synthesis of Polymer 1 of Example 1, the amount of addition of Propenimine derivative monomer 1 was changed from 1.5 g to 1.2 g, and that 0.3 g of styrene was added.

Example 33

Polymer 33 shown in Table 3-2 shown below and Toner 33 were produced in the same manner as in Example 1 except that in the synthesis of Polymer 1 of Example 1, the amount of addition of Propenimine derivative monomer 1 was changed from 1.5 g to 1.2 g, and that 0.3 g of ethyl acrylate was added.

Example 34

Polymer 34 shown in Table 3-2 shown below and Toner 34 were produced in the same manner as in Example 1 except that in the synthesis of Polymer 1 of Example 1, the amount of addition of Propenimine derivative monomer 1 was changed from 1.5 g to 1.2 g, and that 0.3 g of n-hexyl methacrylate was added.

Example 35

Polymer 35 shown in Table 3-2 shown below and Toner 35 were produced in the same manner as in Example 1 except that in the synthesis of Polymer 1 of Example 1, the amount of addition of Propenimine derivative monomer 1 was changed from 1.5 g to 1.2 g, and that 0.15 g of styrene and 0.15 g of n-hexyl methacrylate were added.

Example 36

<Synthesis of Macroinitiator 1>

Into a 100-mL recovery flask, 2,2'-bipyridyl (230 mg, 1.47 mmol) was charged, Cu(I)Br (95 mg, 0.66 mmol), isobutyl methacrylate (15 g, 144 mmol), and ethyl 2-bromoisobutyrate (35 mg, 0.18 mmol) were further added thereto in a glove box under a nitrogen atmosphere, and the glove box was sealed. The resulting mixture was heated and stirred in an oil bath at 100° C., and as a result, the molecular weight linearly increased with time. Then, an appropriate amount of tetrahydrofuran was added, and the resulting mixture was passed through a neutral alumina column. The mixture was purified by reprecipitation and centrifugation with methanol to give Macroinitiator 1. The number average molecular weight (βMn) of the obtained Macroinitiator 1 was measured by a GPC method. As a result, the DMn was 10,000.

<Synthesis of Polymer 36 and Production of Toner 36>

Into a 100-mL recovery flask, Propenimine derivative monomer 1 (18 g, 35 mmol) obtained as described above and Macroinitiator 1 (1.1 g, 0.22 mmol) were charged, and Cu(I)Cl (29 mg, 0.29 mmol), 1,1,4,7,10,10-hexamethyltriethylenetetramine (136 mg, 0.59 mmol), and anisole (4.9 g, 41.1 mmol) as a solvent were further added thereto in a glove box under a nitrogen atmosphere, and the glove box was sealed. The resulting mixture was heated and stirred in an oil bath at 80° C., and as a result, the molecular weight linearly increased with time. Then, an appropriate amount of chloroform was added, and the resulting mixture was passed through a basic alumina column. The mixture was purified by reprecipitation and centrifugation with methanol to give Polymer 36 shown in Table 3-2 shown below. The overall number average molecular weight Mn of the obtained Polymer 36 was measured by a GPC method. As a result, the Mn was 18,000. From the obtained value, the number average molecular weight (aMn) derived from a structural unit containing a propenimine structure-containing group (structural unit derived from Propenimine derivative monomer 1) was calculated to be 8,000.

Then, Toner 36 was produced in the same manner as in Example 1 except that Polymer 36 was used instead of Polymer 1.

Example 37

Macroinitiator 2 was obtained in the same manner as in Example 36 except that in the synthesis of Macroinitiator 1 of Example 36, ethyl 2-bromoisobutyrate was changed to α,α'-dibromo-p-xylene. Then, Polymer 37 shown in Table 3-2 shown below was obtained in the same manner as in Example 36 except that Macroinitiator 1 was changed to Macroinitiator 2. Further, Toner 37 was produced in the same manner as in Example 1 except that Polymer 37 was used instead of Polymer 1.

Example 38

Macroinitiator 3 was obtained in the same manner as in Example 36 except that in the synthesis of Macroinitiator 1 of Example 36, ethyl 2-bromoisobutyrate was changed to ethylene bis(2-bromoisobutyrate), that 2,2'-bipyridyl was changed to 1,1,4,7,10,10-hexamethyltriethylenetetramine, that isobutyl methacrylate was changed to Propenimine derivative monomer 1, and that anisole was further added. Then, Polymer 38 shown in Table 3-2 shown below was obtained in the same manner as in Example 36 except that in the synthesis of Polymer 36 of Example 36, Macroinitiator 1 was changed to Macroinitiator 3, that 1,1,4,7,10,10-hexamethyltriethylenetetramine was changed to 2,2'-bipyridyl, that Propenimine derivative monomer 1 was changed to isobutyl methacrylate, and that anisole was not added. Further, Toner 38 was produced in the same manner as in Example 1 except that Polymer 38 was used instead of Polymer 1.

Example 39

Macroinitiator 4 was obtained in the same manner as in Example 36 except that in the synthesis of Macroinitiator 1 of Example 36, ethyl 2-bromoisobutyrate was changed to 1,1,1-tris(2-bromoisobutyryloxymethyl)ethane. Then, Polymer 39 shown in Table 3-2 shown below was obtained in the same manner as in Example 36 except that in the synthesis of Polymer 36 of Example 36, Macroinitiator 1 was changed to Macroinitiator 4. Further, Toner 39 was produced in the same manner as in Example 1 except that Polymer 39 was used instead of Polymer 1.

Example 40

Macroinitiator 5 was obtained in the same manner as in Example 38 except that in the synthesis of Macroinitiator 3 of Example 38, ethylene bis(2-bromoisobutyrate) was changed to 1,1,1-tris(2-bromoisobutyryloxymethyl)ethane. Then, Polymer 40 shown in Table 3-2 shown below was obtained in the same manner as in Example 38 except that in the synthesis of Polymer 38 of Example 38, Macroinitiator 3 was changed to Macroinitiator 5. Further, Toner 40 was produced in the same manner as in Example 1 except that Polymer 40 was used instead of Polymer 1.

Example 41

Macroinitiator 6 was obtained in the same manner as in Example 36 except that in the synthesis of Macroinitiator 1 of Example 36, ethyl 2-bromoisobutyrate was changed to pentaerythritol tetrakis(2-bromoisobutyrate). Then, Polymer 41 shown in Table 3-2 shown below was obtained in the same manner as in Example 36 except that in the synthesis of Polymer 36 of Example 36, Macroinitiator 1 was changed to Macroinitiator 6. Further, Toner 41 was produced in the same manner as in Example 1 except that Polymer 41 was used instead of Polymer 1.

Example 42

Macroinitiator 7 was obtained in the same manner as in Example 38 except that in the synthesis of Macroinitiator 3 of Example 38, ethylene bis(2-bromoisobutyrate) was changed to pentaerythritol tetrakis(2-bromoisobutyrate). Then, Polymer 42 shown in Table 3-2 shown below was obtained in the same manner as in Example 38 except that in the synthesis of Polymer 38 of Example 38, Macroinitiator 3 was changed to Macroinitiator 7. Further, Toner 42 was produced in the same manner as in Example 1 except that Polymer 42 was used instead of Polymer 1.

Example 43

Macroinitiator 8 having a structure similar to that of Macroinitiator 1 and having a number average molecular weight (βMn) of 4,500 was obtained by appropriately adjusting the time for heating and stirring in an oil bath at 100° C. in the synthesis of Macroinitiator 1 of Example 36. Polymer 43 shown in Table 3-2 shown below, which contained a structural unit similar to that of Polymer 36 and had an overall number average molecular weight Mn of 5,000, was obtained by changing Macroinitiator 2 to Macroinitiator 8, and appropriately adjusting the time for heating and stirring in an oil bath at 80° C. in the synthesis of Polymer 36 of Example 36. In Polymer 43, a block containing a propenimine structure-containing group had a number average molecular weight (αMn) of 500. Then, Toner 43 was produced in the same manner as in Example 1 except that Polymer 43 was used instead of Polymer 1.

Example 44

Macroinitiator 9 was obtained in the same manner as in Example 37 except that in the synthesis of Macroinitiator 2 of Example 37, isobutyl methacrylate was changed to styrene. Then, Polymer 44 shown in Table 3-2 shown below was obtained in the same manner as in Example 37 except that in the synthesis of Polymer 37 of Example 37, Macroinitiator 2 was changed to Macroinitiator 9. Further, Toner 44 was produced in the same manner as in Example 1 except that Polymer 44 was used instead of Polymer 1.

Example 45

Macroinitiator 10 was obtained in the same manner as in Example 37 except that in the synthesis of Macroinitiator 2 of Example 37, isobutyl methacrylate was changed to butyl acrylate. Then, Polymer 45 shown in Table 3-2 shown below was obtained in the same manner as in Example 37 except that in the synthesis of Polymer 37 of Example 37, Macroinitiator 2 was changed to Macroinitiator 10. Further, Toner 45 was produced in the same manner as in Example 1 except that Polymer 45 was used instead of Polymer 1.

Example 46

Macroinitiator 11 was obtained in the same manner as in Example 37 except that in the synthesis of Macroinitiator 2 of Example 37, isobutyl methacrylate was changed to 3-methyl-1-pentene. Then, Polymer 46 shown in Table 3-2 shown below was obtained in the same manner as in Example 37 except that in the synthesis of Polymer 37 of Example 37, Macroinitiator 2 was changed to Macroinitiator 11. Toner 46 was produced in the same manner as in Example 1 except that Polymer 46 was used.

Example 47

Macroinitiator 12 was obtained in the same manner as in Example 37 except that in the synthesis of Macroinitiator 2 of Example 37, isobutyl acrylate was changed to a mixture having a ratio of isobutyl acrylate:styrene of 5:5. Then, Polymer 47 shown in Table 3-2 shown below was obtained in the same manner as in Example 37 except that in the synthesis of Polymer 37 of Example 37, Macroinitiator 2 was changed to Macroinitiator 12. Toner 47 was produced in the same manner as in Example 1 except that Polymer 47 was used.

Example 48

Toner 48 was obtained in the same manner as in Example 1 except that in the production of Toner 1 of Example 1, the amount of Polymer particle dispersion liquid 1 was changed from 602 parts by mass to 421 parts by mass in terms of solid content, and that 181 parts by mass of a styrene acrylic resin particle dispersion liquid 1 described below was added in terms of solid content.

[Production of Binder Resin]
(Preparation of Styrene Acrylic Resin Particle Dispersion Liquid 1 Containing Styrene Acrylic Resin 1)
(First Stage Polymerization)

Into a reaction vessel equipped with a stirrer, a temperature sensor, a condenser, and a nitrogen introduction device, a solution obtained by dissolving 8 parts by mass of sodium dodecyl sulfate in 3000 parts by mass of ion-exchanged water was charged, and the internal temperature was raised to 80° C. with stirring at a stirring speed of 230 rpm under a nitrogen stream. After the temperature rise, a solution obtained by dissolving 10 parts by mass of potassium persulfate in 200 parts by mass of ion-exchanged water was added, the liquid temperature was again adjusted to 80° C., and a polymerizable monomer solution containing 480 parts by mass of styrene, 250 parts by mass of n-butyl acrylate, 68.0 parts by mass of methacrylic acid, and 16.0 parts by mass of n-octyl-3-mercaptopropionate was added dropwise over 1 hour. Then, the contents were polymerized by heating and stirring at 80° C. for 2 hours to prepare a styrene acrylic resin particle dispersion liquid (1A) containing styrene acrylic resin particles (1a).

(Second Stage Polymerization)

Into a reaction vessel equipped with a stirrer, a temperature sensor, a condenser, and a nitrogen introduction device, a solution obtained by dissolving 7 parts by mass of sodium polyoxyethylene-2-dodecyl ether sulfate in 800 parts by mass of ion-exchanged water was charged. The solution was heated to 98° C., and then 260 parts by mass of the styrene acrylic resin particle dispersion liquid (1A), and a polymerizable monomer solution obtained by dissolving, at 90° C., 245 parts by mass of styrene, 120 parts by mass of n-butyl acrylate, 1.5 parts by mass of n-octyl-3-mercaptopropionate, and 67 parts by mass of paraffin wax "HNP-11" (manufactured by NIPPON SEIRO CO., LTD.) as a release agent were added thereto. Then, the resulting mixture was mixed and dispersed for 1 hour by a mechanical disperser "CLEARMIX" (manufactured by M Technique Co., Ltd.) having a circulation path to prepare a dispersion liquid containing emulsified particles (oil droplets). Then, an initiator solution obtained by dissolving 6 parts by mass of potassium persulfate in 200 parts by mass of ion-exchanged water was added to the dispersion liquid, and the resulting system was heated and stirred at 82° C. for 1 hour to perform polymerization, thereby preparing a styrene acrylic resin particle dispersion liquid (1B) containing styrene acrylic resin particles (1b).

(Third Stage Polymerization)

A solution obtained by dissolving 11 parts by mass of potassium persulfate in 400 parts by mass of ion-exchanged water was added to the styrene acrylic resin particle dispersion liquid (1B). The temperature of the solution was adjusted to 82° C., and a polymerizable monomer solution containing 435 parts by mass of styrene, 130 parts by mass of n-butyl acrylate, 33 parts by mass of methacrylic acid, and 8 parts by mass of n-octyl-3-mercaptopropionate was added dropwise over 1 hour. After completion of the dropwise addition, the contents were polymerized by heating and stirring for 2 hours, and then the resulting product was cooled to 28° C. to give a styrene acrylic resin particle dispersion liquid 1 containing a styrene acrylic resin 1. The glass transition temperature (Tg) of the styrene acrylic resin 1 was measured and found to be 45° C.

Example 49

Toner 49 was obtained in the same manner as in Example 1 except that in the production of Toner 1, the amount of Polymer particle dispersion liquid 1 was changed from 602 parts by mass to 421 parts by mass in terms of solid content, and that 181 parts by mass of a polyester resin particle dispersion liquid 1 described below was added in terms of solid content.

[Production of Binder Resin]
(Preparation of Polyester Resin Particle Dispersion Liquid 1 Containing Polyester Resin 1)

Into a 10-L four-necked flask equipped with a nitrogen introducing tube, a dehydration tube, a stirrer, and a thermocouple, 524 parts by mass of a bisphenol A propylene oxide 2 mol adduct, 105 parts by mass of terephthalic acid, 69 parts by mass of fumaric acid, and 2 parts by mass of tin ocrylate (an esterification catalyst) were charged, and the contents were subjected to a polycondensation reaction at a temperature of 230° C. for 8 hours. Further, the polycondensation reaction was continued at 8 kPa for 1 hour, and then the resulting product was cooled to 160° C. to give a polyester resin 1. Using "Roundel Mill model RM" (manufactured by TOKUJU CORPORATION), 100 parts by mass of the polyester resin 1 was pulverized. The polyester resin 1 was mixed with 638 parts by mass of a 0.26 mass % aqueous sodium lauryl sulfate solution prepared in advance, and was ultrasonically dispersed at V-LEVEL, 300 μA for 30 minutes using an ultrasonic homogenizer "US-150T" (manufactured by NIHONSEIKI KAISHA LTD.) with stirring to give a polyester resin particle dispersion liquid 1. The particle size of the polyester resin particles in the polyester resin particle dispersion liquid 1 was measured by a dynamic light scattering method using "Microtrac UPA-150" (manufactured by NIKKISO CO., LTD.). As a result, the volume-based median diameter was 135 nm. The glass transition temperature (Tg) of the polyester resin 1 was measured and found to be 42° C.

Comparative Example 1

<Comparative Compound (Azobenzene Derivative)>

The following comparative compound (an azobenzene derivative, number average molecular weight Mn: 2,870) was obtained by the method described in paragraphs 0217 to 0227 of JP 2014-191078 A.

[Chemical Formula 28]

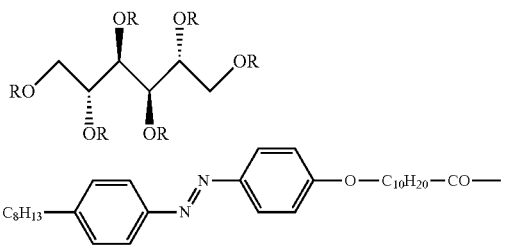

<Preparation of Comparative Compound Dispersion Liquid>

A comparative compound dispersion liquid was obtained in the same manner as in Example 1 except that in <Preparation of Polymer particle dispersion liquid 1> of Example 1, Polymer 1 was changed to a comparative compound (azobenzene derivative).

<Production of toner of Comparative Example 1>

Toner 50 was obtained in the same manner as in Example 1 except that Polymer particle dispersion liquid 1 of Example 1 was changed to the comparative compound dispersion liquid prepared as described above.

Comparative Example 2

Toner 51 was obtained in the same manner as in Example 1 except that in <Production of Toner 1> of Example 1, Polymer particle dispersion liquid 1 was changed to the styrene acrylic resin particle dispersion liquid 1 prepared in Example 48.

<Measurement Method>
(Number Average Molecular Weight Mn)

The number average molecular weight Mn of Polymers 1 to 47 and the comparative compound (azobenzene derivative) of Comparative Example 1 was measured by a GPC method. Specifically, using an apparatus "HLC-8120 GPC" (manufactured by Tosoh Corporation) and a column "TSK guard column+TSKgel Super HZ-M3 series" (manufactured by Tosoh Corporation), tetrahydrofuran (THF) as a carrier solvent was allowed to flow at a flow rate of 0.2 mL/min with the column temperature being maintained at 40° C. The measurement sample was dissolved in tetrahydrofuran so that the resulting solution might have a concentration of 1 mg/mL. The solution was prepared by performing the treatment at room temperature for 5 minutes using an ultrasonic disperser. Then, the solution was treated with a membrane filter having a pore size of 0.2 μm to give a sample solution, 10 μL of the sample solution was injected into the apparatus together with the carrier solvent, and the refractive index was detected using a refractive index detector (RI detector). The molecular weight distribution of the measurement sample was calculated based on the calibration curve prepared using monodispersed polystyrene standard particles. As for the polystyrene for preparing the calibration curve, 10 types of particles were used.

As for Polymers 36 to 47, in addition to the overall number average molecular weight, the number average molecular weight of the macroinitiator was also measured by the above-mentioned method. In addition, the number average molecular weight of the macroinitiator was defined as the number average molecular weight of the polymer block α or β, and (the number average molecular weight of the macroinitiator×the number of blocks) was subtracted from the overall number average molecular weight of the polymer for each block structure to calculate the total number average molecular weight of the other polymer block (the number average molecular weight of the other polymer block×the number of blocks). The results are shown in Table 3-2 shown below. In Table 3-2, Mn represents the overall number average molecular weight of the polymer, αMn represents the total number average molecular weight of the polymer block α, and βMn represents the total number average molecular weight of the polymer block β.

(Glass Transition Temperature (Tg))

The glass transition temperature (Tg) of the binder resin was measured by DSC 7000X manufactured by Hitachi High-Tech Science Corporation. Specifically, about 3 mg of the binder resin was precisely weighed to two digits after the decimal point, sealed in an aluminum pan, and set in the DSC. As a reference, an empty aluminum pan was used. As for the measurement conditions, a first temperature rise process of increasing the temperature from 0° C. to 200° C. at a temperature rise rate of 10° C./min; a cooling process of cooling the resin from 200° C. to 0° C. at a temperature decrease rate of 10° C./min; and a second temperature rise process of increasing the temperature from 0° C. to 200° C. at a temperature rise rate of 10° C./min were performed in this order. Then, analysis was performed based on the data in the second temperature rise process. The value at the intersection between the extended line of the baseline before the rise of the first endothermic peak and the tangent on the maximum inclination between the rising portion and the peak apex of the first endothermic peak was defined as the glass transition temperature. The glass transition temperatures of the polymers and the toners produced in the examples and comparative examples can also be measured by the same method.

[Evaluation Method]
(Photoresponsive Adhesion Test of Polymers)

Figure 3:
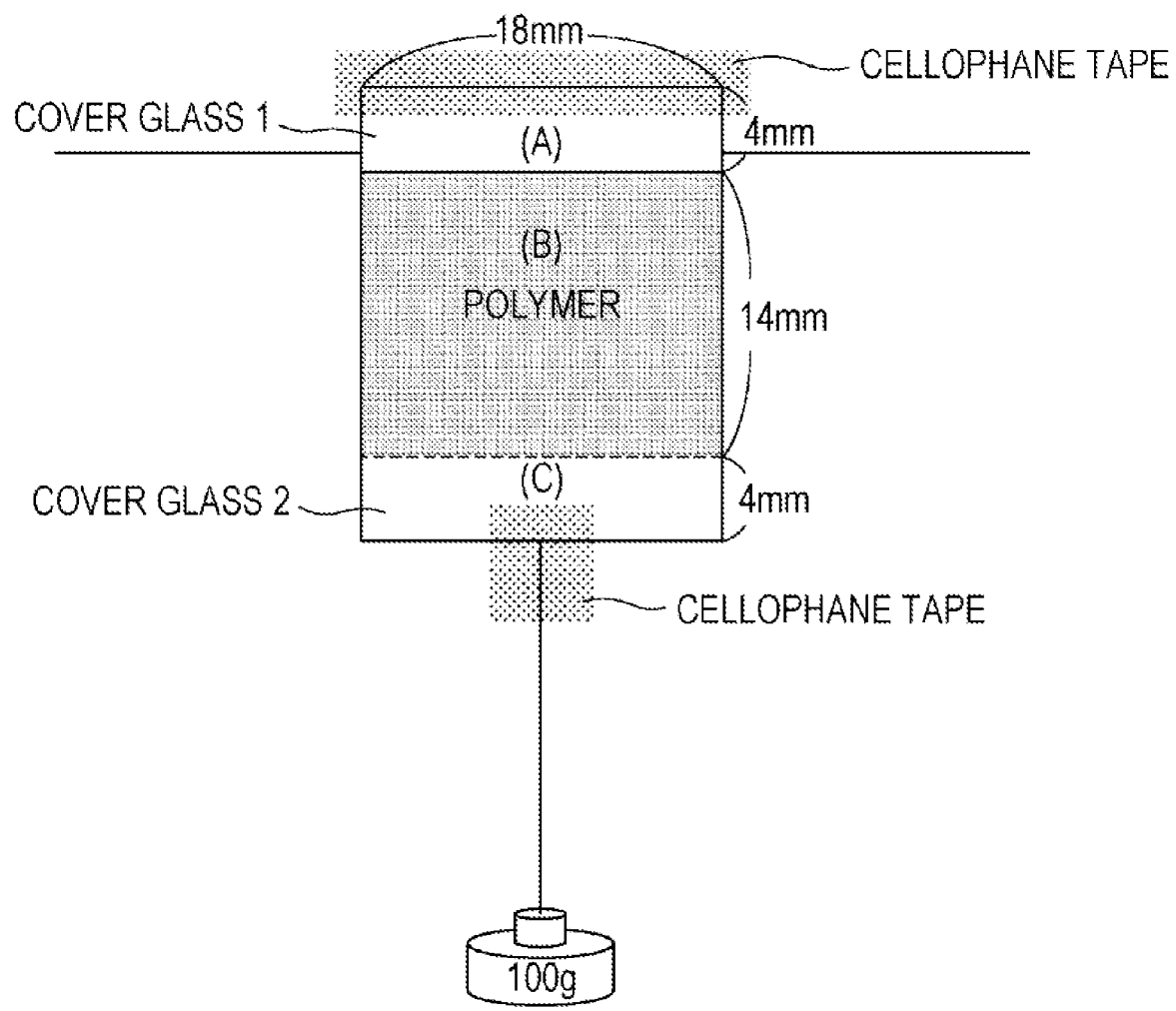
FIG. 3 is a schematic view of a device for measuring a change in adhesiveness of polymers due to light irradiation used in a photoresponsive adhesion test in examples.

Polymers 1 to 47 prepared in Examples 1 to 47 and the comparative compound (azobenzene derivative) of Comparative Example 1 were evaluated for changes in adhesiveness due to light irradiation by the following photoresponsive adhesion test using a device shown in FIG. 3. As shown in FIG. 3, 2 mg of a sample of a polymer or the comparative compound was placed on a 18-mm square cover glass 1 within a 6-mm radius from the center of the cover glass 1, and a cover glass 2 of the same size was placed on the cover glass 1 at a position shifted by about 4 mm in a direction parallel to the cover glass 1 so as to cover the entire sample of the polymer or the comparative compound. The resulting product was heated to melt the sample, and the cover glass 1 and the cover glass 2 were adhered to each other. Each of the obtained samples was subjected to the following test of non-flowable state→flowable state, and then subjected to the following test of flowable state→non-flowable state (return).

<Test of Non-Flowable State→Flowable State>

A portion (A) shown in FIG. 3 was fixed to a table with a cellophane tape, and a 30-cm long vinyl string having a weight of 100 g attached thereto was fixed to a portion (C) with a cellophane tape. A portion (B) was irradiated with light having a wavelength of 365 nm at an irradiation amount of 18 J/cm$^2$, and whether or not the cover glass 2 was peeled off from the cover glass 1 was observed and determined according to the following evaluation criteria. The results are shown in Tables 3-1 and 3-2 shown below.

Evaluation criteria for test of non-flowable state→flowable state
- ○: The cover glass 2 was completely peeled off from the cover glass 1.
- Δ: The cover glass 2 was displaced.
- x: The cover glass 2 did not move.

<Test of Flowable State→Non-Flowable State (Return)>

After the test of non-flowable state→flowable state, each sample evaluated as "○" in the test of non-flowable state→flowable state was left at room temperature for 1 hour, then a cover glass 3 (having the same size as those of the cover glasses 1 and 2) was placed so as to cover the sample portion (portion (B)) of the cover glass 1 used in the above-mentioned test, and whether or not the cover glasses 1 and 3 were adhered to each other was observed and determined according to the following evaluation criteria. The results are shown in Tables 3-1 and 3-2 shown below.

Evaluation criteria for test of flowable state→non-flowable state (return)
- ○: The cover glasses 1 and 3 did not adhere to each other (the sample was non-fluidized).
- Δ: The cover glasses 1 and 3 partially adhered to each other (the fluidized state was partially maintained).
- x: The cover glasses 1 and 3 adhered to each other (the fluidized state was maintained).

As for all of Polymers 1 to 47 prepared in Examples 1 to 47 for which the evaluation of the test of flowable state→non-flowable state (return) was "○", it was confirmed that the polymers were reversibly non-fluidized (resolidified) after the test of non-flowable state→flowable state.

(Fixability Test of Toners)
(Production of Developers)

Each of Toners 1 to 51 produced as described above was mixed with ferrite carrier particles having a volume average particle size of 30 μm and coated with a copolymer resin of cyclohexane methacrylate and methyl methacrylate (mass ratio between monomers 1:1) so that the resulting mixture might have a toner concentration of 6 mass % to give Developers 1 to 51. The components were mixed for 30 minutes using a V-type mixer.

(Image Formation; Production of Printed Matters)

Using each of Developers 1 to 51, a toner image was formed on plain paper (gloss coated paper) as a recording medium to produce a printed matter.

Specifically, a developer was disposed while being slid by a magnetic force between a pair of parallel plate (aluminum) electrodes having a developer on one side and plain paper (gloss coated paper, basis weight: 128 g/m²) on the other side. A toner was developed under conditions of a gap between electrodes of 0.5 mm and a toner adhesion amount under a DC bias and an AC bias of 4 g/m², and a toner layer (toner image) was formed on the surface of plain paper. The obtained toner image was fixed by a fixing device to give a printed matter having the toner image formed thereon.

<Fixability Test>

A 1-cm square toner image of the printed matter obtained in "Image formation; production of printed matters" was rubbed 20 times with "JK Wiper (registered trademark)" (manufactured by NIPPON PAPER CRECIA CO., LTD.) under a pressure of 40 kPa, and the fixing rate of the image was evaluated. A fixing rate of 60% or more was regarded as pass. Herein, the image fixing rate is a numerical value obtained by measuring the reflection densities of the image after printing and the image after rubbing with a fluorescent spectrodensitometer "FD-7" (manufactured by KONICA MINOLTA, INC.), and dividing the reflection density of the rubbed solid image by the reflection density of the printed solid image, and is expressed in percentage. The fixing rate of the image was measured under a normal temperature and normal humidity environment (temperature: 20° C., relative humidity: 50% RH).

As for the fixing device, the following four types of fixing devices formed by appropriately modifying the device illustrated in FIG. 2 were used.

Fixing device No. 1: In FIG. 2, the pressure-bonding unit 9 is omitted, the irradiation unit 40 emits ultraviolet light having a wavelength of 365 nm (light source: an LED light source having an emission wavelength of 365 nm±10 nm), and the irradiation amount is 13 J/cm².

Fixing device No. 2: In FIG. 2, the pressure-bonding unit 9 is provided, the pressurizing member 91 has a temperature of 20° C. (without heating), and the pressure at the time of pressurization is 0.2 MPa. The light source and the irradiation amount of the irradiation unit 40 are similar to those of the fixing device No. 1.

Fixing device No. 3: In FIG. 2, the pressure-bonding unit 9 is provided, the pressurizing member 91 has a temperature of 80° C. (with heating), and the pressure at the time of pressurization is 0.2 MPa. The light source and the irradiation amount of the irradiation unit 40 are similar to those of the fixing device No. 1.

Fixing device No. 4: In FIG. 2, the pressure-bonding unit 9 is provided, the pressurizing member 91 has a temperature of 160° C. (with heating), and the pressure at the time of pressurization is 0.2 MPa. Light irradiation is not performed.

Examples 1 to 49 and Comparative Example 1 were performed with Developers 1 to 49 (Toners 1 to 49) and Developer 50 (Toner 50), respectively, using the fixing device No. 1. Example 50 was performed with Developer 1 (Toner 1) using the fixing device No. 2. Example 51 was performed with Developer 1 (Toner 1) using the fixing device No. 3. Comparative Example 2 was performed with Developer 51 (Toner 51) using the fixing device No. 4.

(Color Reproducibility Evaluation)

The images of printed matters of examples and comparative examples obtained as described above were evaluated for color reproducibility based on visual evaluation by 10 panelists according to the following evaluation criteria.

Specifically, Developer 51 (Toner 51) of Comparative Example 2 was developed in the same manner as in "Image formation; production of printed matters" to form a toner layer (toner image), and the image was fixed by the fixing device No. 4 to produce a printed matter. The image of the printed matter was defined as a "comparative sample for evaluation". The 10 panelists were shown the comparative sample for evaluation and the image samples of the printed matters obtained in the examples and Comparative Example 1 in order, and asked if the colors of the two types of images were clearly different. The determination results according to the following evaluation criteria for color reproducibility are shown in Tables 4-1 and 4-2 shown below.

Evaluation criteria for color reproducibility
⊚: 2 or less panelists answered that the images had clearly different colors.
○: 3 to 4 panelists answered that the images had clearly different colors.
Δ: 5 to 7 panelists answered that the images had clearly different colors.
x: 8 or more panelists answered that the images had clearly different colors.

TABLE 2-1

(Structural unit contained in polymer)

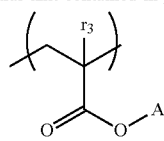

(Structure of propenimine structure-containing group A) General formula (2-a) General formula (2-b) General formula (2-c)

A = 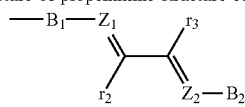  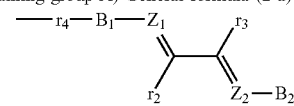  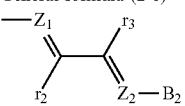

TABLE 2-1-continued (Structure of $B_1$—$Z_1$=C—C=$Z_2$—$B_2$)

| Polymer No. | Structural unit No | $r_1$ | A | $r_2$ | $r_3$ | Number of carbon atoms of $r_4$ | Substitution position of $B_1$ | $Z_1$ | $Z_2$ | $R_{11}$ | $R_{12}$ | $R_{13}$ | $R_{14}$ | $R_{15}$ | $R_{16}$ | $R_{17}$ | $R_{18}$ | $R_{19}$ | $R_{20}$ |
|---|---|---|---|---|---|---|---|---|---|---|---|---|---|---|---|---|---|---|---|
| 1 | 1 | H | 2-c | H | H | 10 | $R_{13}$ | N | CH | H | H | — | H | H | H | H | $C_6H_{13}$ | H | H |
| 2 | 2 | H | 2-c | H | H | 10 | $R_{13}$ | N | CH | H | H | — | H | H | H | H | $C_{16}H_{21}$ | H | H |
| 3 | 3 | H | 2-c | H | H | 10 | $R_{13}$ | N | CH | H | H | — | H | H | H | H | $OC_6H_{13}$ | H | H |
| 4 | 4 | H | 2-c | H | H | 10 | $R_{13}$ | N | CH | H | H | — | H | H | H | H | $N(C_2H_5)_2$ | H | H |
| 5 | 5 | H | 2-c | H | H | 10 | $R_{13}$ | N | CH | H | H | — | H | H | H | $CH_3$ | $C_6H_{13}$ | H | H |
| 6 | 6 | H | 2-c | H | H | 6 | $R_{13}$ | N | CH | H | H | — | H | H | H | H | $C_6H_{13}$ | H | H |
| 7 | 7 | H | 2-c | H | H | 10 | $R_{13}$ | CH | N | H | H | — | H | H | | H | $C_6H_{13}$ | H | H |
| 8 | 8 | H | 2-c | H | H | 10 | $R_{13}$ | N | CH | H | H | — | H | H | H | H | $C_6H_{13}$ | H | H |
| 9 | 9 | H | 2-c | $CH_3$ | H | 10 | $R_{13}$ | N | CH | H | H | — | H | H | H | H | $C_6H_{13}$ | H | H |
| 10 | 10 | $CH_3$ | 2-c | H | H | 10 | $R_{13}$ | N | CH | H | H | — | H | H | H | H | $C_6H_{13}$ | H | H |
| 11 | 11 | H | 2-c | H | H | 10 | $R_{12}$ | N | CH | H | — | H | H | H | H | H | $C_6H_{13}$ | H | H |
| 12 | 12 | H | 2-a | H | H | — | $R_{13}$ | N | CH | H | H | — | H | H | H | H | $C_6H_{13}$ | H | H |

TABLE 2-2

(Structure of $B_1$—$Z_1$=C—C=$Z_2$—$B_2$)

| Polymer No. | Structural unit No | $r_1$ | A | $r_2$ | $r_3$ | Number of carbon atoms of $r_4$ | Substitution position of $B_1$ | $Z_1$ | $Z_2$ | $X_1$ | $R_{21}$ | $R_{22}$ | $R_{23}$ | $R_{24}$ | $R_{25}$ | $R_{26}$ | $R_{27}$ | $R_{28}$ |
|---|---|---|---|---|---|---|---|---|---|---|---|---|---|---|---|---|---|---|
| 13 | 13 | H | 2-c | H | H | 10 | $R_{23}$ | N | CH | S | H | H | — | H | H | $CH_3$ | H | H |
| 14 | 14 | H | 2-c | H | H | 10 | $R_{23}$ | N | CH | S | H | H | — | H | H | $C_6H_{13}$ | H | H |
| 15 | 15 | H | 2-c | H | H | 10 | $R_{23}$ | N | CH | S | H | H | — | H | H | $OCH_3$ | H | H |
| 16 | 16 | H | 2-c | H | H | 10 | $R_{23}$ | N | CH | S | H | H | — | H | H | H | $CH_3$ | H |
| 17 | 17 | H | 2-c | H | H | 10 | $R_{23}$ | N | CH | NH | H | H | — | H | H | $CH_3$ | H | H |
| 18 | 18 | H | 2-c | H | H | 10 | $R_{23}$ | N | CH | $NCH_3$ | H | H | — | H | H | H | H | H |
| 19 | 19 | H | 2-c | H | H | 10 | $R_{23}$ | N | CH | O | H | H | — | H | H | $CH_3$ | H | H |

TABLE 2-3

(Structure of B$_1$—Z$_1$=C—C=Z$_2$—B$_2$)

| Polymer No. | Structural unit No | r$_1$ | A | r$_2$ | r$_3$ | Number of carbon atoms of r$_4$ | Substitution position of B$_1$ | Z$_1$ | Z$_2$ | X$_2$ | B$_1$ R$_{29}$ | R$_{30}$ | R$_{31}$ | R$_{32}$ | R$_{33}$ | B$_2$ R$_{34}$ | R$_{35}$ | R$_{36}$ |
|---|---|---|---|---|---|---|---|---|---|---|---|---|---|---|---|---|---|---|
| 20 | 20 | H | 2-c | H | H | 10 | R$_{31}$ | N | CH | S | H | H | — | H | H | H | CH$_3$ | H |

TABLE 2-4

(Structure of B$_1$—Z$_1$=C—C=Z$_2$—B$_2$)

| Polymer No. | Structural unit No | r$_1$ | A | r$_2$ | r$_3$ | Number of carbon atoms of r$_4$ | Substitution position of B$_1$ | Z$_1$ | Z$_2$ | X$_3$ | B$_1$ R$_{37}$ | R$_{38}$ | R$_{39}$ | B$_2$ R$_{40}$ | R$_{41}$ | R$_{42}$ | R$_{43}$ | R$_{44}$ |
|---|---|---|---|---|---|---|---|---|---|---|---|---|---|---|---|---|---|---|
| 21 | 21 | H | 2-b | H | H | 10 | R$_{38}$ | CH | N | S | H | H | — | H | H | C$_6$H$_{13}$ | H | H |

TABLE 2-5

(Structure of B$_1$—Z$_1$=C—C=Z$_2$—B$_2$)

| Polymer No. | Structural unit No | r$_1$ | A | r$_2$ | r$_3$ | Number of carbon atoms of r$_4$ | Substitution position of B$_1$ | Z$_1$ | Z$_2$ | X$_4$ | X$_5$ | B$_1$ R$_{45}$ | R$_{46}$ | R$_{47}$ | B$_2$ R$_{48}$ | R$_{49}$ | R$_{50}$ |
|---|---|---|---|---|---|---|---|---|---|---|---|---|---|---|---|---|---|
| 22 | 22 | H | 2-b | H | H | 10 | R$_{47}$ | N | CH | S | S | H | H | — | CH$_3$ | H | H |
| 23 | 23 | H | 2-b | H | H | 10 | R$_{47}$ | N | CH | NH | S | H | H | — | CH$_3$ | H | H |

TABLE 2-6

(Structure of $B_1-Z_1=C-C=Z_2-B_2$)

| Polymer No. | Structural unit No | $r_1$ | A | $r_2$ | $r_3$ | Number of carbon atoms of $r_4$ | Substitution position of $B_1$ | $Z_1$ | $Z_2$ | $R_{51}$ | $R_{52}$ | $R_{53}$ | $R_{54}$ | $R_{55}$ | $R_{56}$ | $R_{57}$ | $R_{58}$ |
|---|---|---|---|---|---|---|---|---|---|---|---|---|---|---|---|---|---|
| | | | | | | | | | | $B_1$ | | | | | $B_2$ | | |
| 24 | 24 | H | 2-c | H | H | 10 | $R_{53}$ | N | CH | H | H | — | H | H | CH$_3$ | H | H |

TABLE 2-7

(Structure of $B_1-Z_1=C-C=Z_2-B_2$)

| Polymer No. | Structural unit No | $r_1$ | A | $r_2$ | $r_3$ | Number of carbon atoms of $r_4$ | Substitution position of $B_1$ | $Z_1$ | $Z_2$ | $R_{59}$ | $R_{60}$ | $R_{61}$ | $R_{62}$ | $R_{63}$ | $R_{64}$ | $R_{65}$ | $R_{66}$ |
|---|---|---|---|---|---|---|---|---|---|---|---|---|---|---|---|---|---|
| | | | | | | | | | | $B_1$ | | | | | $B_2$ | | |
| 25 | 25 | H | 2-c | H | H | 10 | $R_{61}$ | N | CH | H | H | — | H | H | H | CH$_3$ | H |

TABLE 2-8

(Structure of $B_1-Z_1=C-C=Z_2-B_2$)

| Polymer No. | Structural unit No | $r_1$ | A | $r_2$ | $r_3$ | Number of carbon atoms of $r_4$ | Substitution position of $B_1$ | $Z_1$ | $Z_2$ | $X_6$ | $R_{67}$ | $R_{68}$ | $R_{69}$ | $R_{70}$ | $R_{71}$ | $R_{72}$ |
|---|---|---|---|---|---|---|---|---|---|---|---|---|---|---|---|---|
| | | | | | | | | | | $B_1$ | | | | $B_2$ | | |
| 26 | 26 | H | 2-c | H | H | 10 | $R_{69}$ | CH | N | S | H | H | — | H | CH$_3$ | H |

TABLE 2-9

(Structure of $B_1-Z_1=C-C=Z_2-B_2$)

| Polymer No. | Structural unit No | $r_1$ | A | $r_2$ | $r_3$ | Number of carbon atoms of $r_4$ | Substitution position of $B_1$ | $Z_1$ | $Z_2$ | $B_1$ $R_{73}$ | $R_{74}$ | $R_{75}$ | $R_{76}$ | $R_{77}$ | $B_2$ $R_{78}$ | $R_{79}$ | $R_{80}$ | $R_{81}$ |
|---|---|---|---|---|---|---|---|---|---|---|---|---|---|---|---|---|---|---|
| 27 | 27 | H | 2-c | H | H | 10 | $R_{75}$ | N | CH | H | H | — | H | H | H | $C_6H_{13}$ | H | H |

TABLE 2-10

(Structure of $B_1-Z_1=C-C=Z_2-B_2$)

| Polymer No. | Structural unit No | $r_1$ | A | $r_2$ | $r_3$ | Number of carbon atoms of $r_4$ | Substitution position of $B_1$ | $Z_1$ | $Z_2$ | $B_1$ $R_{82}$ | $R_{83}$ | $R_{84}$ | $R_{85}$ | $R_{86}$ | $B_2$ $R_{87}$ | $R_{88}$ | $R_{89}$ | $R_{90}$ | $R_{91}$ | $R_{92}$ |
|---|---|---|---|---|---|---|---|---|---|---|---|---|---|---|---|---|---|---|---|---|
| 28 | 28 | H | 2-c | H | H | 10 | $R_{84}$ | N | CH | H | H | — | H | H | CH3 | H | H | H | H | H |

TABLE 2-11

(Structure of $B_1-Z_1=C-C=Z_2-B_2$)

| Polymer No. | Structural unit No | $r_1$ | A | $r_2$ | $r_3$ | Number of carbon atoms of $r_4$ | Substitution position of $B_1$ | $Z_1$ | $Z_2$ | $B_1$ $R_{92}$ | $R_{93}$ | $R_{94}$ | $R_{95}$ | $R_{96}$ | $R_{97}$ | $R_{98}$ | $B_2$ $R_{99}$ | $R_{100}$ | $R_{101}$ | $R_{102}$ | $R_{103}$ |
|---|---|---|---|---|---|---|---|---|---|---|---|---|---|---|---|---|---|---|---|---|---|
| 29 | 29 | H | 2-c | H | H | 10 | $R_{96}$ | N | CH | H | H | H | — | H | H | H | H | $C_6H_{13}$ | H | H |

TABLE 2-12

(Structure of B₁—Z₁=C—C=Z₂—B₂)

| Polymer No. | Structural unit No | $r_1$ | A | $r_2$ | $r_3$ | Number of carbon atoms of $r_4$ | Substitution position of $B_1$ | $Z_1$ | $Z_2$ |
|---|---|---|---|---|---|---|---|---|---|
| 30 | 30 | H | 2-c | H | H | 10 | $R_{108}$ | N | CH |

| Polymer No. | B₁ | | | | | | | | B₂ | | | | |
|---|---|---|---|---|---|---|---|---|---|---|---|---|---|
| | $R_{104}$ | $R_{105}$ | $R_{106}$ | $R_{107}$ | $R_{108}$ | $R_{109}$ | $R_{110}$ | $R_{111}$ | $R_{112}$ | $R_{113}$ | $R_{114}$ | $R_{115}$ | $R_{116}$ | $R_{117}$ |
| 30 | H | H | H | H | — | H | H | H | H | H | H | $C_6H_{13}$ | H | H |

TABLE 3-1

| Polymer No. | Structure of polymer | Structural unit of general formula (1), α | | Different structural unit, β | | Mn | Photoresponsive adhesion test | |
|---|---|---|---|---|---|---|---|---|
| | | Structural unit No. | α Mn | Structural unit | B Mn | | Fluidization | Non-fluidization |
| 1 | Homopolymer | 1 | — | — | — | 24000 | ○ | ○ |
| 2 | Homopolymer | 2 | — | — | — | 17000 | ○ | ○ |
| 3 | Homopolymer | 3 | — | — | — | 28000 | ○ | ○ |
| 4 | Homopolymer | 4 | — | — | — | 5000 | ○ | ○ |
| 5 | Homopolymer | 5 | — | — | — | 45000 | ○ | ○ |
| 6 | Homopolymer | 6 | — | — | — | 12000 | ○ | ○ |
| 7 | Homopolymer | 7 | — | — | — | 21000 | ○ | ○ |
| 8 | Homopolymer | 8 | — | — | — | 15000 | ○ | ○ |
| 9 | Homopolymer | 9 | — | — | — | 34000 | ○ | ○ |
| 10 | Homopolymer | 10 | — | — | — | 39000 | ○ | ○ |
| 11 | Homopolymer | 11 | — | — | — | 5500 | ○ | ○ |
| 12 | Homopolymer | 12 | — | — | — | 18000 | ○ | ○ |
| 13 | Homopolymer | 13 | — | — | — | 26000 | ○ | ○ |
| 14 | Homopolymer | 14 | — | — | — | 20000 | ○ | ○ |
| 15 | Homopolymer | 15 | — | — | — | 13000 | ○ | ○ |
| 16 | Homopolymer | 16 | — | — | — | 30000 | ○ | ○ |
| 17 | Homopolymer | 17 | — | — | — | 23000 | ○ | ○ |
| 18 | Homopolymer | 18 | — | — | — | 32000 | ○ | ○ |
| 19 | Homopolymer | 19 | — | — | — | 14000 | ○ | ○ |
| 20 | Homopolymer | 20 | — | — | — | 35000 | ○ | ○ |
| 21 | Homopolymer | 21 | — | — | — | 41000 | ○ | ○ |
| 22 | Homopolymer | 22 | — | — | — | 7000 | ○ | ○ |
| 23 | Homopolymer | 23 | — | — | — | 38000 | ○ | ○ |
| 24 | Homopolymer | 24 | — | — | — | 9500 | ○ | ○ |
| 25 | Homopolymer | 25 | — | — | — | 16000 | ○ | ○ |
| 26 | Homopolymer | 26 | — | — | — | 44000 | ○ | ○ |
| 27 | Homopolymer | 27 | — | — | — | 29000 | ○ | ○ |
| 28 | Homopolymer | 28 | — | — | — | 37000 | ○ | ○ |
| 29 | Homopolymer | 29 | — | — | — | 25000 | ○ | ○ |
| 30 | Homopolymer | 30 | — | — | — | 19000 | ○ | ○ |
| 31 | Homopolymer | 1 | — | — | — | 1000 | ○ | ○ |

TABLE 3-2

| Polymer No. | Structure of polymer | Structural unit of general formula (1), α | | Different structural unit, β | | | Photoresponsive adhesion test | |
|---|---|---|---|---|---|---|---|---|
| | | Structural unit No. | α Mn | Structural unit | B Mn | Mn | Fluidization | Non-fluidization |
| 32 | Random copolymer | 1 | — | St | — | 36000 | ○ | ○ |
| 33 | Random copolymer | 1 | — | EA | — | 47000 | ○ | ○ |
| 34 | Random copolymer | 1 | — | nHMA | — | 8000 | ○ | ○ |
| 35 | Random copolymer | 1 | — | St/EA | — | 31000 | ○ | ○ |
| 36 | Block copolymer α-β | 1 | 8000 | iBMA | 10000 | 18000 | ○ | ○ |
| 37 | Block copolymer 2α-β | 1 | 7000 | iBMA | 15000 | 22000 | ○ | ○ |
| 38 | Block copolymer α-2β | 1 | 20000 | iBMA | 13000 | 33000 | ○ | ○ |
| 39 | Block copolymer 3α-β | 1 | 30000 | iBMA | 13000 | 43000 | ○ | ○ |
| 40 | Block copolymer α-3β | 1 | 24000 | iBMA | 3000 | 27000 | ○ | ○ |
| 41 | Block copolymer 4α-β | 1 | 29000 | iBMA | 20000 | 49000 | ○ | ○ |
| 42 | Block copolymer α-β | 1 | 4000 | iBMA | 12000 | 16000 | ○ | ○ |
| 43 | Block copolymer α-β | 1 | 500 | iBMA | 4500 | 5000 | ○ | ○ |
| 44 | Block copolymer 2α-β | 1 | 10000 | St | 7000 | 17000 | ○ | ○ |
| 45 | Block copolymer 2α-β | 1 | 11000 | BA | 26000 | 37000 | ○ | ○ |
| 46 | Block copolymer 2α-β | 1 | 5000 | 3MPe | 6000 | 11000 | ○ | ○ |
| 47 | Block copolymer 2α-β | 1 | 9000 | St/iBMA | 19000 | 28000 | ○ | ○ |
| Comparative Example 1 | Azobenzene derivative | | | | | 2870 | ○ | × |

In Table 3-2, St represents styrene, EA represents ethyl acrylate, nHMA represents n-hexyl methacrylate, St/EA represents a mixture of styrene and ethyl acrylate at a molar ratio of 1:1, iBMA represents isobutyl methacrylate, BA represents butyl acrylate, 3MPe represents 3-methyl-1-pentene, and St/iBMA represents a mixture of styrene and isobutyl methacrylate at a molar ratio of 1:1.

TABLE 4-1

| Example No. | Toner No. | Polymer | | Binder resin | | Fixing | | |
|---|---|---|---|---|---|---|---|---|
| | | Polymer No. | Percentage (mass %) | Type | Percentage (mass %) | Fixing device | rate (%) | Color reproducibility |
| 1 | 1 | 1 | 100 | — | — | 1 | 94 | ⊙ |
| 2 | 2 | 2 | 100 | — | — | 1 | 91 | ⊙ |
| 3 | 3 | 3 | 100 | — | — | 1 | 92 | ⊙ |
| 4 | 4 | 4 | 100 | — | — | 1 | 81 | ⊙ |
| 5 | 5 | 5 | 100 | — | — | 1 | 78 | ⊙ |
| 6 | 6 | 6 | 100 | — | — | 1 | 86 | ⊙ |
| 7 | 7 | 7 | 100 | — | — | 1 | 89 | ⊙ |
| 8 | 8 | 8 | 100 | — | — | 1 | 84 | ⊙ |
| 9 | 9 | 9 | 100 | — | — | 1 | 75 | ⊙ |
| 10 | 10 | 10 | 100 | — | — | 1 | 81 | ⊙ |
| 11 | 11 | 11 | 100 | — | — | 1 | 77 | ⊙ |
| 12 | 12 | 12 | 100 | — | — | 1 | 83 | ⊙ |
| 13 | 13 | 13 | 100 | — | — | 1 | 86 | ⊙ |
| 14 | 14 | 14 | 100 | — | — | 1 | 90 | ⊙ |
| 15 | 15 | 15 | 100 | — | — | 1 | 83 | ⊙ |
| 16 | 16 | 16 | 100 | — | — | 1 | 84 | ⊙ |
| 17 | 17 | 17 | 100 | — | — | 1 | 85 | ⊙ |
| 18 | 18 | 18 | 100 | — | — | 1 | 82 | ⊙ |
| 19 | 19 | 19 | 100 | — | — | 1 | 86 | ⊙ |
| 20 | 20 | 20 | 100 | — | — | 1 | 81 | ⊙ |
| 21 | 21 | 21 | 100 | — | — | 1 | 76 | ⊙ |
| 22 | 22 | 22 | 100 | — | — | 1 | 74 | ⊙ |
| 23 | 23 | 23 | 100 | — | — | 1 | 72 | ⊙ |
| 24 | 24 | 24 | 100 | — | — | 1 | 87 | ⊙ |
| 25 | 25 | 25 | 100 | — | — | 1 | 89 | ⊙ |
| 26 | 26 | 26 | 100 | — | — | 1 | 80 | ⊙ |
| 27 | 27 | 27 | 100 | — | — | 1 | 83 | ⊙ |
| 28 | 28 | 28 | 100 | — | — | 1 | 79 | ⊙ |
| 29 | 29 | 29 | 100 | — | — | 1 | 84 | ⊙ |
| 30 | 30 | 30 | 100 | — | — | 1 | 86 | ⊙ |
| 31 | 31 | 31 | 100 | — | — | 1 | 71 | ⊙ |
| 32 | 32 | 32 | 100 | — | — | 1 | 82 | ⊙ |
| 33 | 33 | 33 | 100 | — | — | 1 | 81 | ⊙ |
| 34 | 34 | 34 | 100 | — | — | 1 | 83 | ⊙ |
| 35 | 35 | 35 | 100 | — | — | 1 | 84 | ⊙ |
| 36 | 36 | 36 | 100 | — | — | 1 | 90 | ⊙ |

TABLE 4-1-continued

| | | Polymer | | Binder resin | | Fixing | | |
|---|---|---|---|---|---|---|---|---|
| Example No. | Toner No. | Polymer No. | Percentage (mass %) | Type | Percentage (mass %) | Fixing device | rate (%) | Color reproducibility |
| 37 | 37 | 37 | 100 | — | — | 1 | 96 | ⊙ |
| 38 | 38 | 38 | 100 | — | — | 1 | 91 | ⊙ |
| 39 | 39 | 39 | 100 | — | — | 1 | 93 | ⊙ |
| 40 | 40 | 40 | 100 | — | — | 1 | 92 | ⊙ |

TABLE 4-2

| | | Polymer | | Binder resin | | Fixing | | |
|---|---|---|---|---|---|---|---|---|
| Example No. | Toner No. | Polymer No. | Percentage (mass %) | Type | Percentage (mass %) | Fixing device | rate (%) | Color reproducibility |
| 41 | 41 | 41 | 100 | — | — | 1 | 90 | ⊙ |
| 42 | 42 | 42 | 100 | — | — | 1 | 91 | ⊙ |
| 43 | 43 | 43 | 100 | — | — | 1 | 78 | ⊙ |
| 44 | 44 | 44 | 100 | — | — | 1 | 94 | ⊙ |
| 45 | 45 | 45 | 100 | — | — | 1 | 93 | ⊙ |
| 46 | 46 | 46 | 100 | — | — | 1 | 92 | ⊙ |
| 47 | 47 | 47 | 100 | — | — | 1 | 95 | ⊙ |
| 48 | 48 | 1 | 70 | Styrene acrylic resin | 30 | 1 | 86 | ⊙ |
| 49 | 49 | 1 | 70 | Polyester resin | 30 | 1 | 89 | ⊙ |
| 50 | 1 | 1 | 100 | — | — | 2 | 96 | ⊙ |
| 51 | 1 | 1 | 100 | — | — | 3 | 97 | ⊙ |
| Comparative Example 1 | 50 | | | Azobenzene derivative | | 1 | 47 | × |
| Comparative Example 2 | 51 | — | — | Styrene acrylic resin | 100 | 4 | — | — |

The "ratio" of the polymer and the "ratio" of the binder resin in Tables 4-1 and 4-2 indicate the ratio (mass %) of the polymer and the ratio (mass %) of the binder resin, respectively, based on the total amount of the polymer and the binder resin in the toner. When the ratio was 0 mass %, the column of "Ratio" is marked as "–".

As is clear from Tables 2-1 to 4-2, it was confirmed that the polymer of each of the examples containing the structural unit represented by the general formula (1) and having the propenimine structure represented by the general formula (2) is fluidized by light irradiation and reversibly non-fluidized. Meanwhile, in the azobenzene derivative produced in Comparative Example 1, reversible non-fluidization after fluidization was not observed.

In addition, as shown in Tables 4-1 and 4-2, all the toners containing the polymers produced in the examples were fixed by light irradiation, and exhibited high fixability and excellent color reproducibility. Meanwhile, it was found that the toner containing the azobenzene derivative of Comparative Example 1 has low fixability and low color reproducibility. Since the light source of ultraviolet light and irradiation conditions of ultraviolet light used in the fixability test were the same, it can be said that the toners of the examples, as compared with the toner of Comparative Example 1, were fluidized and reversibly non-fluidized by light irradiation and sufficiently exhibited the effect by the polymer that is not significantly colored. In addition, the color reproducibility depends on the degree of coloration of the polymer of the general formula (1) used. The coloration depends on the electronic state of the moiety of the general formula (2). It is considered that the electronic state of the moiety of the general formula (2) depends on electron-withdrawing/electron-donating properties of $B_1$ and $B_2$ and substituents thereof and $r_2$ and $r_3$. In other words, in all the examples, the color reproducibility was evaluated as ⊙, and the evaluation can be said to be a result of controlling the electronic state of the moiety of the general formula (2), that is, the properties (electron-withdrawing/electron-donating properties) of groups such as $B_1$ and $B_2$ and substituents thereof and $r_2$ and $r_3$ so that the evaluation ⊙ may be obtained. In consideration of that the polymer is preferably colorless, and that in general, an absorption waveform undergoes red shift (long wavelength shift) when an electron-withdrawing group is introduced into the moiety of the general formula (2), wavelength prediction was performed. From the results, $B_1$ and $B_2$ and substituents thereof and $r_2$ and $r_3$ that were almost colorless were predicted, and synthesis and verification were performed. As a result, $B_1$ and $B_2$ and substituents thereof and $r_2$ and $r_3$ required for the polymer of the present invention were determined.

As a result of comparison of the fixing devices, it was found that light irradiation alone by the fixing device No. 1, in which no pressurizing member is used, provides sufficient fixability. In addition, it was found that higher fixability is achieved by using the fixing device No. 2 that pressurizes the image by the pressurizing member and the fixing device No. 3 that pressurizes and heats the image by the pressurizing member (comparison among Examples 1, 50, and 51). Further, in the case of the light-melting toner of the present invention, the fixability is improved as compared with the case of heating and pressurizing a conventional toner, and the light irradiation energy applied at the time of fixing is smaller than the conventional fixing energy (energy of heating and pressurization). From the above-mentioned results, it is understood that the fixing device No. 1 that does not pressurize or heat the image is most preferred from the viewpoint of simplification and size reduction of the configuration, energy saving, prevention of global warming ($CO_2$ reduction), and the like.

As shown in the examples, it is understood that all the polymers containing the structural unit represented by the general formula (1) and having a propenimine structure are fluidized by light irradiation and reversibly non-fluidized, are less colored, and exhibit an excellent fixing rate of 70% or more in the fixability test of a toner image with toners containing the polymers. In the first stage, the polymer is isomerized from a trans isomer to a cis isomer by light irradiation, and the crystal structure is disordered. In the second stage, the polymer is isomerized from the cis isomer after the light irradiation to a trans isomer, and is crystallized. Therefore, it is considered that isomerization rate and melting/crystallization are important as points for improving fixability. More specifically, it is considered that the arrangement (planarity/linearity) of the moieties of the general formula (2), ease of melting/crystallization, and the isomerization rate particularly greatly affect the fixability.

From the comparison of fixability among the toners of the examples, the fixability tends to be relatively high when both $B_1$ and $B_2$ in the structural unit of the general formula (1) are aromatic hydrocarbon groups. The fixability tends to be high when either of $B_1$ and $B_2$ is an aromatic heterocyclic group rather than when both $B_1$ and $B_2$ are aromatic heterocyclic groups.

From the comparison among Examples 1 to 12 in which both $B_1$ and $B_2$ are aromatic heterocyclic groups, the fixability tends to gradually increase in the order of the dialkylamino group having 4 carbon atoms in Example 4, the alkyl group having 10 carbon atoms in Example 2, the alkoxy group having 6 carbon atoms in Example 3, and the alkyl group having 6 carbon atoms in Example 1. From the result, it is understood that an alkoxy group and an alkyl group provide higher fixability than a dialkylamino group does.

It is understood that the fixability is higher in Example 1 in which the phenyl group as $B_2$ is unsubstituted than in Example 5 in which one methyl group is introduced.

Since the fixability is higher in Example 1 in which the number of carbon atoms of $r_4$ is 10 than in Example 6 in which the number of carbon atoms of $r_4$ is 6, it is considered that the larger the number of carbon atoms of $r_4$ is, the better the fixability is.

It is understood that the fixability is higher in Example 1 in which $Z_1$ is N than in Example 7 in which $Z_1$ is CH.

Since the fixability is higher in Example 1 in which A is a group represented by the general formula (2-c) than in Example 8 in which A is a group represented by the general formula (2-b) and Example 12 in which A is a group represented by the general formula (2-a), it is considered that the fixability increases in the order of the general formulae (2-a), (2-b), and (2-c).

It is understood that the fixability is higher in Example 1 in which $r_2$ and $r_3$ are both hydrogen atoms than in Example 9 in which one methyl group is introduced.

It is understood that the fixability is higher in Example 1 in which r is a hydrogen atom than in Example 10 in which $r_1$ is a methyl group.

It is understood that the fixability is higher in Example 1 in which $B_1$ is bonded to a polymerizable group at a para position with respect to $Z_1$ than in Example 11 in which $B_1$ is bonded to a polymerizable group at a meta position with respect to $Z_1$.

When a different structural unit is combined with a structural unit containing a propenimine structure-containing group, fluidization by light irradiation and reversible non-fluidization are similarly achieved. In addition, a toner containing the polymer exhibits a satisfactory fixing rate. It was found that in this case, excellent performance is obtained in both a random copolymer and a block copolymer. It was found that in particular, a block copolymer provides more excellent fixability.

Further, from the comparison between Example 1 and Example 31, it was found that the polymer of Example 1 having a number average molecular weight of 3,500 or more is superior in toner fixability even though the polymers have the same structural unit.

In the case of a block copolymer, from the comparison between Example 36 and Example 43, it was found that the polymer of Example 36 in which the number average molecular weight of the polymer block a is 1,000 or more and the number average molecular weight of the polymer block β is 1,000 or more is superior in toner fixability even though the polymers have the same structural unit.

It was also confirmed that use of a binder resin together with the polymer of the present invention similarly provides a satisfactory fixing rate and color reproducibility. Use of the polymer provides a satisfactory fixing rate even with a small content ratio of the binder resin. In addition, it can be said that both the styrene acrylic resin and the polyester resin as the binder resin provide good results.

Although embodiments of the present invention have been described and illustrated in detail, the disclosed embodiments are made for purposes of illustration and example only and not limitation. The scope of the present invention should be interpreted by terms of the appended claims. The entire disclosure of Japanese patent Application No. 2020-145015 filed on Aug. 28, 2020, is incorporated herein by reference in its entirety.

What is claimed is:

1. A photoresponsive polymer that is fluidized by light irradiation and reversibly non-fluidized and contains a structural unit represented by a general formula (1) shown below:

[Chemical Formula 1]

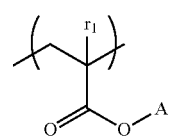

General formula (1)

wherein $r_1$ is a hydrogen atom or a methyl group, and
A is a propenimine structure-containing group represented by a general formula (2-a), (2-b), or (2-c) shown below:

[Chemical Formula 2]

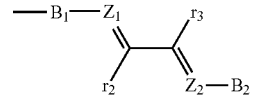

General formula (2-a)

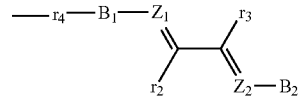

(2-b)

-continued

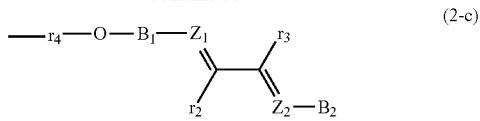
(2-c)

wherein $Z_1$ and $Z_2$ are each independently N or CX, and $Z_1 \neq Z_2$, $B_1$ is each independently a substituted or unsubstituted divalent aromatic hydrocarbon group or a substituted or unsubstituted divalent aromatic heterocyclic group, $B_2$ is each independently a substituted or unsubstituted monovalent aromatic hydrocarbon group or a substituted or unsubstituted monovalent aromatic heterocyclic group, X, $r_2$, and $r_3$ are each independently a hydrogen atom or an alkyl group having 1 to 2 carbon atoms, and $r_4$ is each independently an alkylene group having 1 to 18 carbon atoms.

2. The photoresponsive polymer according to claim 1, wherein X, $r_2$, and $r_3$ are each independently a hydrogen atom.

3. The photoresponsive polymer according to claim 1, wherein $B_1$ is each independently a divalent aromatic hydrocarbon group in which $Z_1$ is in a para-position relationship with respect to an oxygen atom or $r_4$, and $B_2$ is each independently an unsubstituted monovalent aromatic hydrocarbon group, or a monovalent aromatic hydrocarbon group having, at a para position with respect to $Z_2$, a substituent selected from an alkyl group having 1 to 18 carbon atoms, an alkoxy group having 1 to 18 carbon atoms, and a dialkylamino group having 2 to 10 carbon atoms.

4. The photoresponsive polymer according to claim 3, wherein in at least one of $B_1$ and $B_2$, two ortho positions and two meta positions with respect to $Z_1$ or $Z_2$ are unsubstituted or substituted with a group selected from a halogen atom, an alkyl group having 1 to 4 carbon atoms, an alkoxy group having 1 to 4 carbon atoms, and a dialkylamino group having 2 to 10 carbon atoms.

5. The photoresponsive polymer according to claim 1, wherein $B_1$ is each independently a divalent aromatic hydrocarbon group in which $Z_1$ is in a para-position relationship with respect to an oxygen atom or $r_4$ and $B_2$ is each independently an unsubstituted monovalent aromatic heterocyclic group, or a monovalent aromatic heterocyclic group substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

6. The photoresponsive polymer according to claim 1, wherein $B_1$ is each independently a substituted or unsubstituted divalent aromatic heterocyclic group, and is bonded to an oxygen atom or $r_4$ at a position not adjacent to a bonding position with $Z_1$, and $B_2$ is each independently an unsubstituted monovalent aromatic hydrocarbon group, or a monovalent aromatic hydrocarbon group substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

7. The photoresponsive polymer according to claim 1, wherein $B_1$ is each independently a substituted or unsubstituted divalent aromatic heterocyclic group, and is bonded to an oxygen atom or $r_4$ at a position not adjacent to a bonding position with $Z_1$, and $B_2$ is each independently an unsubstituted monovalent aromatic heterocyclic group, or a monovalent aromatic heterocyclic group substituted with a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, or an alkoxycarbonyl group having 2 to 19 carbon atoms.

8. The photoresponsive polymer according to claim 1, having a number average molecular weight Mn of 3,500 or more.

9. The photoresponsive polymer according to claim 1, further comprising a different structural unit derived from a monomer having a vinyl-based polymerizable group.

10. The photoresponsive polymer according to claim 9, wherein the different structural unit is a structural unit derived from a styrene derivative, an acrylic acid derivative, a methacrylic acid derivative, or an olefin derivative.

11. The photoresponsive polymer according to claim 1, which is fluidized by light irradiation and reversibly non-fluidized and is represented by a general formula (3) shown below:

[Chemical Formula 3]

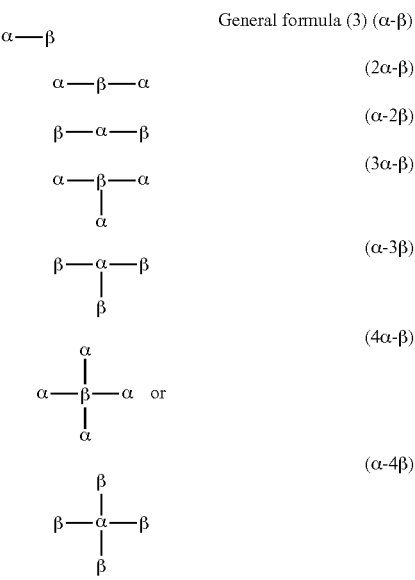

wherein α is a polymer block containing the structural unit represented by the general formula (1), and β is a polymer block not containing a propenimine structure.

12. The photoresponsive polymer according to claim 11, wherein the polymer block α contained in the photoresponsive polymer represented by the general formula (3) has a total number average molecular weight of 1,000 or more, the polymer block β contained in the photoresponsive polymer represented by the general formula (3) has a total number average molecular weight of 1,000 or more, and the photoresponsive polymer represented by the general formula (3) has an overall number average molecular weight of 3,500 or more.

13. The photoresponsive polymer according to claim 11, wherein the polymer block β contains at least one structural unit selected from the group consisting of a structural unit derived from a styrene derivative, a structural unit derived from a (meth)acrylic acid derivative, and a structural unit derived from an olefin derivative.

14. The photoresponsive polymer according to claim 1, wherein irradiation light applied to the photoresponsive polymer has a wavelength of 280 nm or more and 480 nm or less.

15. A toner comprising the photoresponsive polymer according to claim 1.

16. The toner according to claim 15, further comprising a binder resin.

17. The toner according to claim 16, wherein the binder resin includes at least one selected from the group consisting of a styrene acrylic resin and a polyester resin.

18. An image forming method comprising:

forming a toner image containing the toner according to claim 15 on a recording medium; and irradiating the toner image with light to soften the toner image.

19. The image forming method according to claim 18, wherein the light has a wavelength of 280 nm or more and 480 nm or less.

20. The image forming method according to claim 18, further comprising pressurizing the toner image.

21. The image forming method according to claim 20, wherein the pressurizing further includes heating the toner image.

22. A photoresponsive adhesive comprising the photoresponsive polymer according to claim 1.

23. An optical switching material comprising the photoresponsive polymer according to claim 1.

* * * * *